US010089824B2

(12) United States Patent
Yamaguchi et al.

(10) Patent No.: US 10,089,824 B2
(45) Date of Patent: Oct. 2, 2018

(54) GAMING TABLE SYSTEM

(71) Applicant: Universal Entertainment Corporation, Koto-ku, Tokyo (JP)

(72) Inventors: Shinsuke Yamaguchi, Tokyo (JP); Koichi Matsumoto, Tokyo (JP); Yoshiyuki Kanno, Tokyo (JP); Masaya Kato, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 120 days.

(21) Appl. No.: 15/208,731

(22) Filed: Jul. 13, 2016

(65) Prior Publication Data

US 2017/0018140 A1 Jan. 19, 2017

(30) Foreign Application Priority Data

Jul. 14, 2015 (JP) ................................ 2015-140796
Jul. 14, 2015 (JP) ................................ 2015-140797
Jul. 14, 2015 (JP) ................................ 2015-140798
Jul. 14, 2015 (JP) ................................ 2015-140799

(51) Int. Cl.

| | |
|---|---|
| ***G06F 17/00*** | (2006.01) |
| ***G07F 17/32*** | (2006.01) |
| ***A63F 1/06*** | (2006.01) |
| ***A63F 3/00*** | (2006.01) |
| *A63F 9/24* | (2006.01) |

(52) U.S. Cl.

CPC .......... *G07F 17/3244* (2013.01); *A63F 1/067* (2013.01); *A63F 3/00157* (2013.01); *G07F 17/3209* (2013.01); *G07F 17/3211* (2013.01); *G07F 17/3276* (2013.01); *G07F 17/3293* (2013.01); *A63F 2003/00164* (2013.01); *A63F 2009/2425* (2013.01)

(58) Field of Classification Search

None

See application file for complete search history.

(56) References Cited

U.S. PATENT DOCUMENTS

2009/0115133 A1* 5/2009 Kelly ..................... G07F 17/32 273/274
2013/0116032 A1* 5/2013 Lutnick ............... G07F 17/3276 463/17
2013/0207345 A1* 8/2013 Gelinotte .................. A63F 1/06 273/309
2014/0357361 A1* 12/2014 Rajaraman ............ G07F 17/323 463/31

* cited by examiner

*Primary Examiner* — Paul A D'Agostino

(74) *Attorney, Agent, or Firm* — Simpson & Simpson, PLLC; S. Peter Konzel

(57) ABSTRACT

The progress of a game while a change in gaming media placed in a betting area of a gaming table is left uncollected is prevented. A gaming table system includes a gaming table including a betting area in which gaming media are placed and an antenna member configured to read a value of the gaming media placed in the betting area by wireless communication and a control unit configured to execute a scanning process of obtaining the total value of the gaming media in the betting area by controlling the antenna member. The control unit fixes a first bet amount by executing the scanning process at a timing to fix the bet and fixes a second bet amount by executing the scanning process again at a predetermined timing, and the control unit repeats the scanning process until these amounts become identical.

15 Claims, 49 Drawing Sheets

FIG.41

GAME RESULT TABLE

| DATE AND TIME | TABLE NUMBER | SHOE NUMBER | DEALER ID | GAME NUMBER | SEAT NUMBER | PARTICIPANT ID | BET | GAME RESULT | COLLECTION | PAYMENT |
|---|---|---|---|---|---|---|---|---|---|---|
| 2015/4/22 16:27 | 5 | 90 | 0254 | 56 | No1 | 025674 | BANKER 1000PHP<br>TIE 100PHP | BANKER | 100PHP | 950PHP |
| 2015/4/22 16:27 | 5 | 90 | 0254 | 56 | No2 | 001457 | PLAYER 1000PHP<br>PLAYER PAIR 100PHP | BANKER | 1100PHP | 0 |
| 2015/4/22 16:27 | 5 | 90 | 0254 | 56 | No3 | 000598 | PLAYER 3000PHP | BANKER | 3000PHP | 0 |
| 2015/4/22 16:27 | 5 | 90 | 0254 | 56 | No5 | 098745 | BANKER 200PHP<br>BANKER PAIR 50PHP | BANKER | 50PHP | 190PHP |
| 2015/4/22 16:29 | 16 | 166 | 0062 | 83 | No1 | 025674 | BANKER 500PHP | PLAYER | 500PHP | 0 |
| 2015/4/22 16:29 | 16 | 166 | 0062 | 83 | No3 | 000598 | PLAYER 5000PHP | PLAYER | 0 | 5000PHP |
| 2015/4/22 16:29 | 16 | 166 | 0062 | 83 | No6 | 002235 | BANKER 8000PHP | PLAYER | 8000PHP | 0 |
| ... | ... | ... | ... | ... | ... | ... | ... | ... | ... | ... |

GAMING TABLE SYSTEM

CROSS REFERENCE TO RELATED APPLICATION

The present application claims priority from Japanese Patent Applications No. 2015-140796 filed on Jul. 14, 2015, No. 2015-140797 filed on Jul. 14, 2015, No. 2015-140798 filed on Jul. 14, 2015, and No. 2015-140799 filed on Jul. 14, 2015, the disclosures of which are herein incorporated by reference in its entirety.

TECHNICAL FIELD

The present invention relates to a gaming table system.

BACKGROUND ART

In a gaming facility such as casino, games such as baccarat and blackjack are played on a gaming table by using physical cards. A dealer is typically stationed at each gaming table where one or more players play games. The dealer manages the progress of a game such as card distribution, betting of gaming media with values such as gaming chips from players, collection of gaming media from players, and payment of gaming media to players.

In games above, because gaming media are frequently moved on the gaming table, human errors may be made by the dealer. To prevent the occurrence of such human errors, detection of electronic information by an antenna attached to a gaming table, with the use of a gaming medium in which an RF tag with electronic information is embedded, has been proposed (by, for example, U.S. Unexamined Patent Publication No. 2012/0080845).

The above-described gaming table is typically provided with a display. The display displays information based on electronic information detected by the antenna. The dealer performs the above-described game management while checking the display.

SUMMARY OF THE INVENTION

Technical Problem

In a game played on the above-described gaming table, a player places gaming media in a betting area on the gaming table when placing a bet. The dealer notifies the players that the bet cannot be changed after the completion of the betting of all players, and then progresses the game to determine a result. The dealer then awards gaming media to winning players based on the gaming media placed in the betting area.

As such, after the prohibition of the bet change and before the settlement of the game result, the dealer is required to progress the game and hence may not be able to check the gaming media placed on the betting area. This leaves place for cheating by a player.

The present invention has been done to solve the problem above, and an object of the present invention is to provide a gaming table system which prevents the game from progressing while a change in gaming media placed on a betting area of a gaming table is left uncollected.

Technical Solution (P15-0102)

A gaming table system of the present invention includes: a gaming table including a betting area in which a gaming medium betted by a player is placed and an antenna member configured to read a value of the gaming medium placed in the betting area by wireless communication; and a control unit configured to execute, by controlling the antenna member, a scanning process of obtaining a total value of the gaming medium in the betting area, wherein, the control unit executes the scanning process at a bet fixation timing to fix a first bet amount, executes the scanning process again at a predetermined timing after the bet fixation timing to fix a second bet amount, and when the fixed second bet amount is different from the fixed first bet amount, repeats the scanning process until the second bet amount becomes equal to the first bet amount.

According to the arrangement above, when the second bet amount is different from the first bet amount after the timing to fix the bet, the scanning process is repeated until the first bet amount and the second bet amount become identical with each other. In this way, the occurrence of a difference between the fixed bet amount and the gaming media placed in the betting area of the gaming table is detected, and the return of the gaming media placed in the betting area of the gaming table to the fixed bet amount is detected. It is therefore possible to prevent the game from progressing while a change in the gaming media placed on the betting area of the gaming table is left uncorrected.

The gaming table system may include a display which is configured to display, when the second bet amount is different from the first bet amount, a content of difference.

According to the arrangement above, because it is possible to understand in what manner the gaming media in the betting area are changed, the dealer can easily return the gaming media in the betting area to the fixed bet amount.

The gaming table system may be arranged such that the display includes a touch panel which allows an input of the bet fixation timing.

According to this arrangement, it is possible to set the timing to fix the bet by making an input, and hence it is possible to set a bet period at will.

The gaming table system may be arranged such that the control unit is arranged to be able to stop repetition of the scanning process.

According to the arrangement above, because the repetition of the scanning process can be terminated, the bet can be canceled.

The gaming table system may further include an acquisition unit (card shoe) configured to acquire a game result, the control unit repeating a process of executing the scanning process to fix the second bet amount, until the game result is acquired.

This makes it possible to monitor the gaming media in the betting area of the gaming table until a game result is determined.

The progress of a game while a change in gaming media placed in a betting area of a gaming table is left uncollected is prevented.

(P15-0103)

A gaming table system of the present invention includes: a gaming table including betting areas for players, respectively, in each of which a gaming medium betted by each player is placed, and an antenna member configured to read a value of the gaming medium placed in each of the betting areas by wireless communication;

a control unit configured to execute a scanning process of obtaining, by controlling the antenna member, a total value of the gaming medium in the betting area; and a display configured to display the total value in each of the betting areas and including a touch panel by which one of the betting areas is specified, wherein, when one of the betting areas is specified by the touch panel of the display, the control unit executes the scanning process again for the specified betting area.

According to the arrangement above, the bet amount of each player is displayed on the display, and the scanning process is executed again as the player is specified by the touch panel. This allows the dealer to easily specify a betting area from which the value is read again. The burden of the dealer is therefore lightened.

The gaming table system may further include an acquisition unit configured to acquire a game result, the control unit determines a betting area for which payment is to be made among the betting areas, based on the game result and the bet from the player, and, when payment is to be made for more than one betting area, specifies one of the betting areas based on an input to the touch panel and displays a payment amount for that betting area on the display.

With this arrangement, the order of the payment is determined by the touch panel. This allows the dealer to easily perform payment in a desired order while checking each payment amount.

The gaming table system may be arranged such that, based on the game result and the bet from the player, the control unit displays, on the display, a betting area in which the gaming medium to be collected is placed.

This allows the dealer to specify the betting area where the gaming media to be collected are placed, and the prevention of human errors is ensured.

The burden of the dealer is therefore lightened.

(P15-0104)

A gaming table system of the present invention includes:

a gaming table including a betting area including bet object areas corresponding to bet objects of a game and in which a gaming medium betted by a player is placed and an antenna member configured to read a value of the gaming medium placed in each of the bet object areas by wireless communication; and a control unit configured to execute, by controlling the antenna member, a scanning process of obtaining a total value of the gaming medium in each of the bet object areas, wherein, the control unit sets a bet object area corresponding to a bet object for which payment is to be made as a result of the game as an adding area and sets a bet object area corresponding to a bet object for which no payment is to be made as a result of the game as a subtracting area, and repeats the scanning process until a value calculated by subtracting a total value of the gaming medium in the subtracting area from a total value of the gaming medium in the adding area becomes equal to a payment amount.

According to the arrangement above, when there is payment to a player as a result of the game, a bet object area for which payment is to be made in a betting area used by the player for betting is utilized for paying gaming media. With this, the dealer is able to perform payment by placing only gaming media for additional payment in a bet object area for which payment to be made, while keeping the gaming media used for the bet as they are. Furthermore, the dealer is able to easily perform collection by placing house edge at the time of payment in a bet object area where no payment to the player is to be made. This allows the dealer to smoothly interchange the gaming media with the players at the time of the payment, and easily check whether the gaming media are correctly interchanged.

The gaming table system may be arranged such that, the game is baccarat, in the gaming table, the betting area includes a banker area and a player area as the bet object areas, and when banker wins, the control unit sets the banker area as the adding area and sets the player area as the subtracting area.

With this arrangement, the player can easily pay the commission at the time of the winning of the banker in baccarat by placing gaming media in the player area.

The gaming table may further include a dealer area which functions as the adding area.

With the above-described structure, the degree of freedom in the game management is improved because the dealer is able to use the dealer area as the adding area.

The gaming table may further include a commission area which functions as the subtracting area.

With the above-described structure, the degree of freedom in the game management is improved because the dealer is able to use the commission area as the subtracting area.

This makes it possible to smoothly interchange the gaming media with the players at the time of the payment, and easily check whether the gaming media are correctly interchanged.

(P15-0105)

A gaming table system of the present invention includes:

a gaming table including a gaming medium providing area in which a gaming medium is placed and an antenna member configured to read, by wireless communication, a value of the gaming medium placed in the gaming medium providing area;

a control unit configured to execute, by controlling the antenna member, a scanning process of obtaining a total value of the gaming medium in the gaming medium providing area; and a display, wherein, the control unit determines a total value of a first gaming medium in the gaming medium providing area, and determines a total value of a second gaming medium excluding the first gaming medium in the gaming medium providing area after a predetermined time elapses, determines whether the first gaming medium is identical with the second gaming medium, and displays a result of determination on the display.

According to the arrangement above, in the same gaming medium providing area, the value indicated by the first gaming media is read and then the value of the second gaming media excluding the first gaming media is read, and whether these values are identical or not is displayed. This allows the dealer who manages the gaming table system player to easily display the second gaming media corresponding to the value of the first gaming media from the player, and to easily prevent the occurrence of errors in exchange of gaming media with the player. Furthermore, the dealer is allowed to check whether the value of the first gaming media is identical with the value of the second gaming media, while keeping the first gaming media from the player to be placed in the gaming medium providing area. With this, the number of times of movement of gaming media by the dealer is reduced and the occurrence of errors is restrained.

The gamin table system may be arranged such that the control unit displays, on the display, a total amount of money and a total number of the first gaming medium and a total amount of money and a total number of the second gaming medium.

According to this arrangement, the total amounts and the total numbers of the first gaming media and the second gaming media are displayed. Because this makes it possible to check the number of the actually placed gaming media and the number of the gaming media having been read together with the amounts, the prevention of human errors is further ensured.

The gaming table system may be arranged such that the control unit accepts only a convertible gaming medium convertible to a currency as the first gaming medium, and accepts only an inconvertible gaming medium inconvertible to a currency as the second gaming medium.

This arrangement allows the dealer to easily specify the type of gaming media before the exchange and the type of gaming media after the exchange when exchanging convertible gaming media to inconvertible gaming media at the time of so-called rolling, and hence the occurrence of human errors is prevented.

This allows the dealer to smoothly perform the exchange, and errors made by the dealer are reduced.

BRIEF DESCRIPTION OF THE DRAWINGS

FIG. 41 illustrates a game result table.

DESCRIPTION OF EMBODIMENTS (Gaming Table System 1: Outline)

A gaming table system 1 of the present invention is arranged to be able to monitor increase and decrease of gaming media on a gaming table 2 when a player places a bet. The gaming table system 1 is further arranged to be able to specify from which one of betting areas on the gaming table 2 a value is to be obtained. The gaming table system 1 is further arranged to be able to detect gaming media paid to a player in a betting area on the gaming table 2. The gaming table system 1 is further arranged to be able to compare, in terms of values, gaming media from a player before exchange with gaming media to the player after the exchange, in one area on the gaming table 2.

Figure 1:
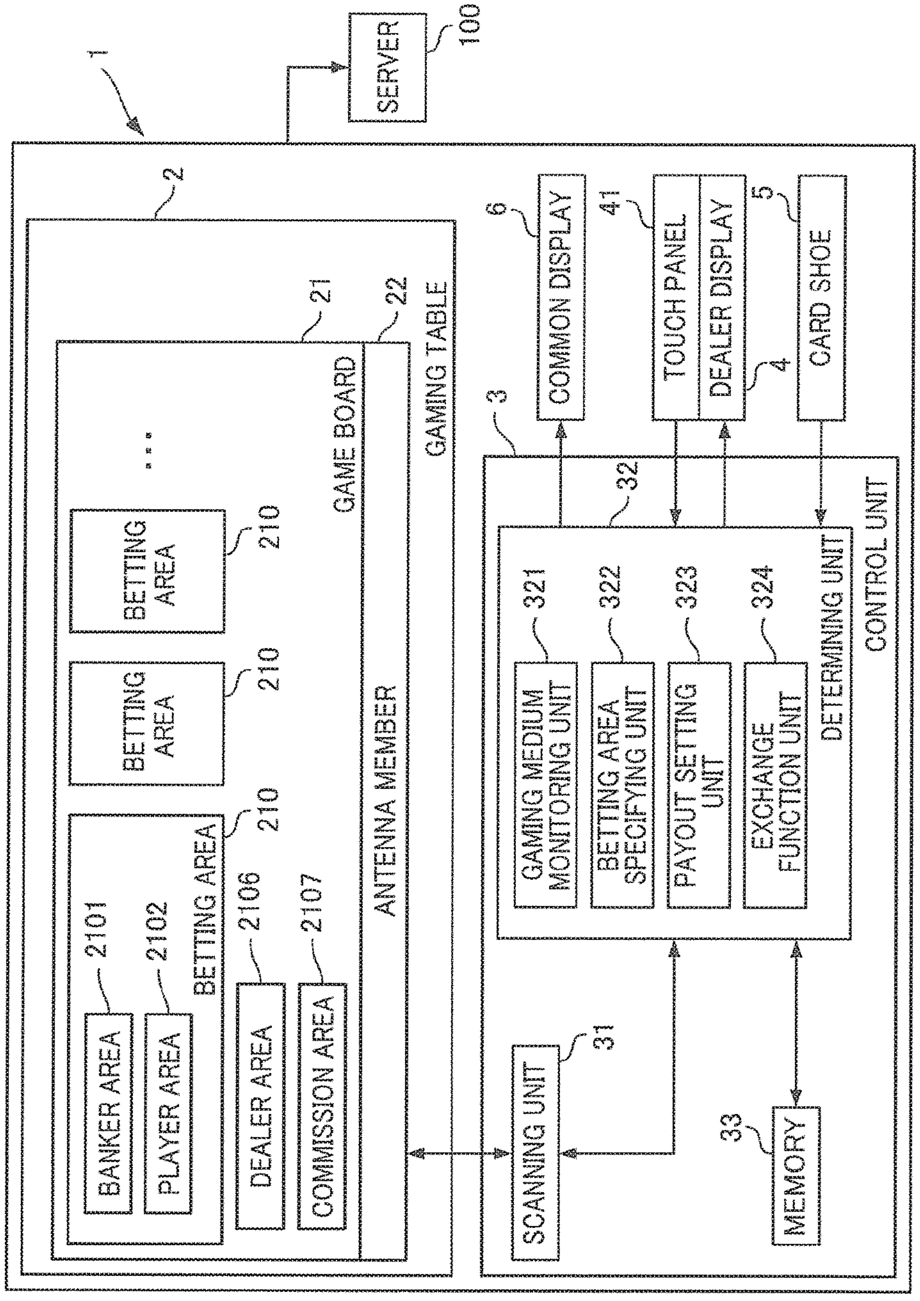
FIG. 1 is a schematic block diagram of a gaming table system.

As shown in FIG. 1, the gaming table system 1 of the present embodiment is connected with a server 100 so that data communications therebetween are possible. As detailed later, the gaming table system 1 is arranged to serially send, to the server 100, a game result, a payment amount paid to a player, a collected amount collected from a player, etc. This allows the server 100 to check income-and-expense information of the gaming table system 1. Although not illustrated, plural gaming table systems 1 are connectable with the server 100.

Figure 2:
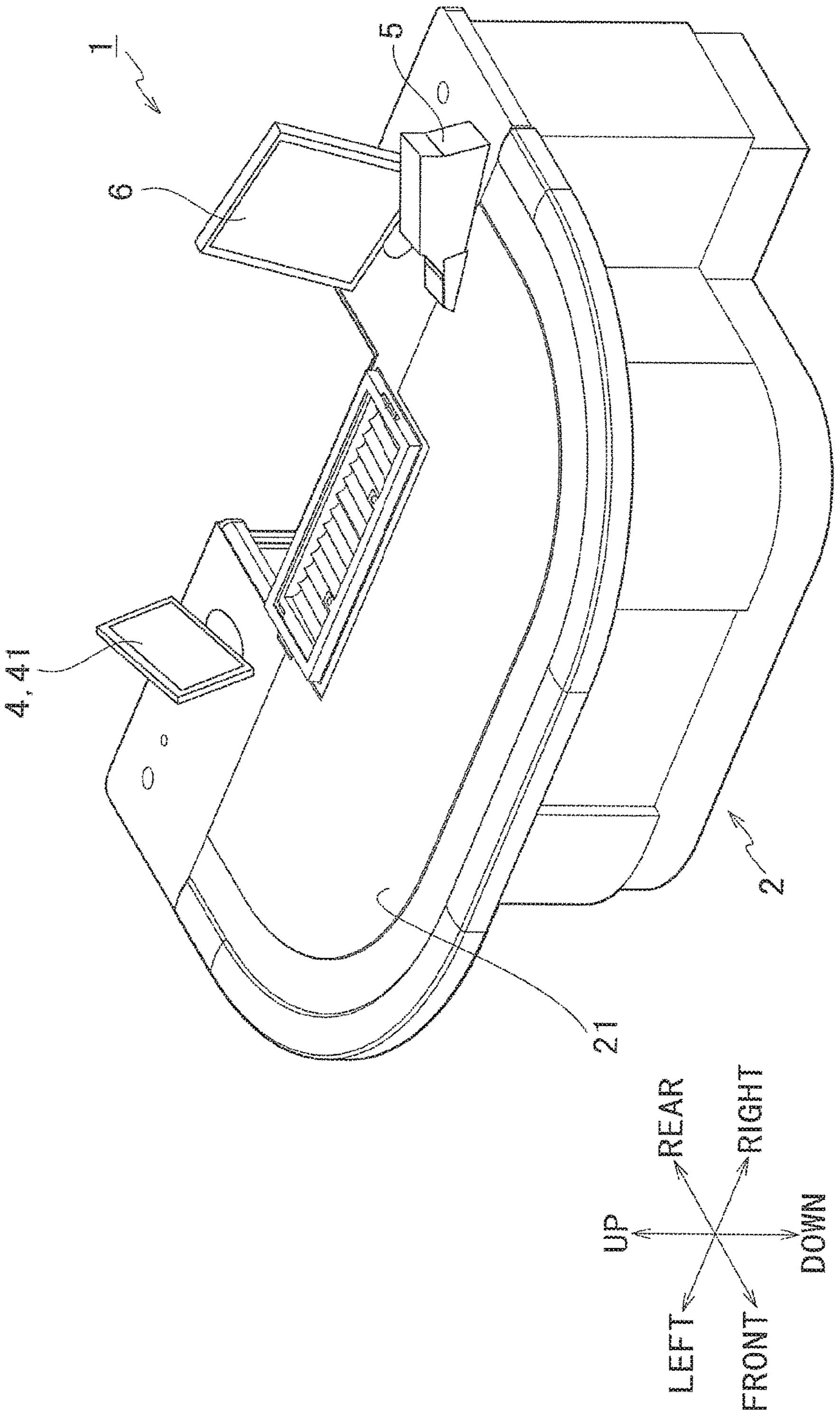
FIG. 2 is a perspective view of the gaming table system.

Such a gaming table system 1 includes, to be more specific, a gaming table 2, a control unit 3, a dealer display 4 including a touch panel 41 by which an input from a dealer is received, a card shoe 5, and a common display 6, as shown in FIG. 1 and FIG. 2. The control unit 3 may be provided in the gaming table 2 or may be independent from the gaming table 2. The card shoe 5 is arranged so that cards can be serially taken out therefrom, and is able to determine a game result. To put it differently, the dealer progresses a game by taking out cards from the card shoe 5.

The card shoe 5 is provided with a scanner. When the dealer takes out cards from the card shoe to distribute cards to the players, an image on each card is read by the scanner. The card shoe 5 performs a process such as image recognition regarding the image read from the card by the scanner, so as to specify the details of the card such as the number, the mark indicating the type of suit, and the picture. The card shoe 5 sends the specified details of the card to the control unit 3.

In the present embodiment, baccarat is taken as an example of the game. The game progress and result of baccarat are uniquely determined based on cards serially taken out by the dealer. The control unit 3 is therefore able to determine a game result based on the details of the cards specified by the card shoe 5. Alternatively, the card shoe 5 determines a game result and sends the game result to the control unit 3.

The control unit 3 displays, on the common display 6, a game result and win/loss of each player in the game. The game may not be baccarat. When the game progress and result of the played game are variable based on the selection made of a player or dealer, the gaming table system 1 may include an arrangement of reading the game progress and result or an arrangement of inputting the game progress and result.

As shown in FIG. 2, the gaming table 2 has a substantially semicircular top board. On the arc side of the top board, players are lined up. On the side opposite to the arc side of the top board, a rectangular notch is formed. The dealer is positioned at this notch and progresses the game. To the top board of the gaming table 2, a game board 21 is detachably attached as a gaming medium providing area which is a thin plate and substantially fan-shaped. The game progresses on the game board 21. To put it differently, cards taken out from the card shoe 5 by the dealer are provided on the game board 21, and gaming media are bet thereon by the players. On the upper surface of the gaming table 2, the dealer display 4, the card shoe 5, and the common display 6 are provided. Furthermore, although not illustrated, the control unit 3 is mounted at a position not viewable from the outside of the gaming table 2. The control unit 3 is arranged to be able to communicate with the dealer display 4, the card shoe 5, and the common display 6.

In the descriptions below, the arc side of the top board is referred to as the front side (forward direction) of the gaming table 2. The opposite to the front side is referred to as the back side (backward direction, depth direction). The left and right sides when viewed from the front side are referred to as the right side (rightward) and the left side (leftward) of the gaming table 2, respectively. A direction encompassing the forward direction and the backward direction may be referred to as a front-back direction, and a direction encompassing the rightward direction and the leftward directions may be referred to as a left-right direction. Further, a direction perpendicular to the front-back direction (thickness direction) and the left-right direction (width direction) may be referred to as a up-down direction or a height direction.

As shown in FIG. 1, the gaming table 2 includes the game board 21 on which gaming media are provided and an antenna member 22 which is configured to read, by wireless communication, a value of the gaming media provided on the game board 21. The antenna member 22 is provided below the game board 21.

Figure 3:
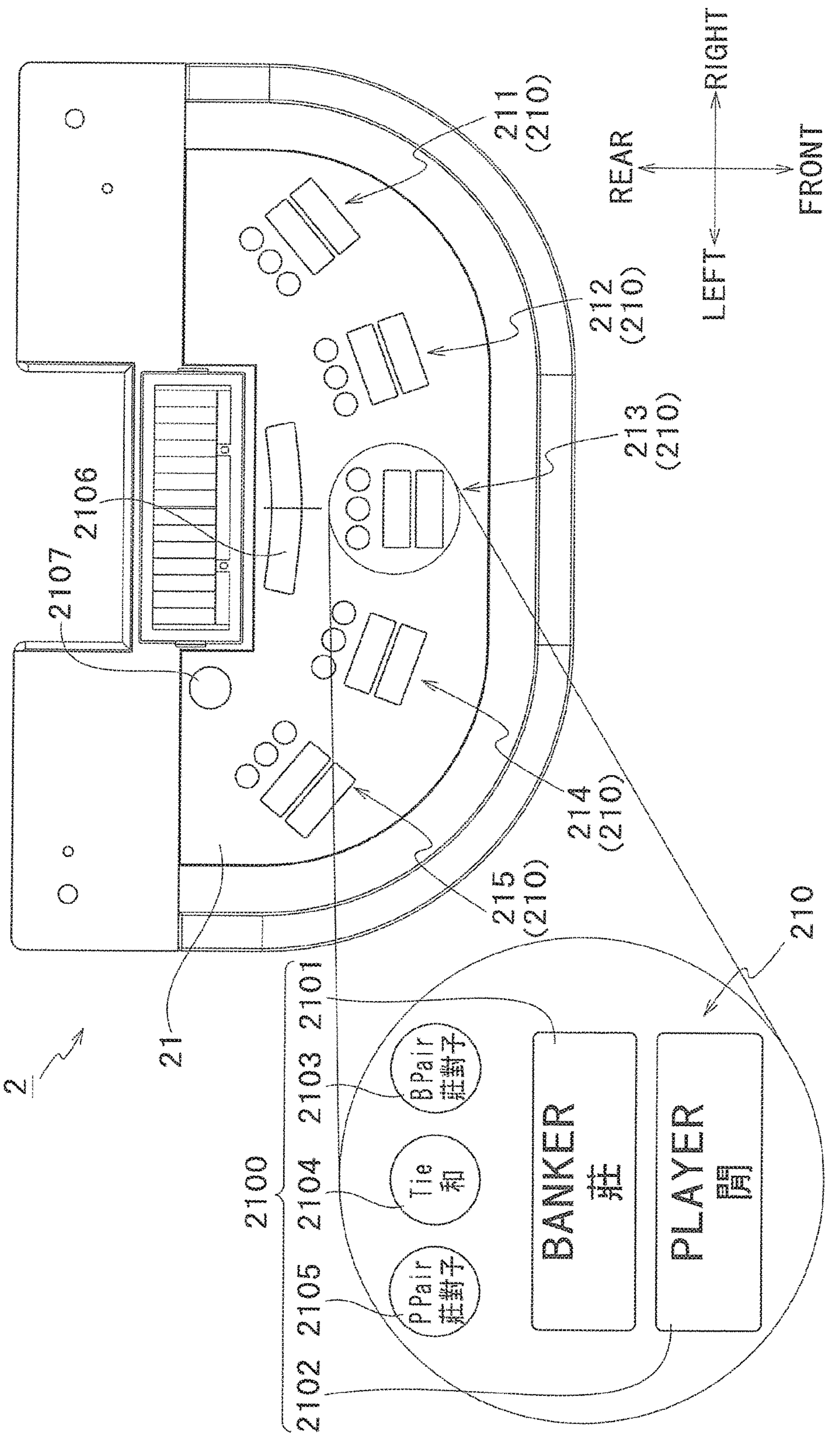
FIG. 3 is a top view of the gaming table system.

As shown in FIGS. 1 and 3, the game board 21 is provided with plural betting areas 210 where gaming media are betted by players. The number of the betting areas 210 is identical with the number of seats allowing players to sit at the gaming table 2. In other words, each player uses one betting area 210. While the number of the betting areas 210 is five in the present embodiment, the number of the betting areas 210 may be different. The betting areas 210 are formed of betting areas 211, 212, 213, 214, and 215 which are lined up from the left.

In each betting area 210, gaming media are betted by the player. The game in the present embodiment is baccarat, and each betting area 210 includes a banker area 2101 and a player area 2102. When the player bets on the winning of the banker side (hereinafter, this may be simply referred to as banker), gaming media equivalent to a desired bet amount are placed in the banker area 2101. When the player bets on the winning of the player side (hereinafter, this may be simply referred to as player), gaming media equivalent to a desired bet amount are placed in the player area 2102. Hereinafter, players participating in the game will be referred to as participants, in order to distinguish a player which is the target of betting from a player participating in the game.

Each betting area 210 further includes a banker pair area 2103 used for side bet, a tie area 2104, and a player pair area 2105. When betting on a case where the banker side wins and the cards form a pair (hereinafter, this may be referred to as banker pair), the participant places gaming media equivalent to a desired bet amount on the banker pair area 2103. When betting on a tie, the participant places gaming media equivalent to a desired bet amount on the tie area 2104. When betting on a case where the player side wins and the cards form a pair (hereinafter, this may be referred to as a player pair), the participant places gaming media equivalent to a desired bet amount on the player pair area 2105.

As such, the areas 2101 to 2105 provided in each betting area 210 indicate bet objects. Hereinafter, the areas 2101 to 2105 provided in the betting area 210 may be referred to as bet object areas 2100. In addition to the above, the game board 21 is provided with a dealer area 2106 used by the dealer for payment, exchange, or the like and a commission area 2107 usable by the dealer to receive commission.

Although not illustrated in FIGS. 1 to 3, the antenna member 22 includes antennas provided for the respective areas 2101 to 2105 of the above-described game board 21. This arrangement makes it possible to read values of gaming media in the respective areas 2101 to 2105.

As shown in FIG. 1, the control unit 3 includes a scanning unit 31, a determining unit 32, and a memory 33. The scanning unit 31 executes a scanning process of obtaining the total value of the gaming media in each area of the game board 21, by controlling the antenna member 22. The scanning unit 31 is able to specify a timing to execute the scanning process, which antenna member 22 is used, and which antenna of the specified antenna member 22 is used. The memory 33 stores programs, data, information of gaming media obtained through the antenna member 22, or the like.

The determining unit 32 has functions described below. To be more specific, the determining unit 32 includes a gaming medium monitoring unit 321, a betting area specifying unit 322, a payout setting unit 323, and an exchange function unit 324.

To be more specific, the gaming medium monitoring unit 321 has a function of fixing a first bet amount by executing the scanning process at a timing to fix the bet. The first bet amount is a value indicated by at least one gaming medium placed in the betting area 210 at the timing to fix the bet. On this account, when a participant wins, a payout amount is determined based on the first bet amount. In the meanwhile, when a participant loses, the first bet amount is collected. The determining unit 32 has a function of fixing a second bet amount by causing the scanning unit 31 to execute the scanning process again at a predetermined timing after the timing to fix the bet. The first bet amount and the second bet amount are therefore identical with each other if the gaming media in the betting area 210 are not changed by a participant or the like. When the fixed second bet amount is different from the first bet amount, the gaming medium monitoring unit 321 requests the scanning unit 31 to repeat the scanning process until the bet amounts become identical with each other.

As such, when the second bet amount is different from the first bet amount after the timing to fix the bet, the scanning process is repeated until the first bet amount and the second bet amount become identical with each other. In this way, the occurrence of a difference between the fixed bet amount and the gaming media placed in the betting area 210 of the gaming table 2 is detected, and the return of the gaming media placed in the betting area 210 of the gaming table to the fixed bet amount is detected. It is therefore possible to prevent the game from progressing while a change in the gaming media placed on the betting area 210 of the gaming table 2 is left uncorrected.

In addition to the above, when there is a difference between the first bet amount and the second bet amount, the gaming medium monitoring unit 321 displays the difference on the dealer display 4. Because this allows the dealer to understand in what manner the gaming media in the betting area 210 are changed, the dealer can easily return the gaming media in the betting area 210 to the fixed bet amount.

In addition to the above, the gaming medium monitoring unit 321 has a function of determining the timing to fix the bet based on an input to the touch panel 41 by the dealer. Because the dealer is able to set the timing to fix the bet by making an input, the dealer can set a bet period at will. In addition to the above, the gaming medium monitoring unit 321 has a function of terminating the repetition of the scanning process. The termination of the repetition of the scanning process is executed based on an input to the touch panel 41 by the dealer. This makes it possible to cancel the bet when, for example, it is impossible to resolve the difference between the first bet amount and the second bet amount. Furthermore, the gaming medium monitoring unit 321 repeats a process of executing the scanning process and fixing the second bet amount, until a game result is obtained from the card shoe 5. This allows the control unit 3 to monitor the gaming media in the betting area of the gaming table until a game result is determined.

The betting area specifying unit 322 has a function of specifying an antenna by which the scanning process is executed by the scanning unit 31. Which one of the antennas of the antenna member 22 is specified by the betting area specifying unit 322 is determined based on an input to the touch panel 41. To be more specific, the dealer display 4 displays the total value in each of the betting areas 210 in a selectable manner. By selecting one of the betting areas 210 indicating the respective participants by means of the touch panel 41, an input to specify an antenna is made. As a result, the bet amount of each participant is displayed on the dealer display 4, and the scanning process is executed again as a participant is specified by the touch panel 41. This allows the dealer to easily specify a betting area 210 from which the value is read again. The burden of the dealer is therefore lightened.

Based on the game result from the card shoe 5 and the bet by the participants, the betting area specifying unit 322 specifies a betting area 210 to which payment is to be made, among the betting areas. When there are plural betting areas 210 to which payment is to be made, the betting area specifying unit 322 specifies one of the betting areas 210 based on an input to the touch panel 41, and displays a payment amount of that betting area on the display. With this arrangement, the order of the payment is determined by the touch panel 41. This allows the dealer to easily perform payment in a desired order while checking each payment amount.

In addition to the above, the betting area specifying unit 322 has a function of displaying, on the display, a betting area 210 where gaming media to be collected are placed, based on a game result and bet by participants. This allows the dealer to specify the betting area 210 where the gaming media to be collected are placed, and the prevention of human errors is ensured.

In addition to the above, the payout setting unit 323 has a function of setting a bet object area corresponding to a bet object to which payment is to be made based on a game result as an adding area, and setting a bet object area corresponding to a bet object to which no payment is to be made based on the game result as a subtracting area. In addition to the above, the payout setting unit 323 has a function of requesting the scanning unit 31 to repeat the scanning process until a value calculated by subtracting the total value of the gaming media in the subtracting area from the total value of the gaming media in the adding area becomes equal to the payment amount. The adding area is an area where gaming media to be paid to the participant is placed. The subtracting area is an area where gaming media collected from the participant is placed.

In the present embodiment, because the adding area and the subtracting area are set in the betting area, the dealer is able to perform payment by placing only gaming media for additional payment in a bet object area for which payment to be made, while keeping the gaming media used for the bet as they are. Furthermore, the dealer is able to easily perform collection by placing house edge at the time of payment in a bet object area where no payment to the participant is to be made. This allows the dealer to smoothly interchange the gaming media with the participants at the time of the payment, and easily check whether the gaming media are correctly interchanged.

For example, in general, when a participant wins with the banker in baccarat, commission is collected from the participant as house edge of the gaming facility. The commission is set at 5% of the payment amount. When a participant wins with the betting on the banker, the participant cannot receive the entirety of the payout and has to give 5% of the payout to the dealer as the commission. In other words, an amount paid to the participant is an amount calculated by subtracting the commission from the payout. In such cases, the dealer is only required to place additional gaming media in the banker area 2101, and the participant is only required to place gaming media corresponding to the commission in the player area 2102. As such, in the present embodiment, when the banker wins as a result of the game, the banker area 2101 is set as the adding area whereas the player area 2102 is set as the subtracting area. With this arrangement, the commission at the time of the winning of the banker in baccarat is easily paid by placing gaming media in the player area 2102.

In the present embodiment, the dealer area 2106 can be used as the adding area and the commission area 2107 can be used as the subtracting area. These areas can be used when all gaming media corresponding to the payment amount cannot be placed in the banker area 2101 or when a participant directly hands over the commission to the dealer, and hence the degree of freedom in the management of the game is improved.

In addition to the above, the exchange function unit 324 has a function of determining the total value of the first gaming media placed in the dealer area 2106. Furthermore, the exchange function unit 324 has a function of determining the total value of the second gaming media which are placed in the dealer area 2106 and are different from the first gaming media after a predetermined timing, determining whether the first gaming media are identical with the second gaming media, and displaying a determination result on the dealer display 4.

As such, it is possible to read the value of the first gaming media and then read the second gaming media excluding the first gaming media, and display whether these two types of gaming media are identical, in the same game board 21 which is the dealer area 2106. This typically allows the dealer who manages the gaming table system 1 to easily display the second gaming media corresponding to the value of the first gaming media, and easily prevents the occurrence of errors in exchange of gaming media with a participant. Furthermore, the dealer is allowed to check whether the value of the first gaming media is identical with the value of the second gaming media, while maintaining the first gaming media from the participant to be placed in the gaming medium providing area. With this, the number of times of movement of gaming media by the dealer is reduced and the occurrence of errors is restrained.

In addition to the above, the exchange function unit 324 has a function of displaying, on the dealer display 4, the total amount and total number of the first gaming media and the total amount and total number of the second gaming media. Because this makes it possible to check the number of the actually placed gaming media and the number of the gaming media having been read, together with the amounts thereof, the prevention of human errors is further ensured.

In addition to the above, the exchange function unit 324 has a mode in which only convertible gaming media which can be converted to currencies are accepted as the first gaming media and only inconvertible gaming media which cannot be converted to currencies are accepted as the second gaming media. This allows the dealer to easily specify the type of gaming media before the exchange and the type of gaming media after the exchange when exchanging convertible gaming media to inconvertible gaming media at the time of so-called rolling, and hence the occurrence of human errors is prevented.

The types (attributes) of the gaming media include convertible gaming media and inconvertible gaming media such as medals, tokens, and plaques. Each gaming medium indicates currency information or a gaming value of a game point in the form of electronic data or appearance, and the gaming value is readable from the outside. The appearance indicates information recognizable from the outside, such as color, pattern, text, image, and shape. The convertible gaming media are usable for games in gaming facilities such as casinos and are directly exchangeable to currencies. An example of the convertible gaming media is negotiable plaque. The inconvertible gaming media are usable for games in gaming facilities such as casinos and are not directly exchangeable to currencies. An example of the inconvertible gaming media is non-negotiable plaque. Examples of the attributes of the gaming media include "cash". "junket NN (non-negotiable)", "premium cash", and "premium NN (non-negotiable)". The "cash" indicates convertible gaming media issued from the gaming facility to participants. The "junket cash" indicates convertible gaming media issued from the junket to participants. The "junket NN" indicates inconvertible gaming media issued from the junket to participants. The "premium cash" indicates convertible gaming media issued from the gaming facility to important participants. The "premium NN" indicates inconvertible gaming media issued from the gaming facility to important participants.

Each gaming medium is formed of resin or the like and an RFID tag which is an IC chip for RFID is provided in a central part of the gaming medium. While the gaming medium stores an amount of money as a value in the RFID tag, the gaming medium may further store the following electronic information. For example, the electronic information may include identification information set for the gaming medium 8, the above-described attributes, money types, issuers, issue dates, and expiration dates. The identification information is information for uniquely identifying gaming media. The money type is information indicating to which currency unit the gaming media belong. The issuer is information indicating the issuer of the gaming media. The issuer may be information for identifying an entity which hands over gaming media to participants. For example, when a gaming facility such as a casino directly issues gaming media for participants, the issuer is the gaming facility. When the gaming media issued by a gaming facility are handed over to participants via a junket, the issuer is information for identifying the junket.

(Gaming Table System 1: Dealer Display 4)

Figure 4:
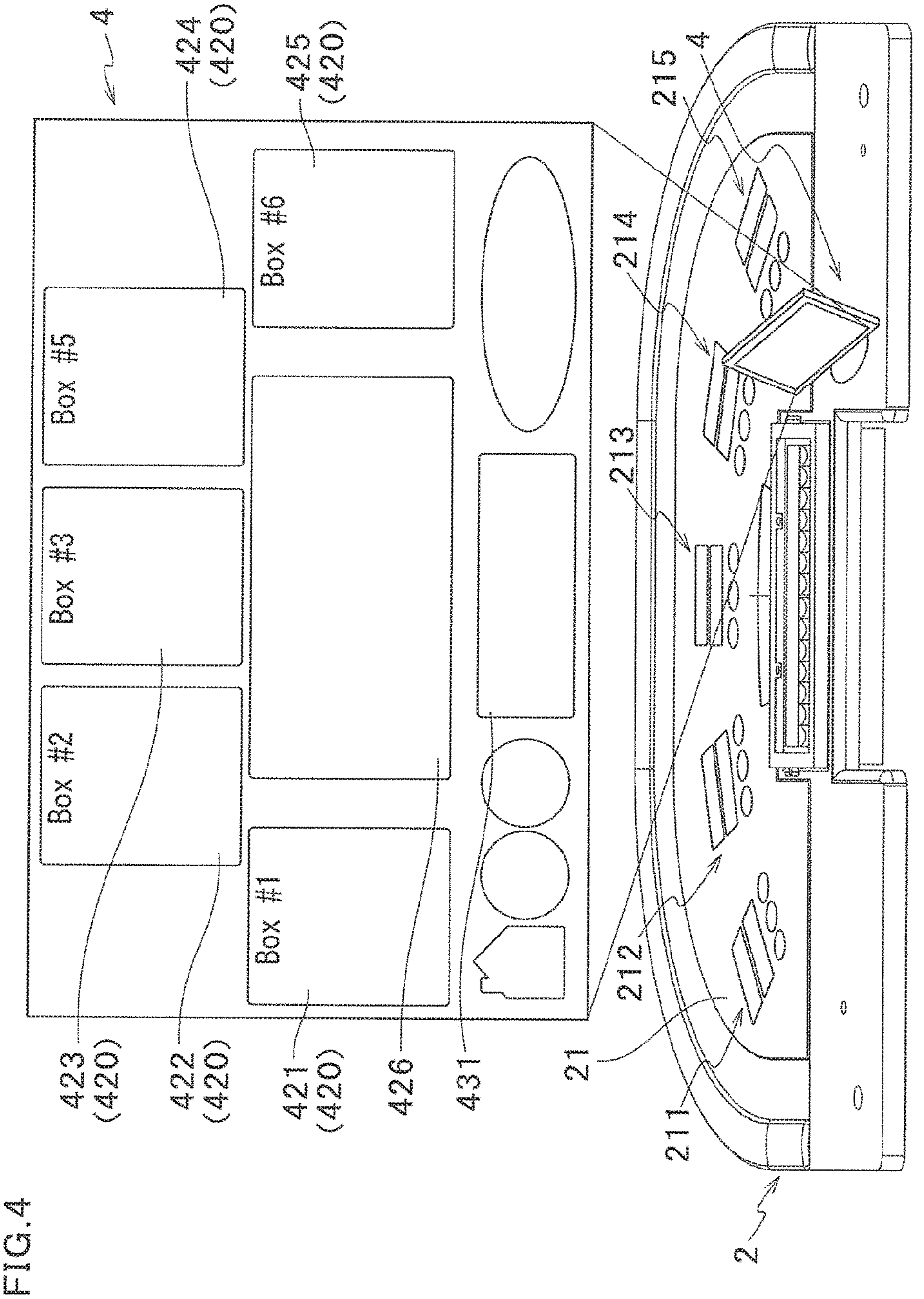
FIG. 4 shows a game board and an example of image display on a dealer display on the game board.

As shown in FIG. 4, the dealer takes out cards from the card shoe 5 (see FIG. 2) and progresses the game on the gaming table 2, while checking the dealer display 4 provided to the right of the gaming table 2.

In accordance with the game progressed by the dealer, the gaming table system 1 repeatedly executes four phases. That is to say, the gaming table system 1 repeatedly executes a bet phase, a bet monitoring phase, a collection phase, and a payment phase. The following will describe display screens displayed on the dealer display 4 in the respective phases.

(Gaming Table System 1: Dealer Display 4: Bet Screen)

The following will describe a bet screen displayed on the dealer display 4 in the bet phase. The bet phase starts when the payment phase ends. The payment phase will be described later. As the bet phase starts, the gaming table system 1 displays, on the dealer display 4, a bet screen displaying a bet condition of each participant.

As shown in FIG. 4, the dealer display 4 displays five bet display areas (bet display areas 421, 422, 423, 424, and 425)

corresponding to the betting areas 211, 212, 213, 214, and 215 of the respective participants sitting at the gaming table 2, an indicator screen 426, and a message screen 431. In a lower left part of the dealer display 4, a main menu button 427, a chip change button 428, and a rolling button 429 are displayed.

In the dealer display 4, the bet display area 421 is displayed at a left end part, and information regarding values of gaming media placed in the betting area 211 is displayed therein. On the dealer display 4, the bet display areas 422, 423, and 424 are displayed in an upper part, and information regarding values of gaming media placed in the betting areas 212, 213, and 214 is displayed therein. In the dealer display 4, the bet display area 425 is displayed at a right end part, and information regarding values of gaming media placed in the betting area 215 is displayed thereon. As such, the layout of the bet display areas 421, 422, 423, 424, and 425 displayed on the dealer display 4 corresponds to the layout of the betting areas 211, 212, 213, 214, and 215 on the game board 21 viewed from the dealer side. The indicator screen 426 is displayed at a central portion of the dealer display 4. The message screen 431 is displayed below the indicator screen 426.

Figure 5:
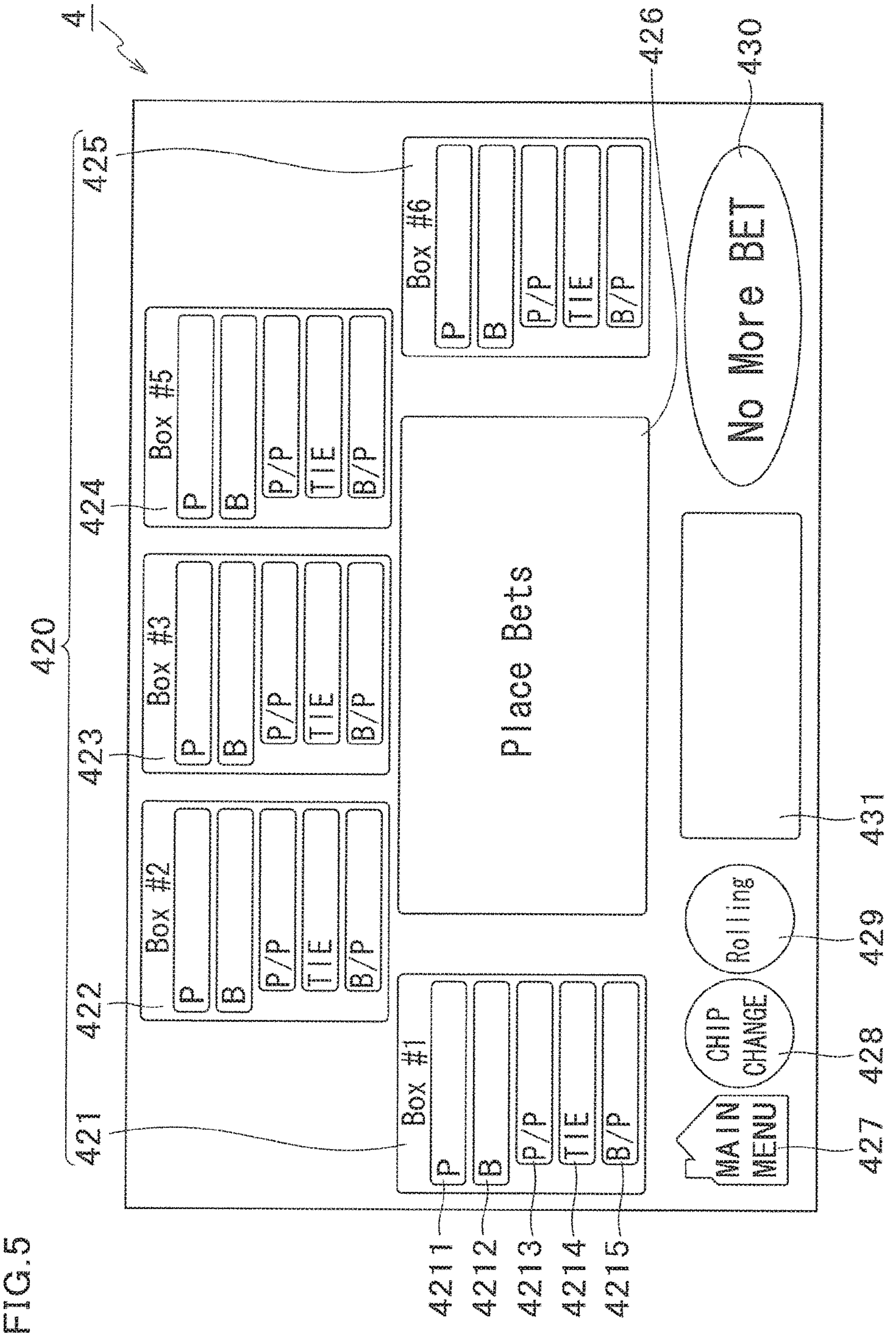
FIG. 5 an example of image display on the dealer display.

FIG. 5 shows an initial state of the bet screen. As shown in FIG. 5, the bet screen displays the above-described five bet display areas 421, 422, 423, 424, and 425. To be more specific, each bet display area 420 (bet display areas 421, 422, 423, 424, and 425) is provided with a player bet display area 4211, a banker bet display area 4212, a player pair bet display area 4213, a tie bet display area 4214, and a banker pair bet display area 4215. The player bet display area 4211 displays the total value of the gaming media placed in the player area 2102. The banker bet display area 4212 displays the total value of the gaming media placed in the banker area 2101. The player pair bet display area 4213 displays the total value of the gaming media placed in the player pair area 2105. The tie bet display area 4214 displays the total value of the gaming media placed in the tie area 2104. The banker pair bet display area 4215 displays the total value of the gaming media placed in the banker pair area 2103.

In the initial state of the bet screen, gaming media are provided in none of the betting areas 210, and hence the total value is displayed in none of the areas 4211 to 4215 of each bet display area 420. In the initial state, a bet fixation button 430 is displayed. The indicator screen 426 displays "Place Bets", indicating that the current phase is the bet phase.

Figure 6:
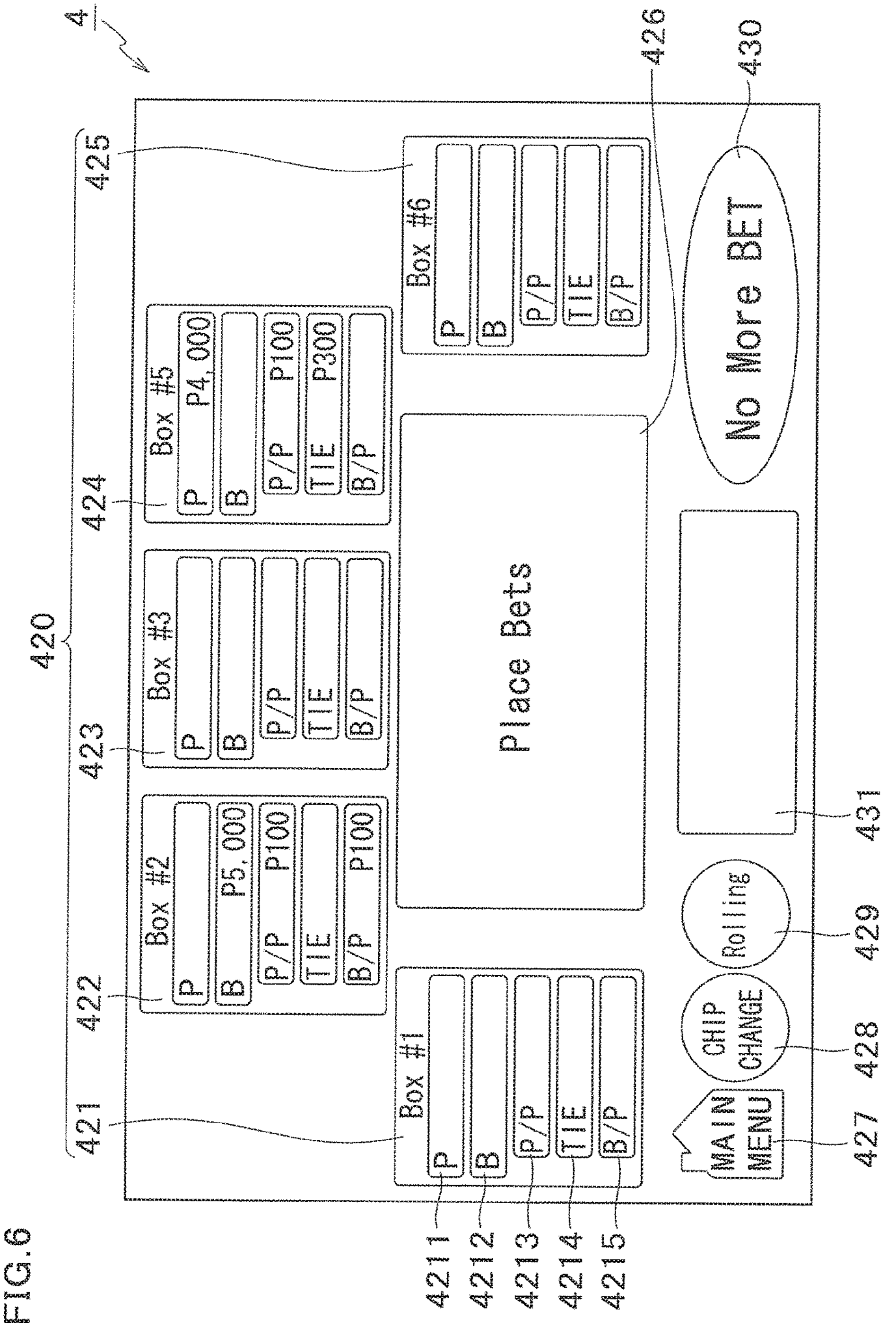
FIG. 6 an example of image display on the dealer display.

FIG. 6 shows the bet screen on the dealer display 4 when bet is placed in the betting area 212 and the betting area 214. As shown in FIG. 6, "P5,000" is displayed in the banker bet display area 4212 of the bet display area 422. This indicates that gaming media equivalent to 5000 PHP (Philippine peso) are placed in the banker area 2101 of the betting area 212. Furthermore, "P100" is displayed in the player pair bet display area 4213 of the bet display area 422, and "P100" is displayed in the banker pair bet display area 4215 of the bet display area 422. This allows the dealer to understand that the gaming media equivalent to 100 PHP are placed in the player pair area 2105 of the betting area 212 and the gaming media equivalent to 100 PHP are placed in the banker pair area 2103 of the betting area 212.

In addition to the above, "P4,000" is displayed in the player bet display area 4211 of the bet display area 424. This makes it possible to understand that the gaming media equivalent to 4000 PHP are placed in the player area 2102 of the betting area 212. Furthermore, "P100" is displayed in the player pair bet display area 4213 of the bet display area 424 and "P100" is displayed in the tie bet display area 4214. This allows the dealer to understand that the gaming media equivalent to 100 PHP are placed in the player pair area 2105 of the betting area 214 and the gaming media equivalent to 100 PHP are placed in the tie area 2104 of the betting area 214.

Figure 7:
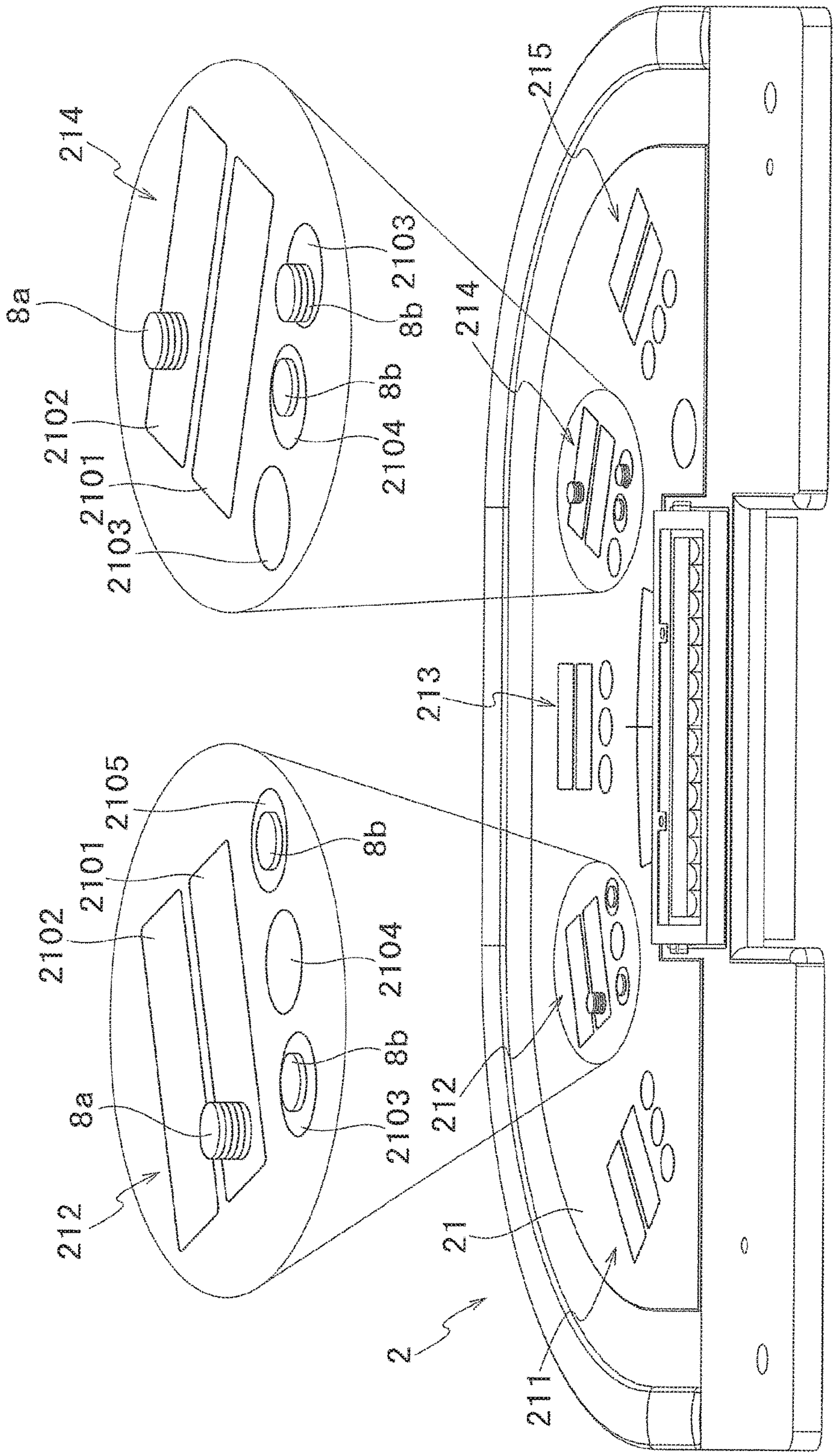
FIG. 7 an example of image display on the dealer display.

FIG. 7 shows the arrangement of gaming media on the game board 21 when the bet screen shown in FIG. 6 is displayed. As shown in FIG. 7, five game chips 8*a* each of which is equivalent to 1000 PHP are placed in the banker area 2101 of the betting area 212. In this way, the participant corresponding to the betting area 212 bets 5000 PHP on the banker. In the banker pair area 2103 of the betting area 212, one game chip 8*b* equivalent to 100 PHP is placed. In this way, the participant corresponding to the betting area 212 bets 100 PHP on the banker pair. In the player pair area 2105 of the betting area 212, one game chip 8*b* equivalent to 100 PHP is placed. In this way, the participant of the betting area 212 bets 100 PHP on the player pair.

In the player area 2102 of the betting area 214, four game chips 8*a* each of which is equivalent to 1000 PHP are placed. In this way, the participant corresponding to the betting area 212 bets 4000 PHP on the banker. In the player pair area 2105 of the betting area 214, one game chip 8*b* equivalent to 100 PHP is placed. In this way, the participant of the betting area 214 bets 100 PHP on the player pair. In the tie area 2104 of the betting area 214, one game chip 8*b* equivalent to 100 PHP is placed. In this way, the participant corresponding to the betting area 214 bets 100 PHP on the tie.

The gaming table system 1 regularly detects gaming media placed in the bet object area 2100. The bet placed on the game board 21 by a participant is regularly reflected to the screen on the dealer display 4.

As such, the dealer is able to understand which participant places what bet amount on which bet object on the game board 21, by checking the dealer display 4.

The gaming table system 1 may have a function of notifying that the bet by a participant exceeds a predetermined limit. To be more specific, when a difference between a value of gaming media placed in the banker area 2101 and a value of gaming media placed in the player area 2102 is equal to or larger than a predetermined amount, a message (e.g., "Out of bet range") indicating that the bet is out of range may be displayed on the indicator screen 426 and the number displayed in the bet object area 2100 where the difference is equal to or lager than the predetermined amount may be highlighted (e.g., blinked). This message is withdrawn when the control unit 3 recognizes that the difference equal to or larger than the predetermined amount is resolved. As such, the dealer is able to understand that the bet by the participant exceeds the limit by checking the dealer display 4.

When an area where the bet fixation button 430 of the dealer display 4 is touched, the bet is fixed. That is to say, the gaming table system 1 performs the scanning process for each betting area 210 when the bet fixation button 430 is touched (i.e., at the timing to fix the bet). The gaming table system 1 stores, for the bet object area 2100 of each betting area 210, the state of gaming media placed in the bet object area 2100, and fixes this state as the bet of the participant. The amount of gaming media to be collected and the amount of gaming media to be paid to the participant are therefore determined based on this bet.

Figure 8:
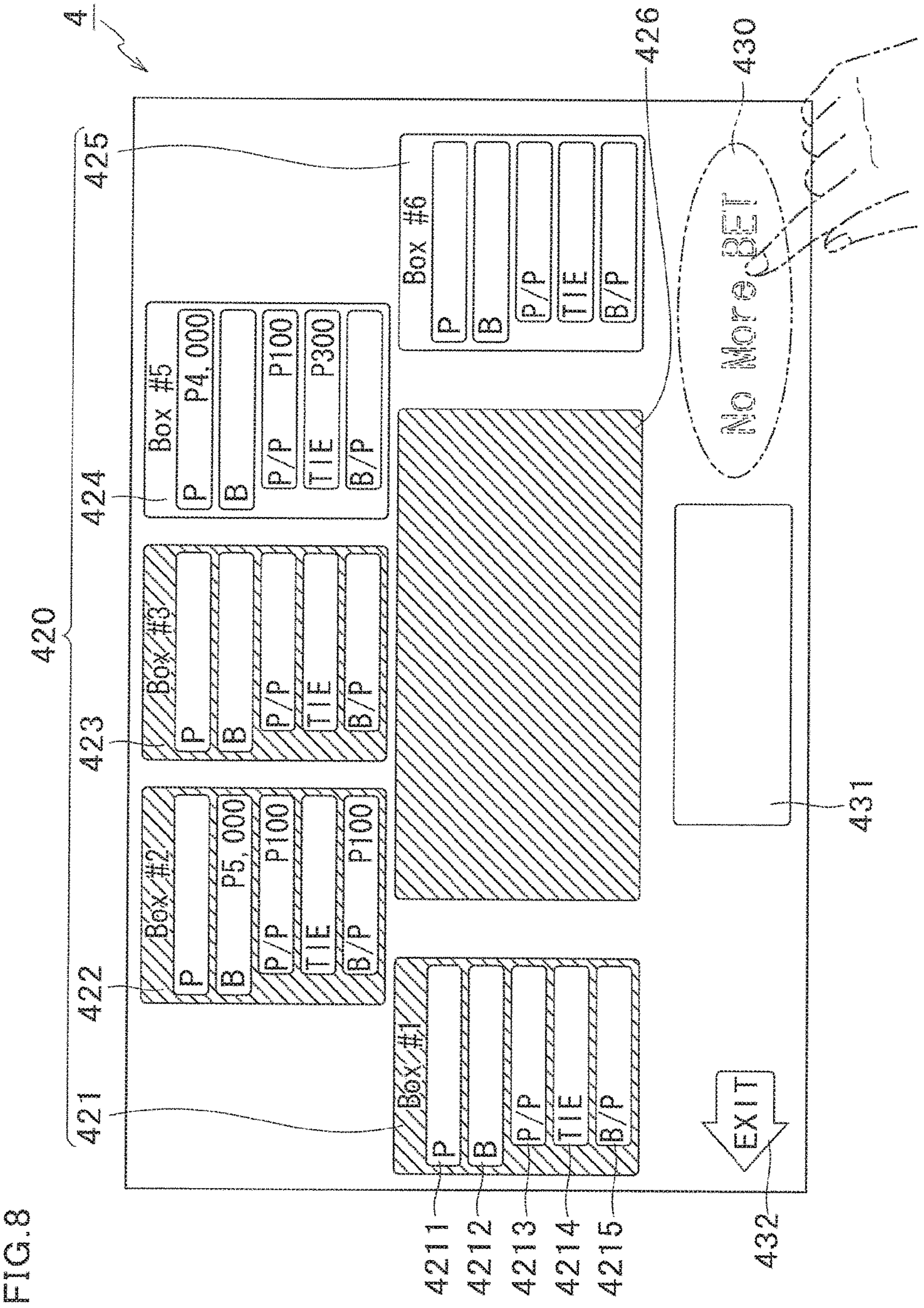
FIG. 8 an example of image display on the dealer display.

As shown in FIG. 8, when the bet fixation button 430 is touched, the bet fixation button 430 disappears and the background color of the indicator screen 426 is changed (e.g., from silver to blue). Furthermore, the message on the indicator screen 426 disappears. Each bet display area 420 is changed in the background color (e.g., from silver to blue) once the bet therefore is fixed. FIG. 8 show a state in which the bet has been fixed for the bet display areas 421, 422, and 423, whereas the bet has not been fixed for the bet display areas 424 and 425. When the background colors of all bet display areas 420 are changed in the dealer display 4, the bet phase ends. As such, the gaming table system 1 fixes the first bet amount of each betting area 210 at the end of the bet phase. To be more specific, the first bet amount is a value of gaming media in the bet object area 2100 in each betting area 210 at a bet fixation timing. The target of fixation of the bet includes not only a betting area 210 in which a gaming medium is placed but also a betting area 210 in which no gaming medium is placed.

(Gaming Table System 1: Dealer Display 4: Bet Monitoring Screen)

As the bet phase ends, the gaming table system 1 starts the bet monitoring phase. In the bet monitoring phase, the gaming table system 1 monitors gaming media betted on the game board 21 by the participants, and does not allow the shift to the next phase when there is a change in the bet.

Figure 9:
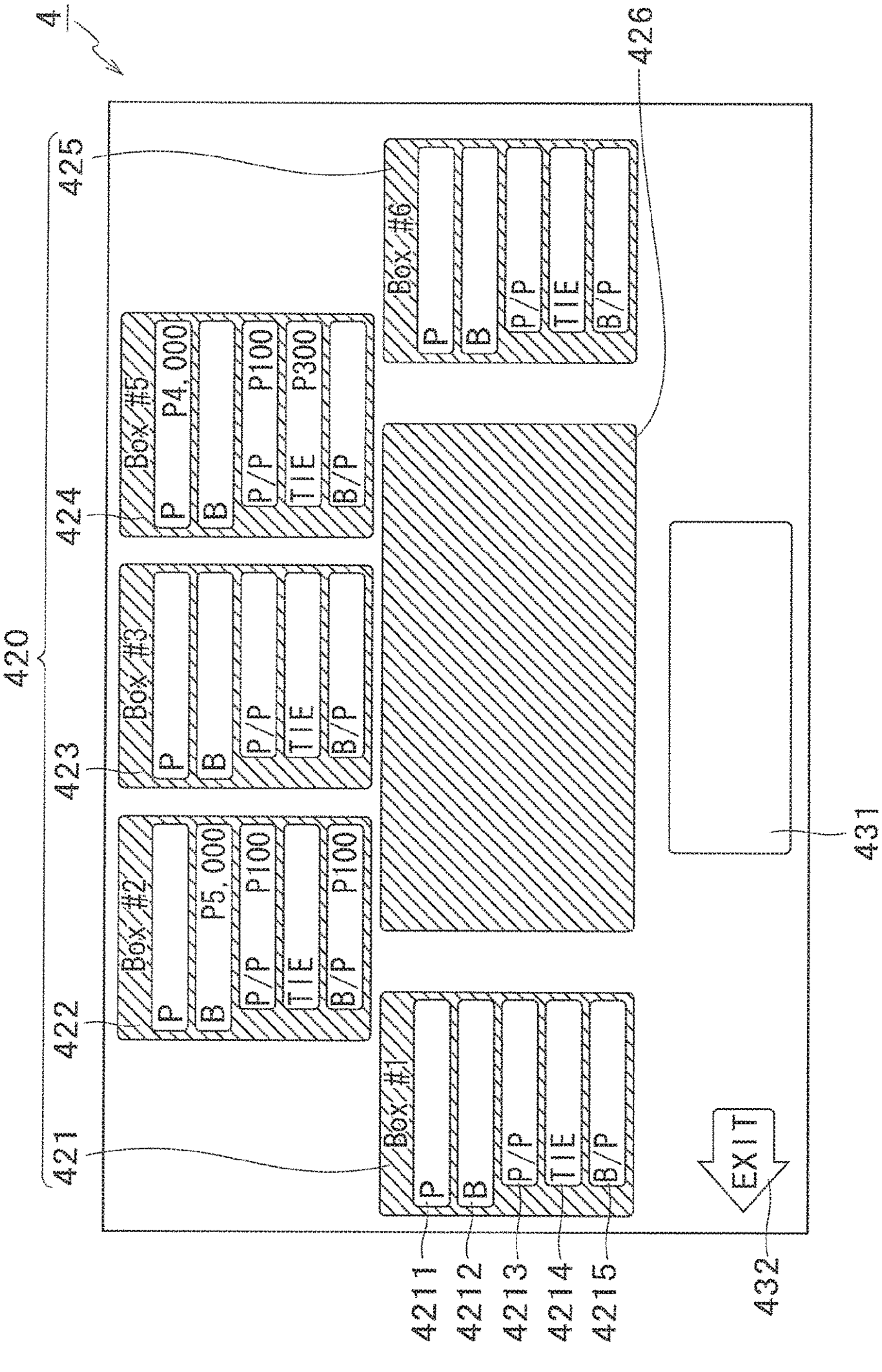
FIG. 9 an example of image display on the dealer display.

As shown in FIG. 9, in the bet monitoring phase, in a bet monitoring screen displayed on the dealer display 4, the main menu button 427, the chip change button 428, and the rolling button 429 are not displayed. Then the EXIT button 432 is displayed. As the background colors of all bet display areas 420 are changed, the dealer recognizes that the bets of the participants are fixed and the bet monitoring phase has started.

During the bet monitoring phase, the gaming table system 1 repeats the scanning process. That is to say, the gaming table system 1 detects gaming media placed in each bet object area 2100 of each betting area 210 by executing the scanning process, and fixes the second bet amount in each betting area 210. The second bet amount is a value indicated by gaming media in each bet object area 2100 of each betting area 210 at a timing after the bet fixation timing. The second bet amount is updated each time the scanning process is executed in the bet monitoring phase. In the bet monitoring phase, the gaming table system 1 compares the second bet amount with the stored first bet amount each time the second bet amount is fixed. When the first bet amount is different from the second bet amount, the gaming table system 1 displays the difference on the dealer display 4. An example of the image display on the display 4 when the second bet amount is different from the first bet amount is specifically shown below.

For example, in the state of the bet shown in FIG. 7, five game chips 8*a* each equivalent to 1000 PHP are placed in the banker area 2101 of the betting area 212. When the five game chips 8*a* each equivalent to 1000 PHP are removed from the banker area 2101 of the betting area 212, the display 4 displays information indicating that the gaming media equivalent to 5000 PHP have been removed.

Figure 10:
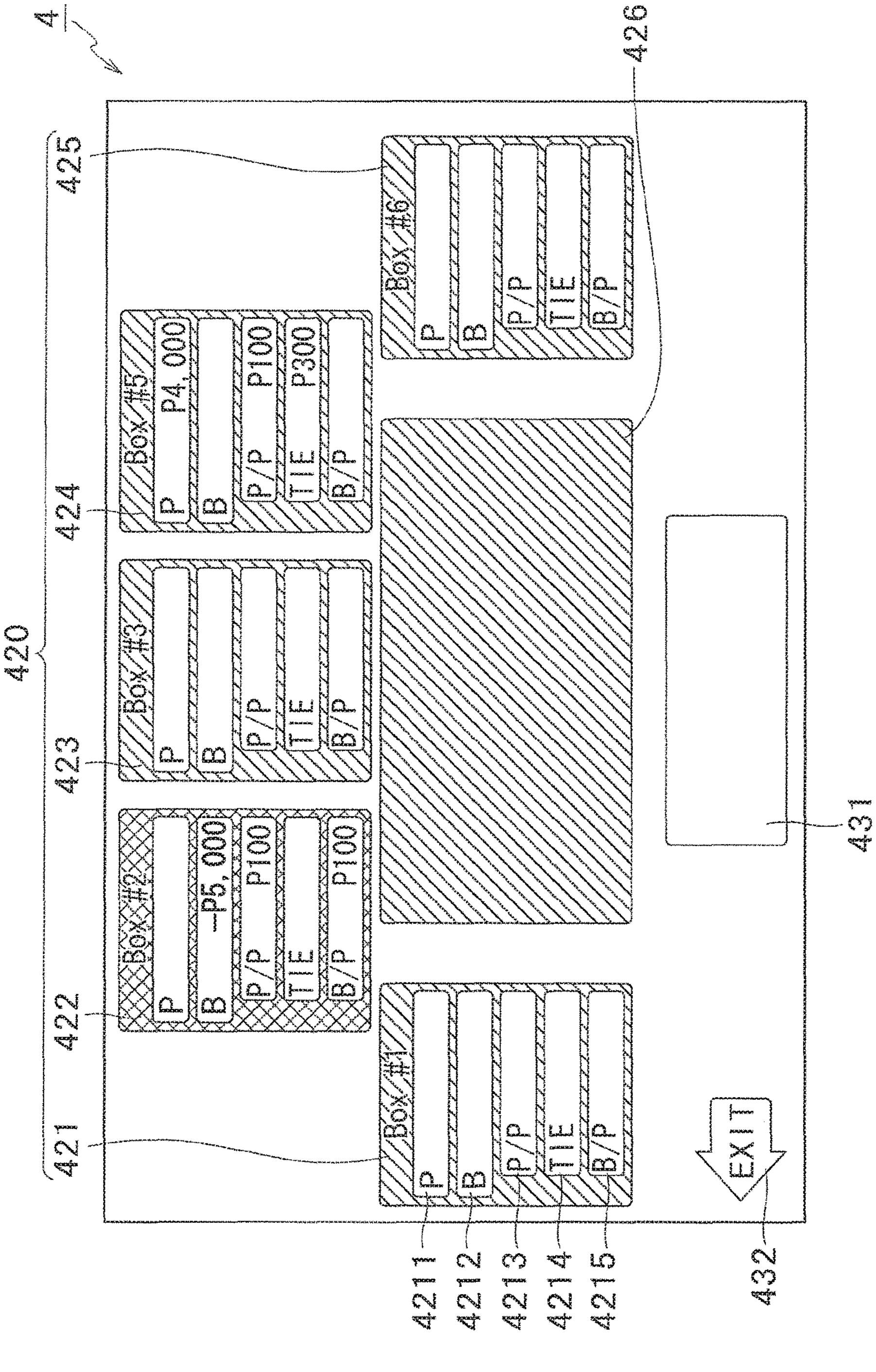
FIG. 10 an example of image display on the dealer display.

To be more specific, as shown in FIG. 10, on the display 4, the background color of the bet display area 422 corresponding to the betting area 212 is changed (e.g., from blue to red). Then "−5000 PHP" is highlighted in the banker bet display area 4212 corresponding to the banker area 2101 (e.g., colored in red and blinks) in the bet display area 422.

Figure 11:
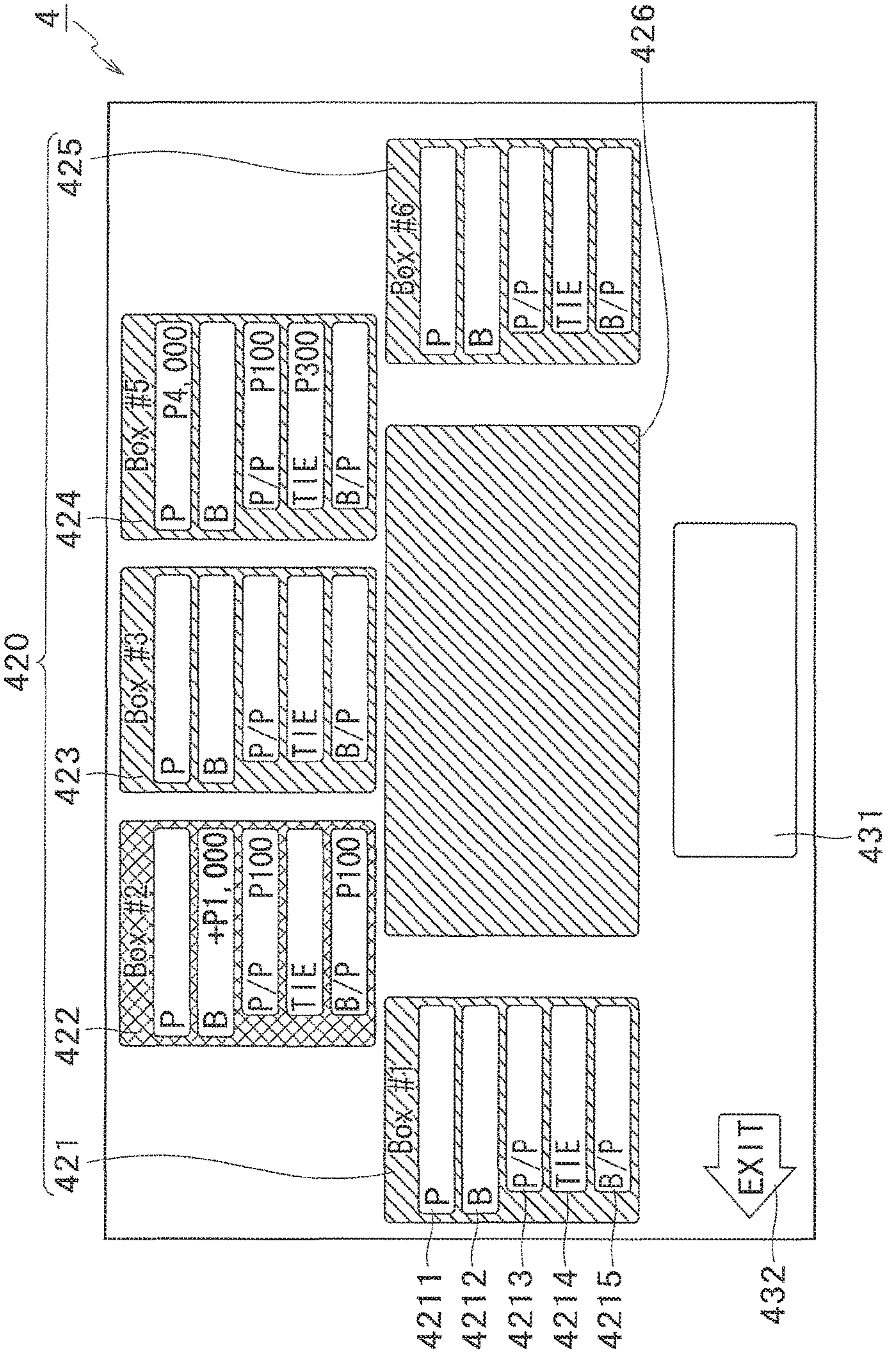
FIG. 11 an example of image display on the dealer display.

When, as shown in FIG. 11, one game chip 8*a* equivalent to 1000 PHP is added to the betting area 212, the background color of the bet display area 422 corresponding to the betting area 212 is changed. In the bet display area 422, "+1000 PHP" is highlighted in the banker bet display area 4212 corresponding to the banker area 2101.

Figure 12:
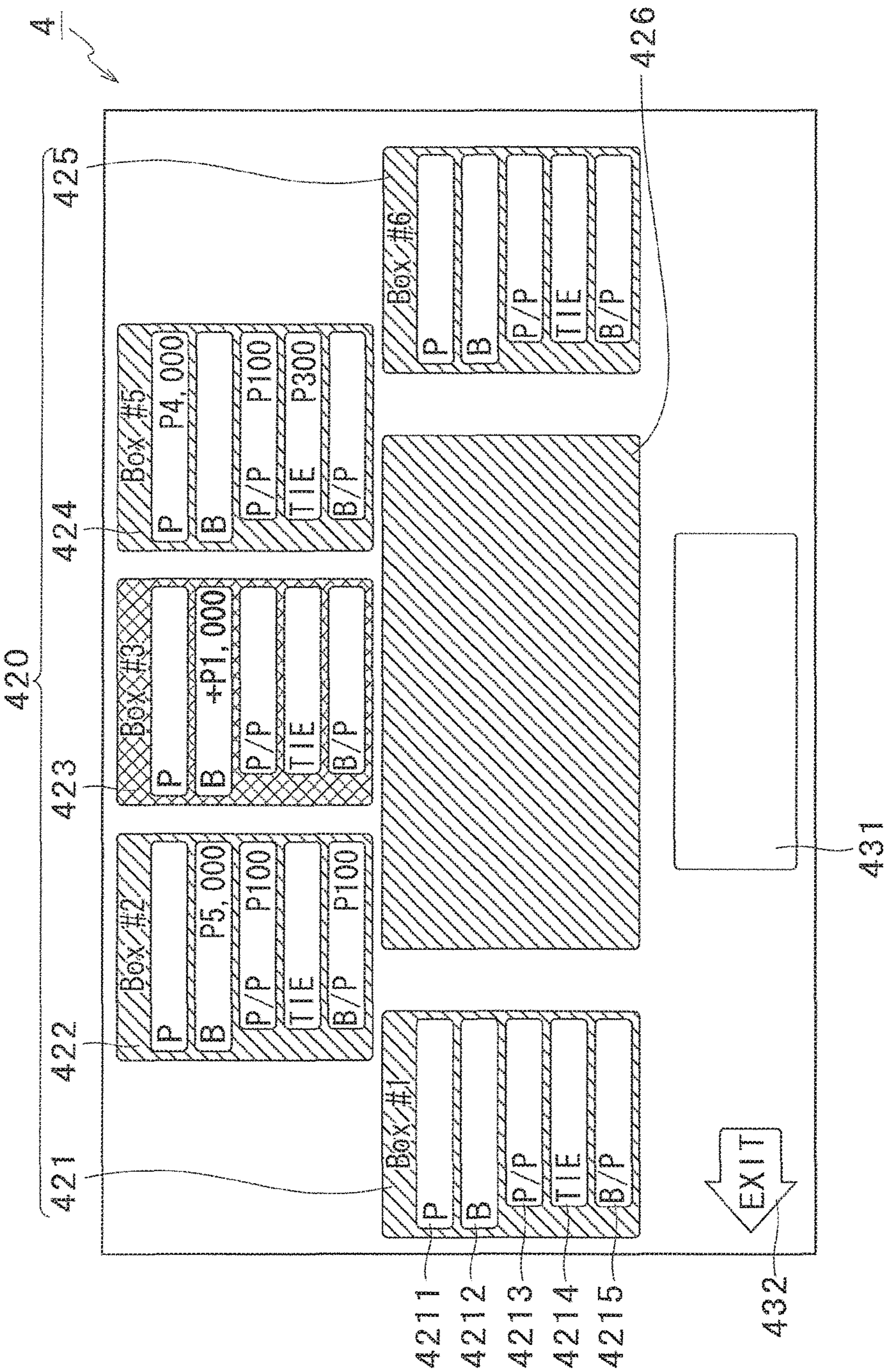
FIG. 12 an example of image display on the dealer display.

When, as shown in FIG. 12, one game chip 8*a* equivalent to 1000 PHP is added to the banker area 2101 of the betting area 213 where no gaming medium is placed, the background color of the bet display area 423 corresponding to the betting area 213 is changed. Then, in the bet display area 423, "+1000 PHP" is highlighted in the banker bet display area 4212 corresponding to the banker area 2101.

As such, when there is a betting area 210 in which the first bet amount is different from the second bet amount, the background color of the bet display area 420 corresponding to this betting area 210 is changed. Furthermore, the result of subtracting the first bet amount from the second bet amount is displayed in the bet object area 2100 in which the first bet amount is different from the second bet amount. This allows the dealer to easily understand in what manner the gaming media placed on the game board 21 as the bet have been changed.

Figure 13:
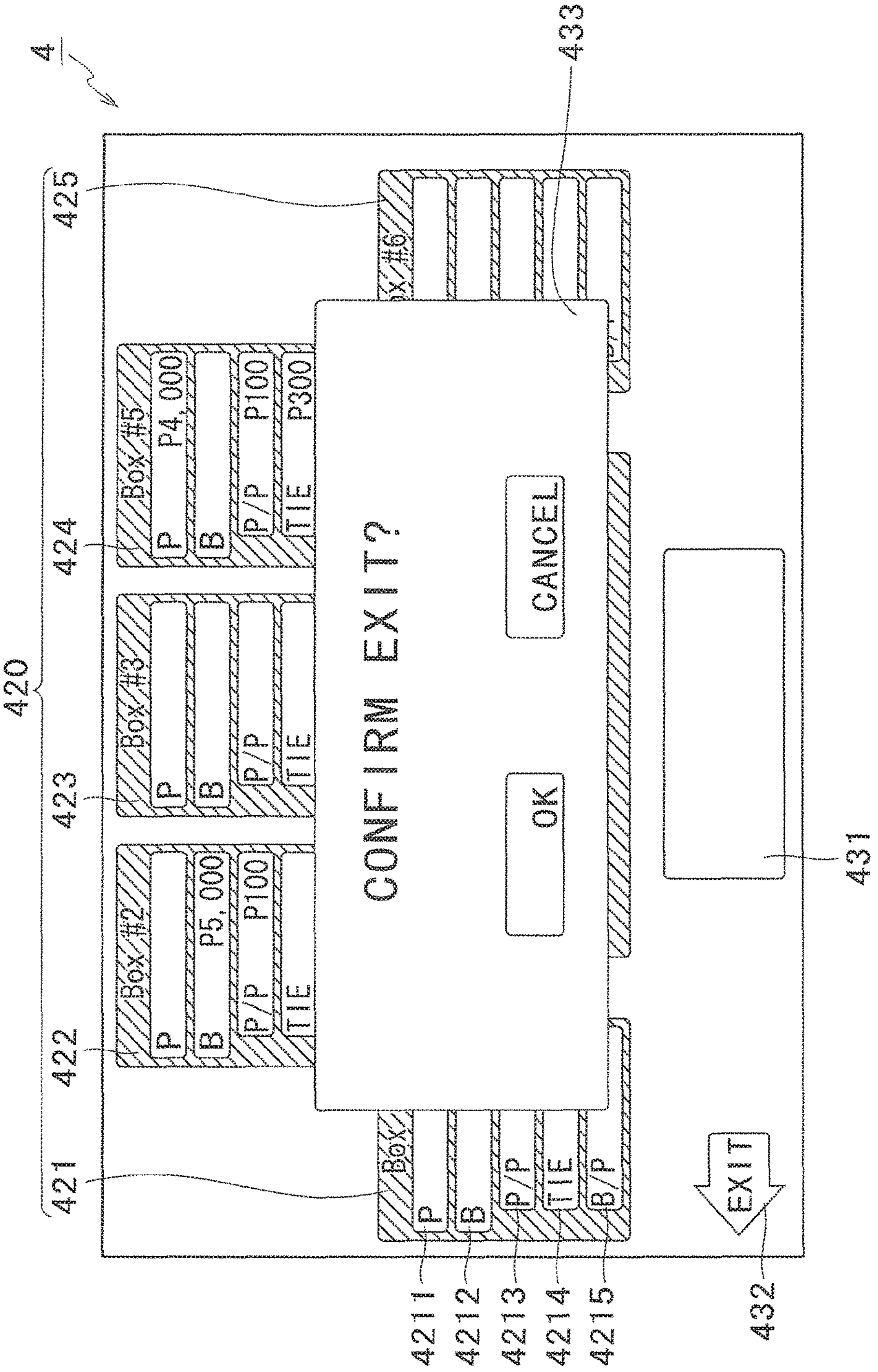
FIG. 13 an example of image display on the dealer display.

In addition to the above, as shown in FIG. 13, a confirmation dialog 433 is displayed when the EXIT button 432 is touched. All fixed bets are canceled when OK is touched, and the process returns to the bet phase. The bet monitoring phase is continued when CANCEL is touched.

Figure 14:
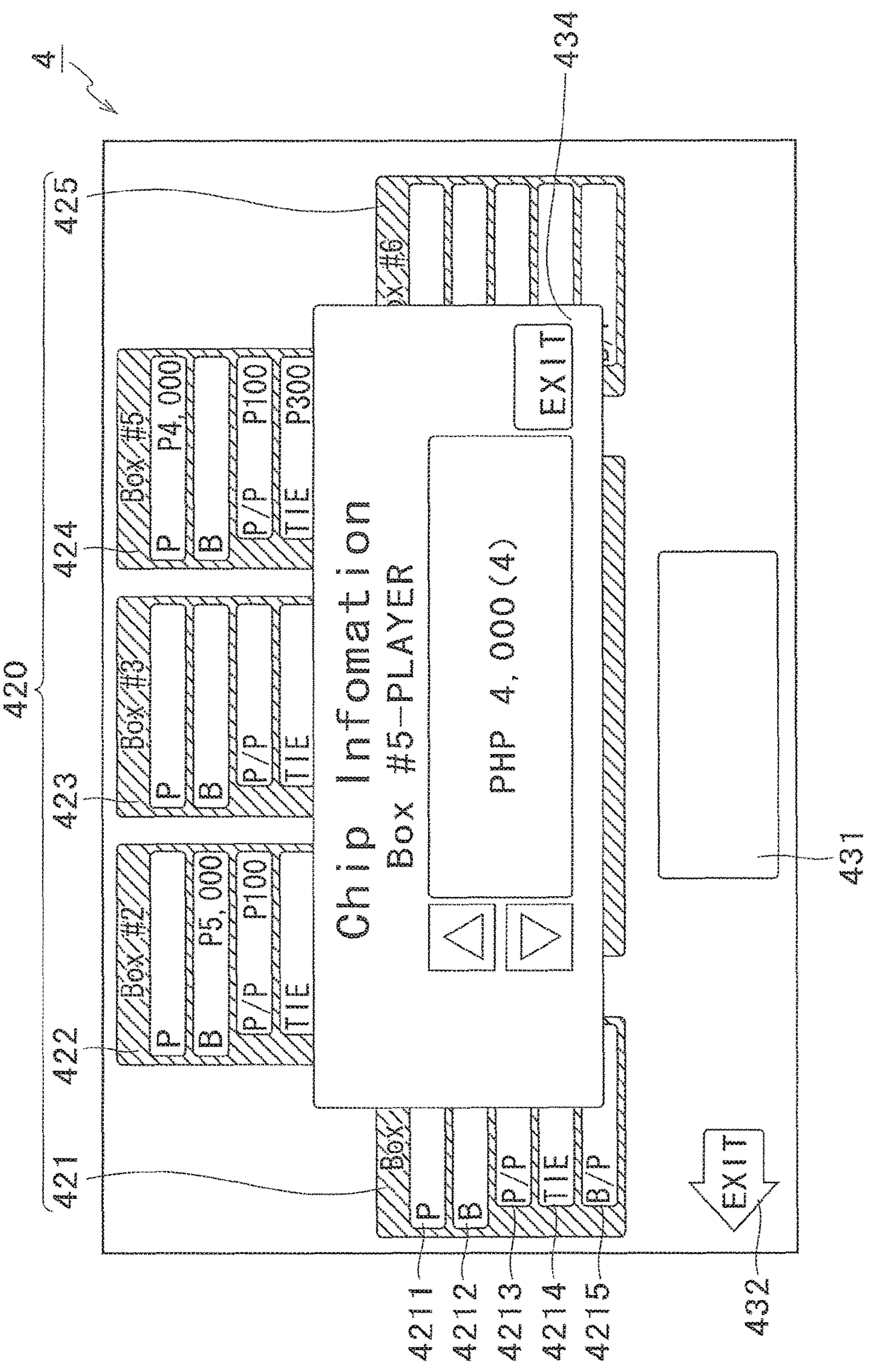
FIG. 14 an example of image display on the dealer display.

As shown in FIG. 14, when one of the bet display areas 420 is touched, a bet detail window 434 of the touched bet display area 420 is displayed. The detail window 434 displays the total amount of money and the number of gaming media for the bet object areas 2100 one by one.

In this bet monitoring phase, the dealer progresses the game by repeatedly taking out the cards from the card shoe 5. The gaming table system 1 fixes the game result based on the contents of the cards read by the card shoe 5 and ends the bet monitoring phase. In a state that the fixed bet has been changed as shown in FIGS. 10 to 12, the gaming table system 1 does not allow the bet monitoring phase to end. To put it differently, the gaming table system 1 fixes the game result on condition that the first bet amount is identical with the second bet amount, and ends the bet monitoring phase.

(Gaming Table System 1: Dealer Display 4: Collection Screen)

As the bet monitoring phase ends, the gaming table system 1 starts the collection phase. In the collection phase, the gaming table system 1 specifies the bet object area 2100 in which gaming media to be collected are placed, based on the game result, and displays the specified bet object area 2100 on the dealer display 4. To put it differently, the gaming table system 1 determines a result of win/loss of the bet object area 2100 of each betting area 210 based on the game result, and displays, on the dealer display 4, an object area 2100 in which gaming media are placed and the result is loss.

Figure 15:
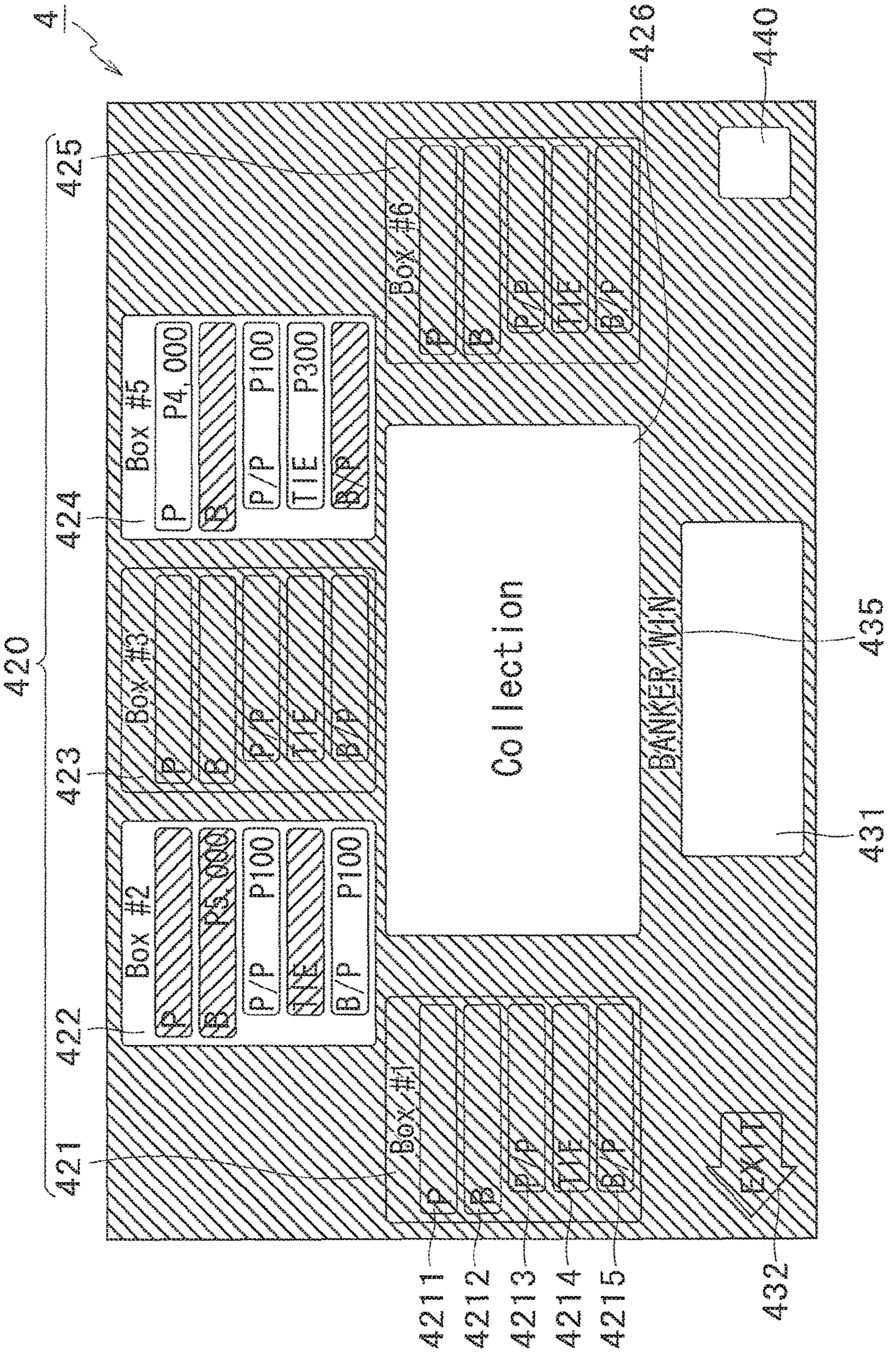
FIG. 15 an example of image display on the dealer display.

As shown in FIG. 15, on the dealer display 4, the bet display area 420 corresponding to the betting area 210 in which gaming media to be collected are placed is highlighted. Furthermore, areas 4211 to 4215 corresponding to the bet object area 2100 in which the gaming media to be collected are placed in the betting area 210 are highlighted. For example, the background color of the areas 4211 to 4215 corresponding to the bet object area 2100 in which the gaming media to be collected are placed is changed to blue. Furthermore, the background color of the bet display area 420 corresponding to the betting area 210 including the bet object area 2100 in which the gaming media to be collected are placed is changed to gold. The other areas are grayed out. This allows the dealer to easily understand the bet object area 2100 in which the gaming media to be collected are placed.

The indicator screen 426 displays a message "Collection" to indicate that the current phase is the collection phase. In an area between the indicator screen 426 and the message screen 431, a game result is displayed as, for example, "BANKER WIN". In the collection screen, a tool button 440 is displayed at a lower right part.

When the gaming table system 1 does not correctly read gaming media betted by the participant, it can be corrected in the collection phase. That is to say, when the antenna member 22 did not properly read gaming media, e.g., the gaming table system 1 recognized only 4000 PHP even if the participant placed gaming media equivalent to 5000 PHP in the player area 2102, the dealer carries out correction as below.

Figure 16:
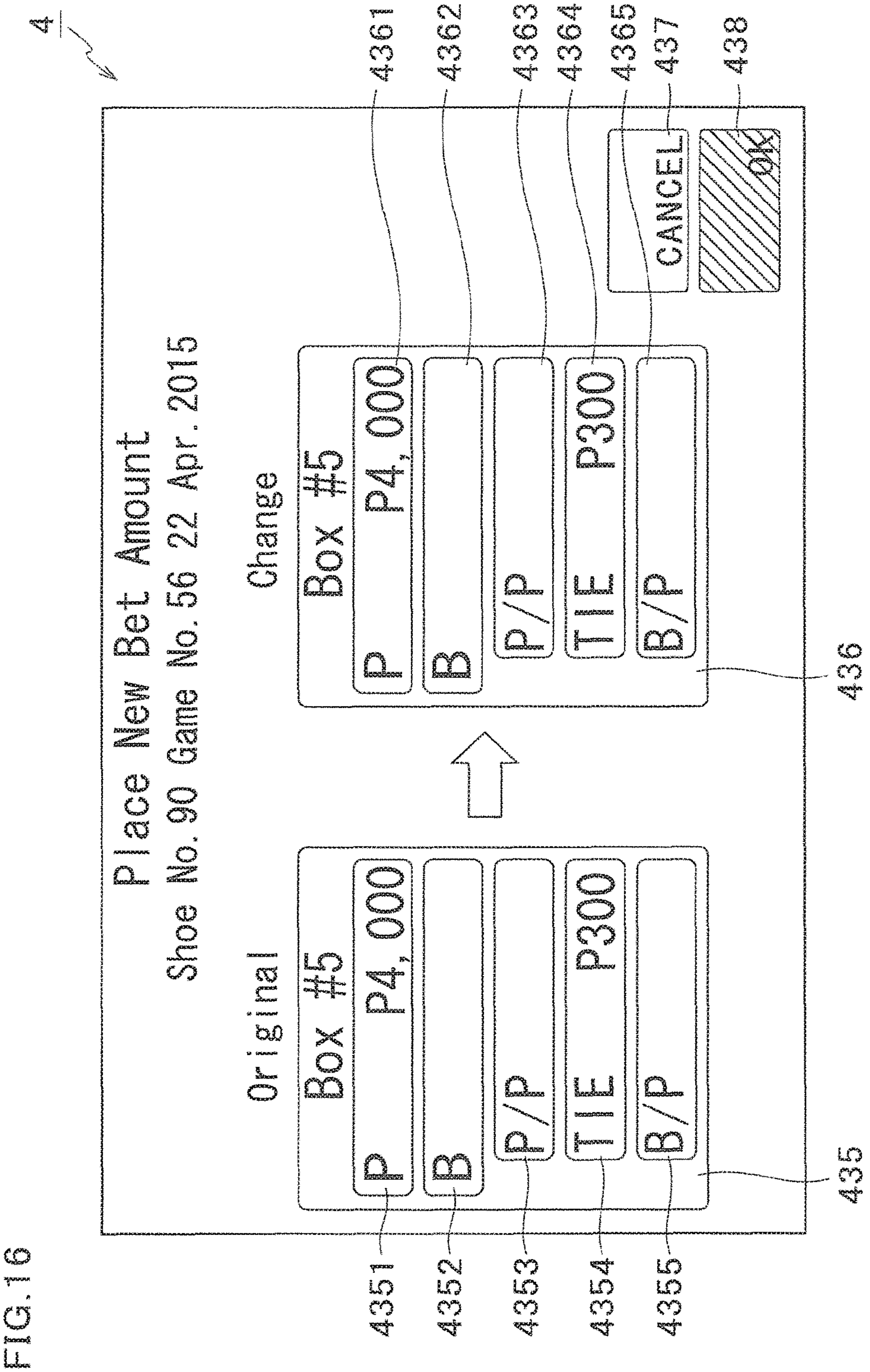
FIG. 16 an example of image display on the dealer display.

As shown in FIG. 16, when the dealer touches a bet display area 420 to be corrected, a correction screen is displayed. The correction screen displays an original area 435 where information of currently-read gaming media is displayed on the left side and a change area 436 where information of gaming media after the correction is displayed. Each of the original area 435 and the change area 436 includes five areas corresponding to the areas 4211 to 4215, respectively.

To be more specific, the original area 435 includes a player bet display area 4351 corresponding to the player bet display area 4211, a banker bet display area 4352 corresponding to the banker bet display area 4212, a player pair bet display area 4353 corresponding to the player pair bet display area 4213, a tie bet display area 4354 corresponding to the tie bet display area 4214, and a banker pair bet display area 4355 corresponding to the banker pair bet display area 4215.

The change area 436 includes a player bet display area 4361 corresponding to the player bet display area 4211, a banker bet display area 4362 corresponding to the banker bet display area 4212, a player pair bet display area 4363 corresponding to the player pair bet display area 4213, a tie bet display area 4364 corresponding to the tie bet display area 4214, and a banker pair bet display area 4365 corresponding to the banker pair bet display area 4215.

In this correction screen, the gaming table system 1 drives only the antenna provided for the betting area 210 corresponding to the touched bet display area 420 among the antennas of the antenna member 22, and repeatedly performs the scanning process for scanning the bet on that betting area 210. That is to say, the dealer is able to correct the information of the gaming media having already read, by touching the bet display area 420 corresponding to the betting area 210 to be corrected, so as to place gaming media in that betting area 210 again. In the correction screen, the cancellation button 437 for canceling the correction and the OK button 438 for finalizing the correction are displayed in a lower right part. In the initial state, only the cancellation button 437 is valid.

Figure 17:
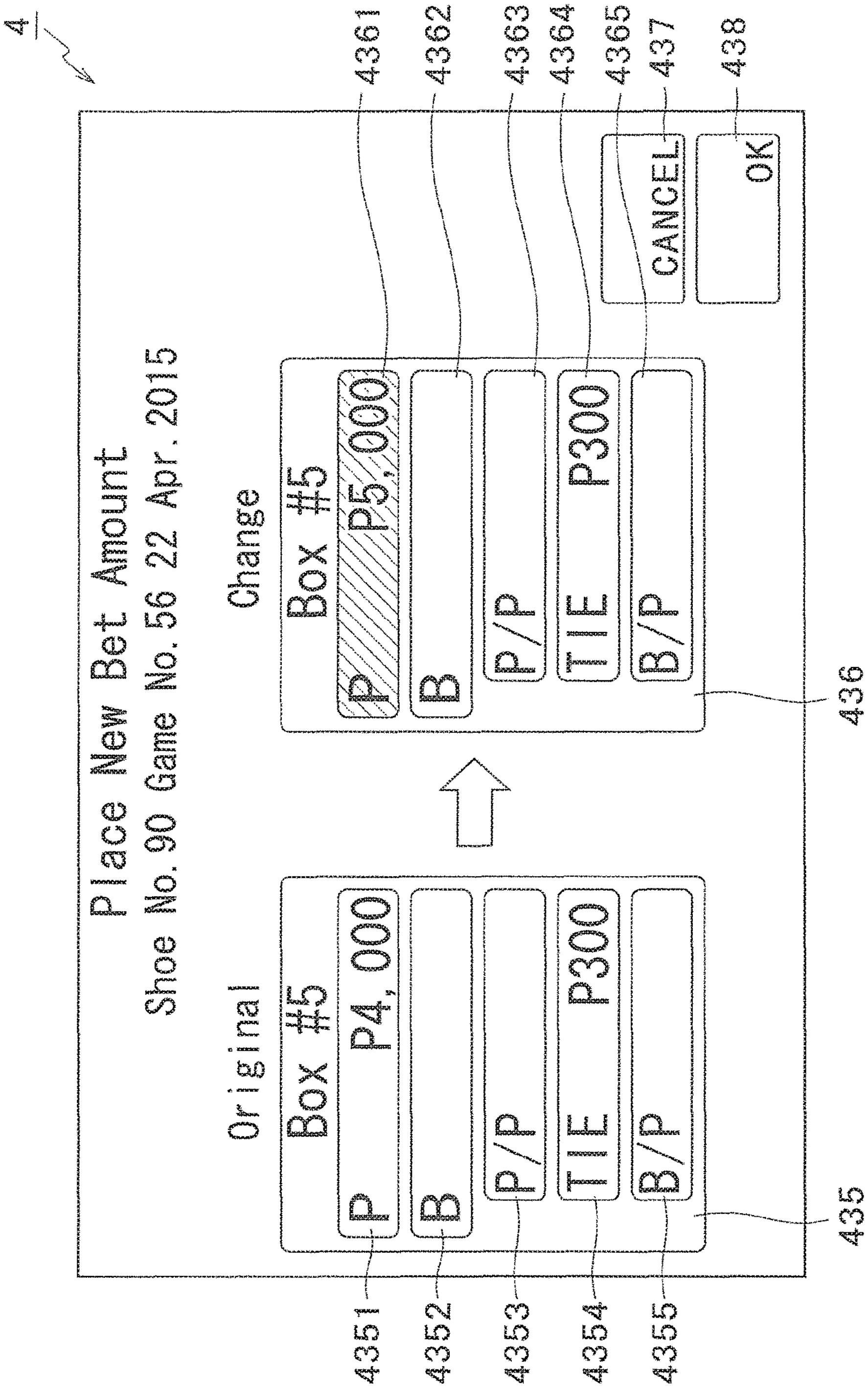
FIG. 17 an example of image display on the dealer display.

As shown in FIG. 17, when gaming media are correctly read in the correction screen, areas 4361 to 4365 corresponding to the bet object area 2100 having been changed are highlighted. When highlighting is performed, the OK button 438 is activated and the correction is finalized as it is touched. When the OK button 438 is touched, the collection screen shown in FIG. 15 appears again while the correction is reflected.

When the collection screen is displayed, the gaming table system 1 repeatedly executes the scanning process for the betting area 210. With this, the gaming table system 1 monitors if gaming media to be collected are properly collected.

Figure 18:
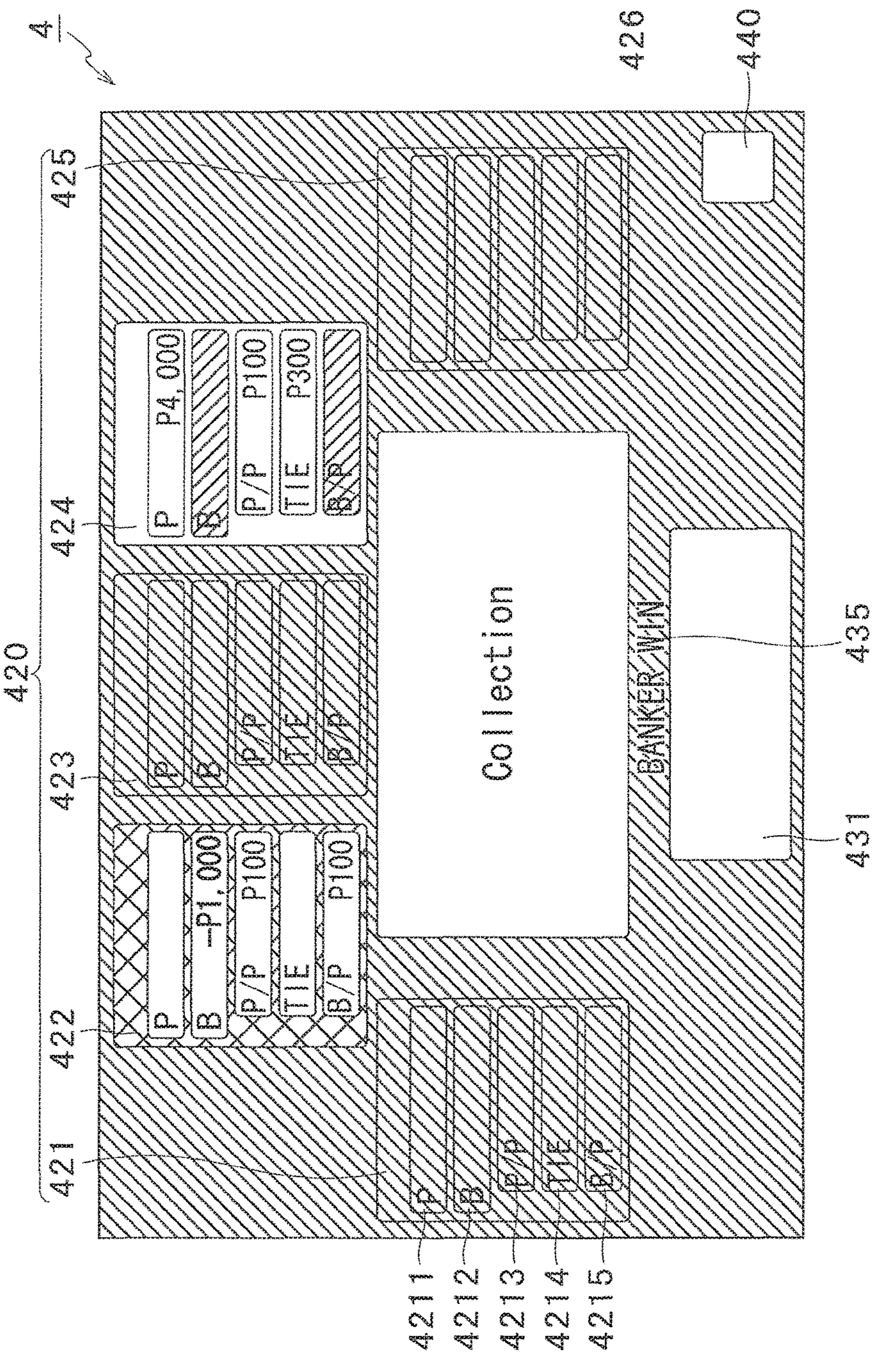
FIG. 18 an example of image display on the dealer display.

For example, when gaming media in the bet object area 2100 which has achieved win are erroneously collected, this bet object area 2100 is highlighted as shown in FIG. 18. For example, when the dealer erroneously collects gaming media placed in the banker area 2101 of the betting area 212, the value of the erroneously collected gaming media is displayed as a negative number in the banker bet display area 4212 of the bet display area 422. When, in the collection phase, gaming media are erroneously added to the betting area 210, the added value is displayed as a positive number, in a similarly highlighted manner.

Figure 19:
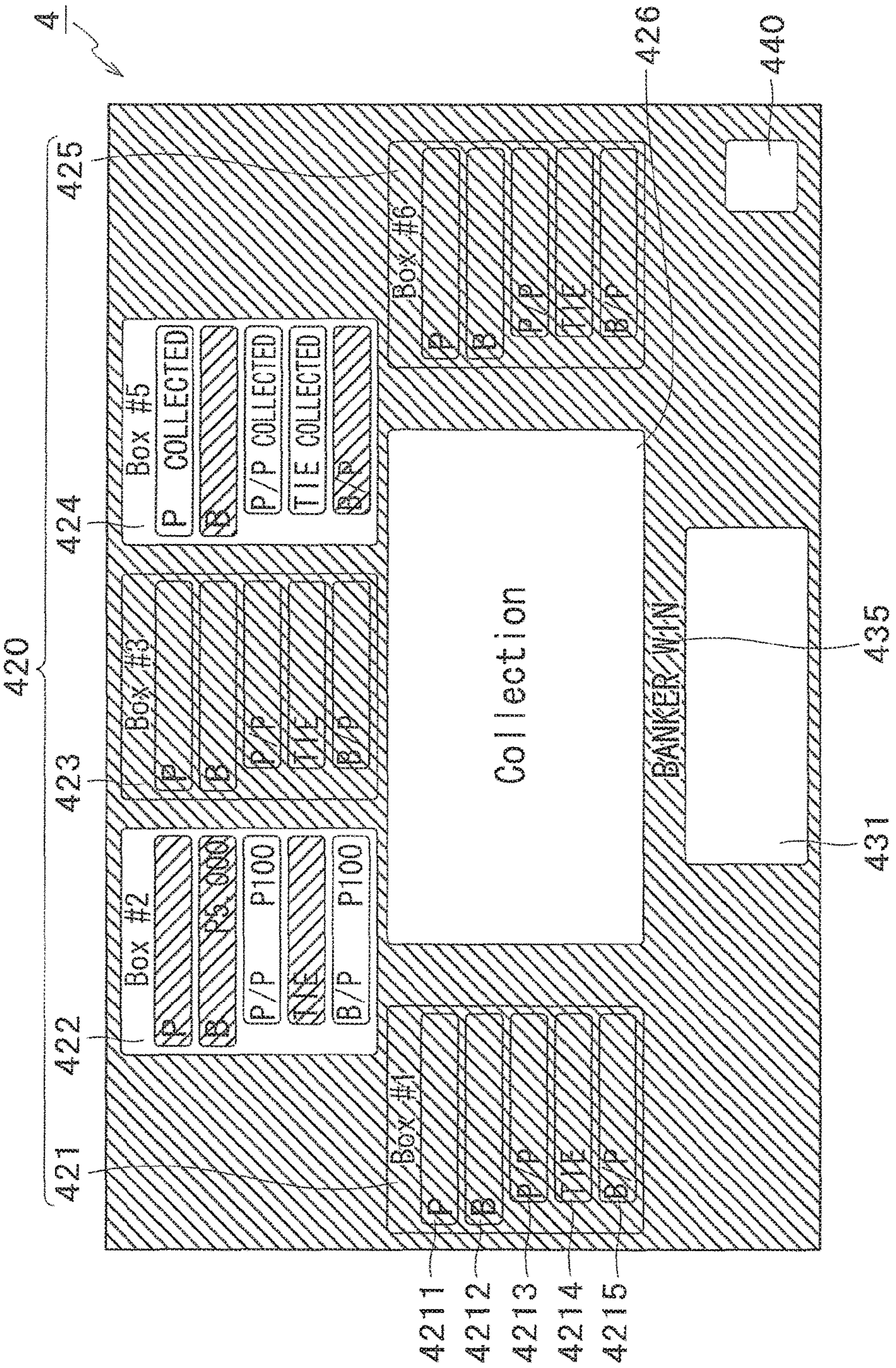
FIG. 19 an example of image display on the dealer display.

As shown in FIG. 19, when gaming media placed in the bet object area 2100 to be collected are removed, the dealer display 4 displays a message "COLLECTED" in areas 4211 to 4215 corresponding to the bet object area 2100 from which the gaming media are collected. This indicates that the gaming media have been removed from that bet object area 2100.

Figure 20:
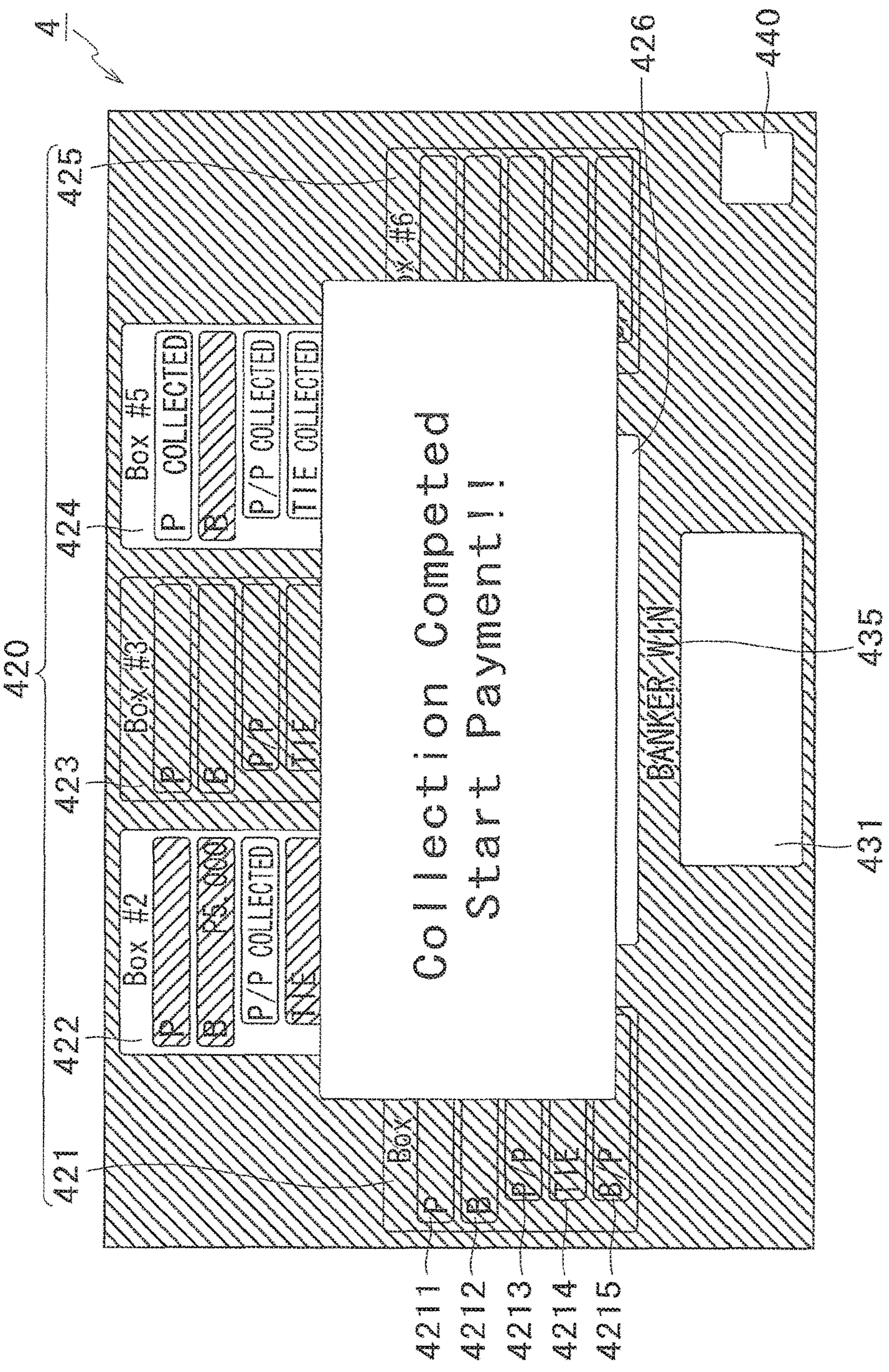
FIG. 20 an example of image display on the dealer display.

As shown in FIG. 20, when all gaming media placed in the bet object area 2100 to be collected are removed, the dealer display 4 displays a message "Collection Completed" to indicate that the collection has been completed. Furthermore, the dealer display 4 displays a message "Start Payment" to indicate that payment starts next. As such, the gaming table system 1 confirms that the collection has been properly done by executing the scanning process, and completes the collection phase.

Figure 21:
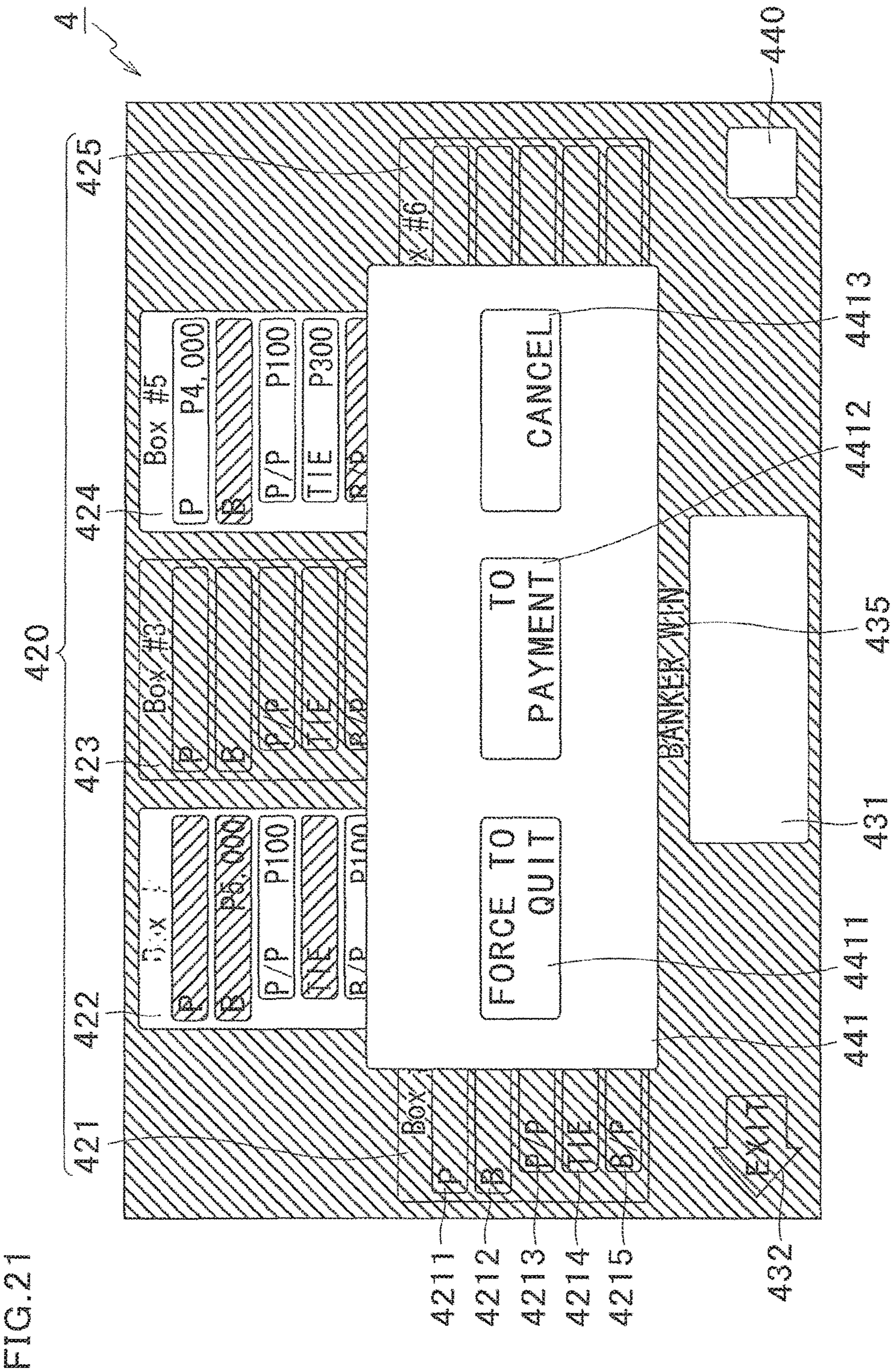
FIG. 21 an example of image display on the dealer display.

As shown in FIG. 21, a tool window 441 is displayed when the tool button 440 is touched. The tool window 441 displays a forcible stop button 4411, a skip button 4412, and a cancellation button 4413. The current game is terminated and the process returns to the bet phase when the forcible stop button 4411 is touched. When the skip button 4412 is touched, the process proceeds to the next payment phase as the collection has been properly done. The collection phase is continued when the cancellation button 4413 is touched.

(Gaming Table System 1: Dealer Display 4: Payment Screen)

As the collection phase ends, the gaming table system 1 starts the payment phase. In the payment phase, the gaming table system 1 specifies the bet object area 2100 in which gaming media are placed and for which payment must be done, based on the game result, and displays the specified bet object area 2100 on the dealer display 4. To put it differently, the gaming table system 1 determines a result of win/loss of the bet object area 2100 of each betting area 210 based on the game result, and displays, on the dealer display 4, a bet object area 2100 in which gaming media are placed and the result is win.

Figure 22:
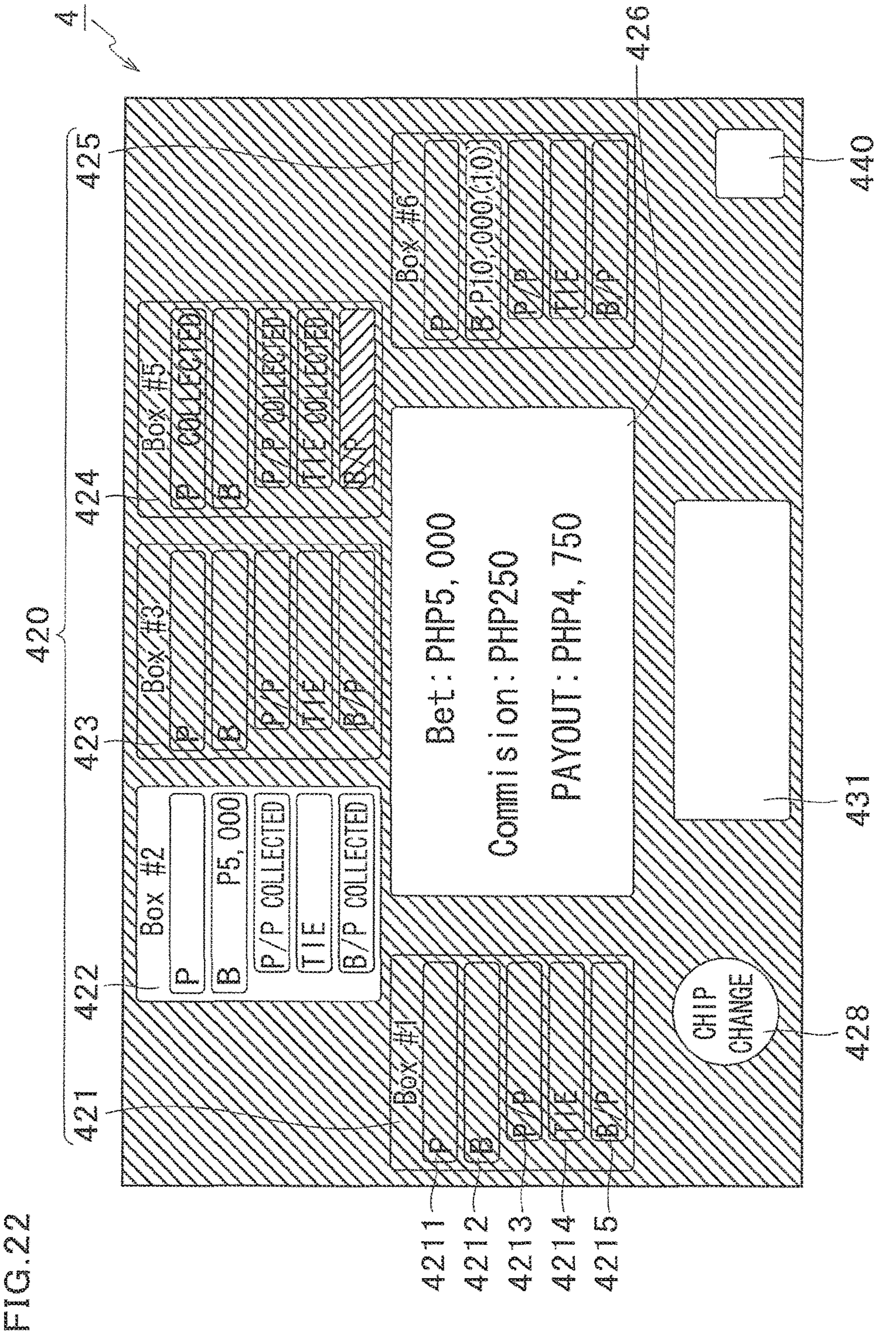
FIG. 22 an example of image display on the dealer display.

As shown in FIG. 22, when there are plural winning participants, payment is carried out for these participants one by one. In the example shown in FIG. 22, the participant betting on the betting area 212 and the participant betting on the betting area 215 are winners, and the payment for the betting area 212 is displayed first. To be more specific, in the payment screen, the bet display area 422 for which the payment is displayed is highlighted. Furthermore, the bet amount of the bet display area 425 corresponding to the area 215 for which the payment has not been completed is highlighted. The indicator screen 426 displays the total bet amount of the object area 2100 achieving win in the betting area 212, a commission amount, and a payment amount. The commission amount is 5% of the payment amount in the present embodiment, and is subtracted from the payment amount in case of the winning of the banker.

Figure 23:
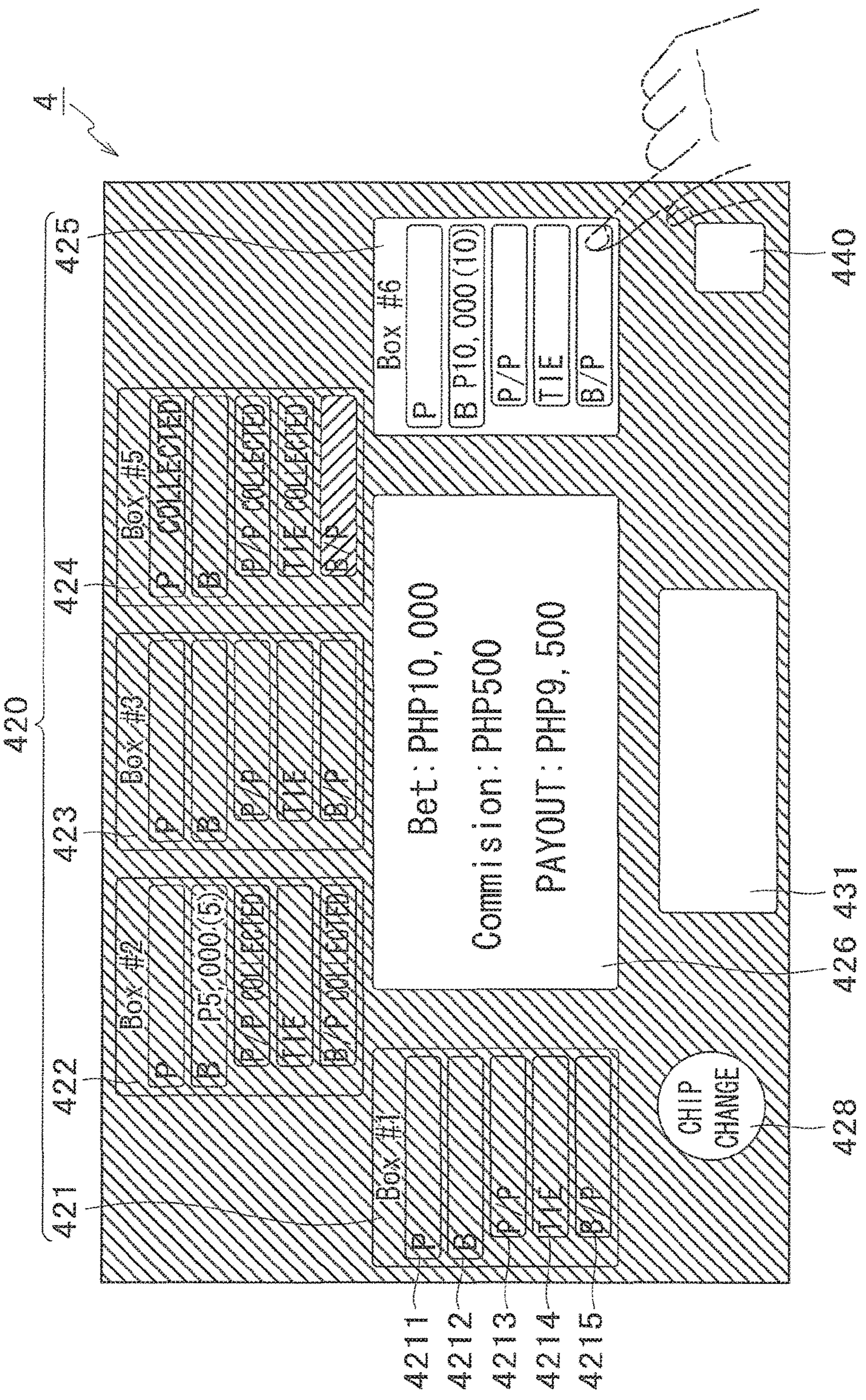
FIG. 23 an example of image display on the dealer display.

As shown in FIG. 23, the order of payment can be optionally set by the dealer. To be more specific, as the dealer touches a bet display area 420 for which payment is made first, payment for the participant corresponding to the touched bet display area 420 is made first. That is to say, when the dealer touches a bet display area 420 for which payment is made first, only an antenna at the betting area 210 corresponding to that bet display area 420, an antenna provided in the dealer area 2106, and an antenna provided in the commission area 2107 are driven among the antennas of the antenna member 22, and the gaming media placed in these areas are read. In the example shown in FIG. 22, as the bet display area 425 is touched, payment information corresponding to the bet display area 425 is displayed on the indicator screen 426.

When the gaming table system 1 does not correctly read gaming media betted by the participant, correction can be made in the payment phase. That is to say, when the antenna member 22 did not properly read gaming media, e.g., the gaming table system 1 recognized only 5000 PHP even if the participant placed gaming media equivalent to 4000 PHP in the banker area 2101, the dealer carries out correction as below.

Figure 24:
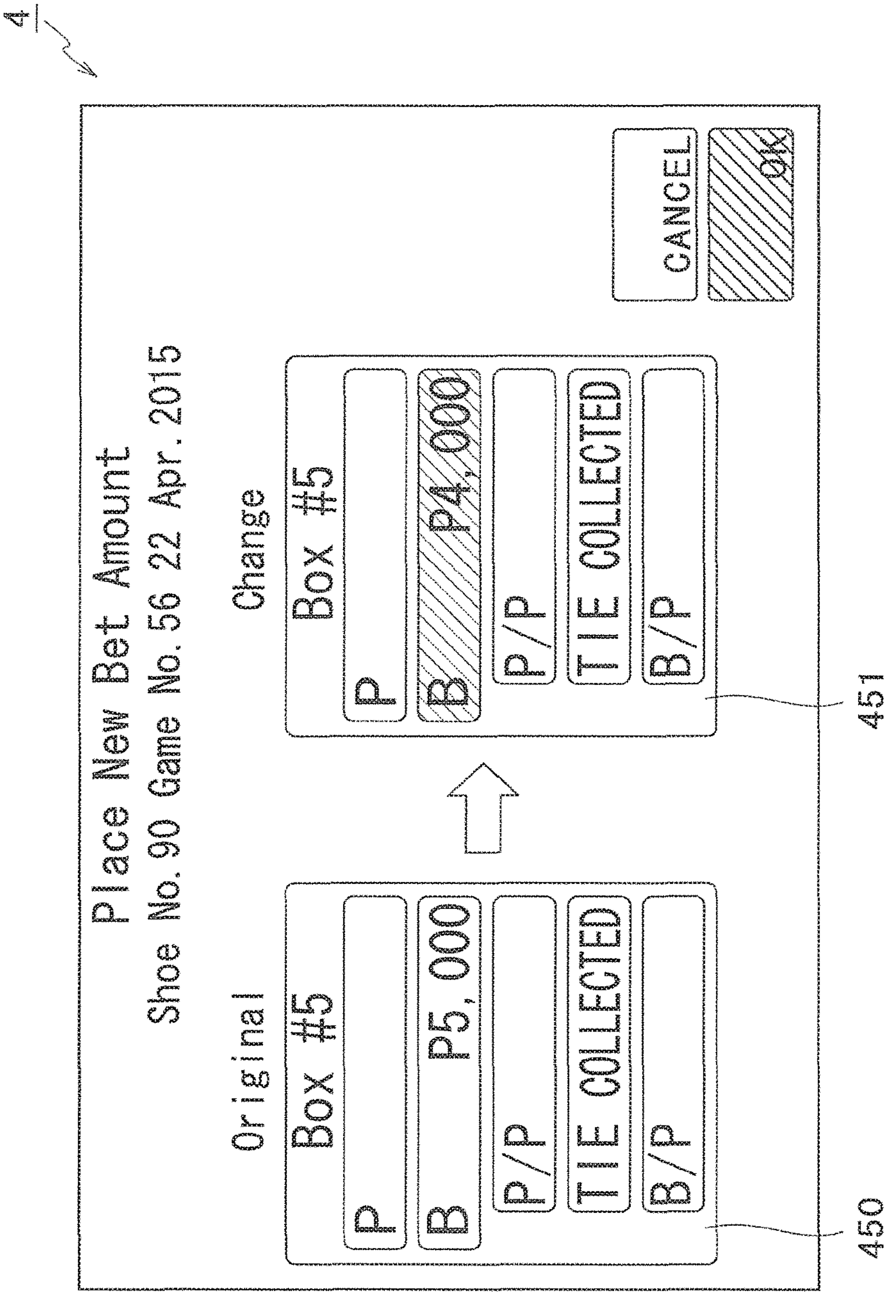
FIG. 24 an example of image display on the dealer display.

As shown in FIG. 24, a correction screen is displayed when the dealer touches the bet display area 420 on which payment information is displayed. The correction screen displays an original area 450 where information of currently-read gaming media is displayed on the left side and a change area 451 where information of gaming media after the correction is displayed. Being similar to the correction screen in the collection phase, each of the original area 450 and the change area 451 includes five areas corresponding to the areas 4211 to 4215, respectively. In this correction screen, being similar to the correction screen in the collection phase, the gaming table system 1 drives only the antenna provided for the betting area 210 corresponding to the touched bet display area 420 among the antennas of the antenna member 22, and repeatedly performs the scanning process for scanning the bet on that betting area 210.

In the payment phase, the scanning process for the betting area 210 is executed on its turn of payment. That is to say, when the payment phase starts and when a participant for which payment is carried out is selected as shown in FIG. 23, the scanning process is repeatedly executed for the corresponding betting area 210.

Figure 25:
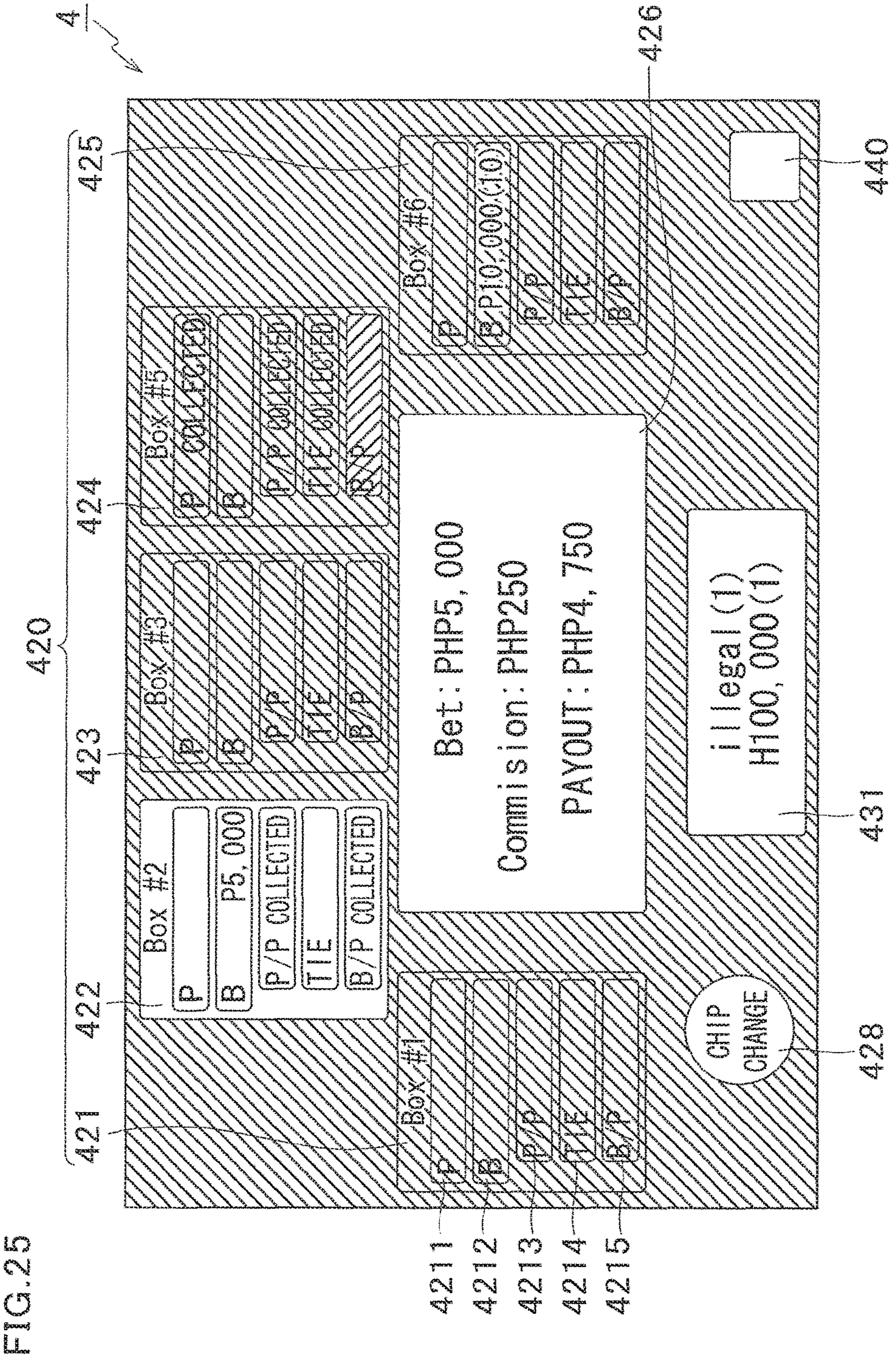
FIG. 25 an example of image display on the dealer display.

As shown in FIG. 25, when gaming media corresponding to a value larger than the payment are placed at the start of the scanning process, warning is made on the message screen 431 on the dealer display 4. For example, when an additional gaming medium is placed in the object area 2100 after the fixation of the win, illegality is notified along with the total value and the number of the gaming media. This prevents the dealer from handing over payment which is erroneously larger than a correct amount to the participant.

Before handing over the payment to the participant, the dealer places the gaming media to be paid in the bet object area 2100 achieving the win. When the gaming media placed in the bet object area 2100 as the bet by the participant and the gaming media placed in the same bet object area 2100 as the payment by the dealer become correct, the payment to the participant is completed.

For example, assume that a participant corresponding to the betting area 212 bets 5000 PHP on the banker area 2101 and achieves win as shown in FIG. 22. In this case, the payment amount from the dealer to the participant is 4750 PHP which is calculated by subtracting 5% as a commission from the betted amount.

Figure 26:
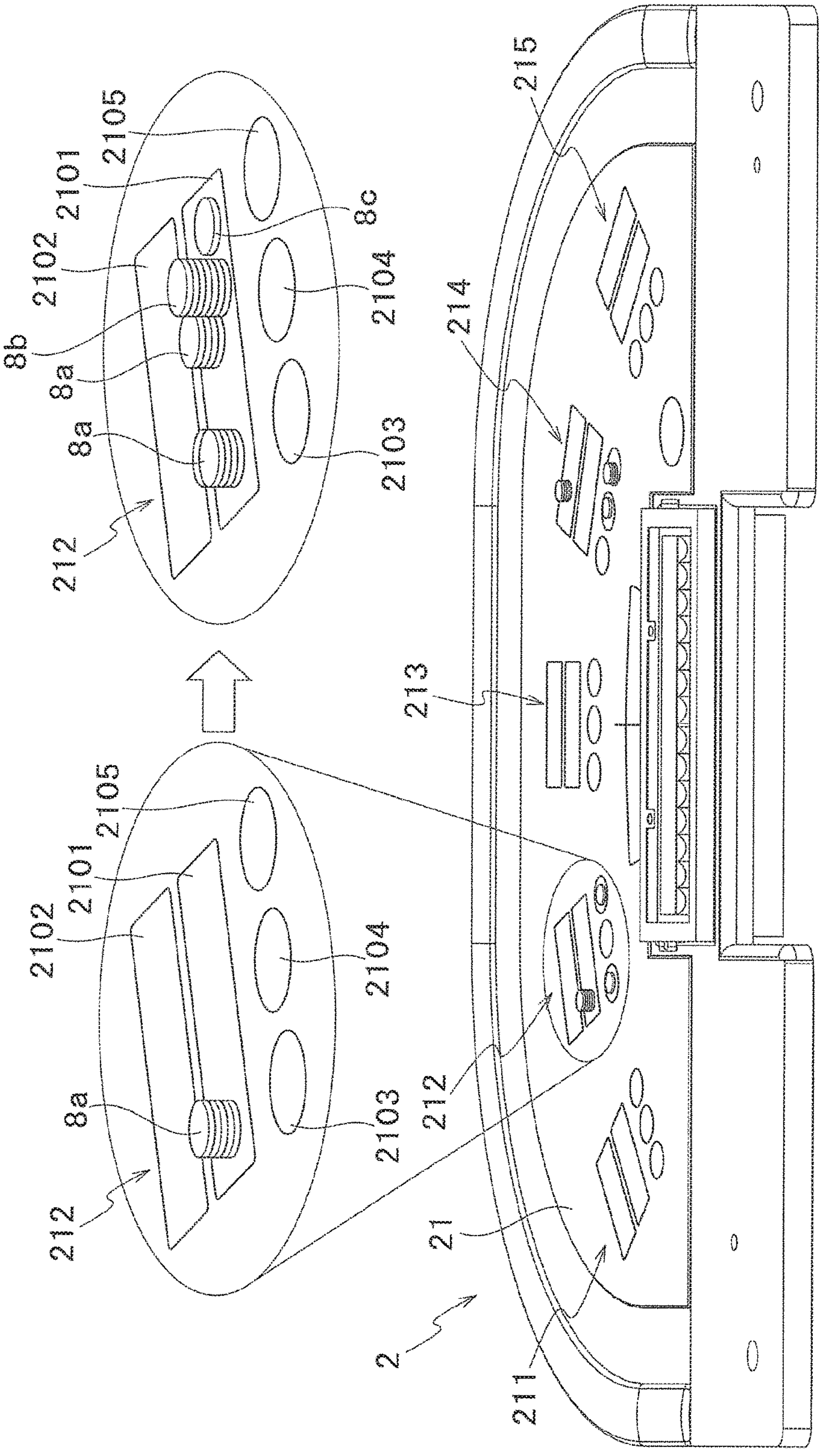
FIG. 26 shows an example of arrangement of gaming media on the game board.

As shown in FIG. 26, the dealer places, in the banker area 2101 in which five game chips **8*a* each equivalent to 1000 PHP and which are betted by the participant are placed, 4750 PHP which is the payment amount (four game chips 8*a* each representing 1000 PHP, seven game chips 8*b* each representing 100 PHP, and five game chips 8*c* each representing 10 PHP) is placed. As such, the gaming table system 1 reads the bet amount and the payment amount only from the betting area 210**, and completes the payment to the participant.

In accordance with demand from the participants, the dealer typically hands over gaming media with a rounded-up value, instead of collecting the commission amount from the participants. That is to say, a participant hands over 5% of the bet amount to the dealer, and the dealer hands over 100% of the bet amount to the participant. The gaming table system 1 is able to perform such "commission payment" by using only the betting area 210.

Figure 27:
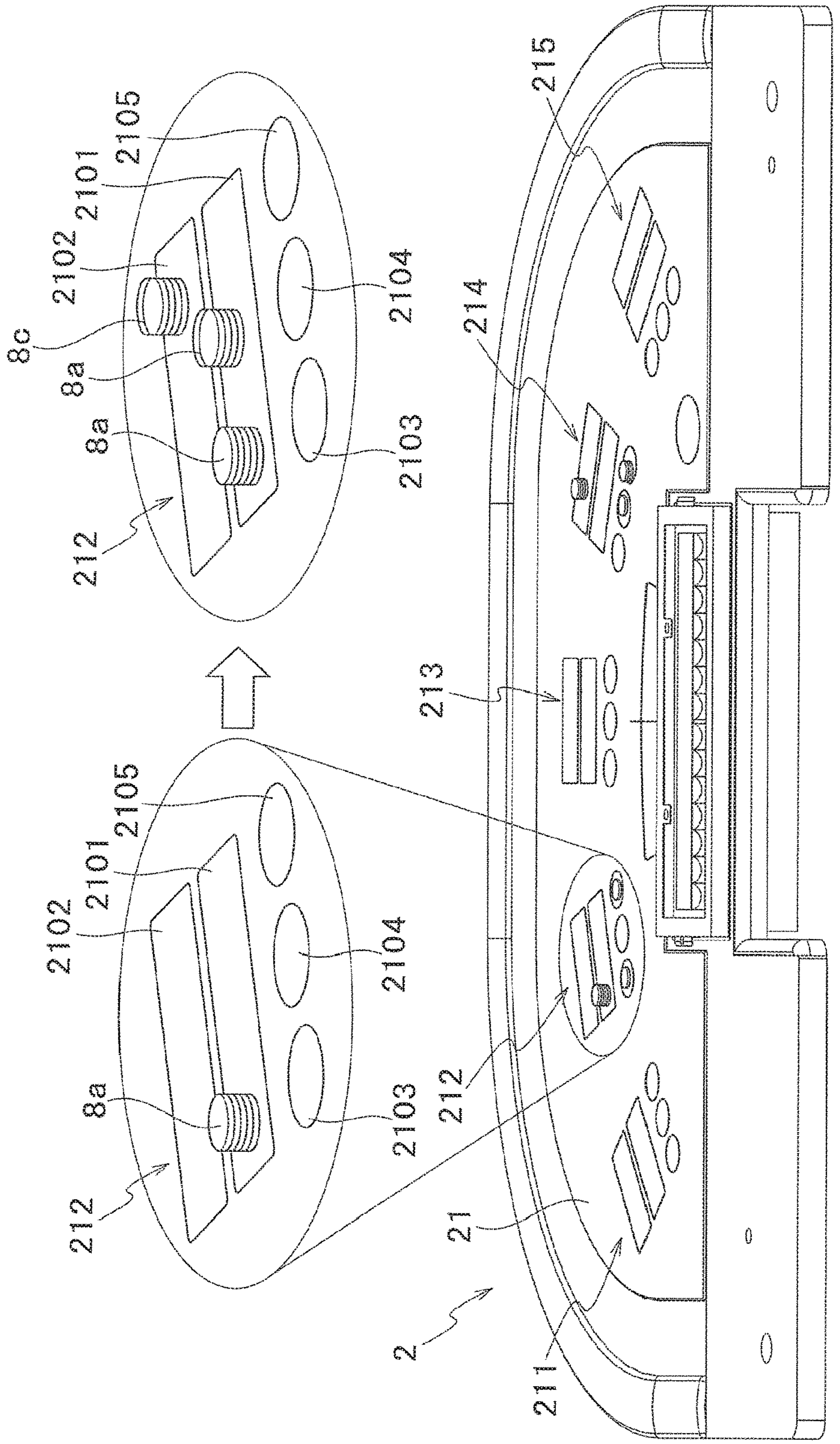
FIG. 27 shows an example of arrangement of gaming media on the game board.

To be more specific, as shown in FIG. 27, the participant places 250 PHP (five game chips **8*c* each representing 50 PHP) as the commission amount in the player area 2102 which loses in the game. In other words, the bet object area 2100 which loses in the game functions as the subtracting area. The dealer places, in the banker area 2101 in which five game chips 8*a* each equivalent to 1000 PHP and betted by the participant are placed, 5000 PHP (five game chips 8*a* each equivalent to 1000 PHP) including the commission amount, as the payment amount. In other words, the bet object area 2100 which wins in the game functions as the adding area. As such, the gaming table system 1 reads the bet amount, the commission amount, and the payment amount only from the betting area 210**, and completes the payment to the participant. Furthermore, because the number of gaming media dealt by the dealer is reduced, human errors made by the dealer is reduced.

The payment handed over from the dealer to the participant may be similarly done by placing it in the dealer area 2106 (see FIG. 3). In other words, the dealer area 2106 is set as the adding area. When the participant directly hands over the commission to the dealer, the payout may be similarly done by placing the commission received by the dealer in the commission area 2107 (see FIG. 3). In other words, the commission area 2107 is set as the subtracting area. As such, when the payment is done to all necessary participants, the payment phase ends and the next bet phase starts.

Figure 28:
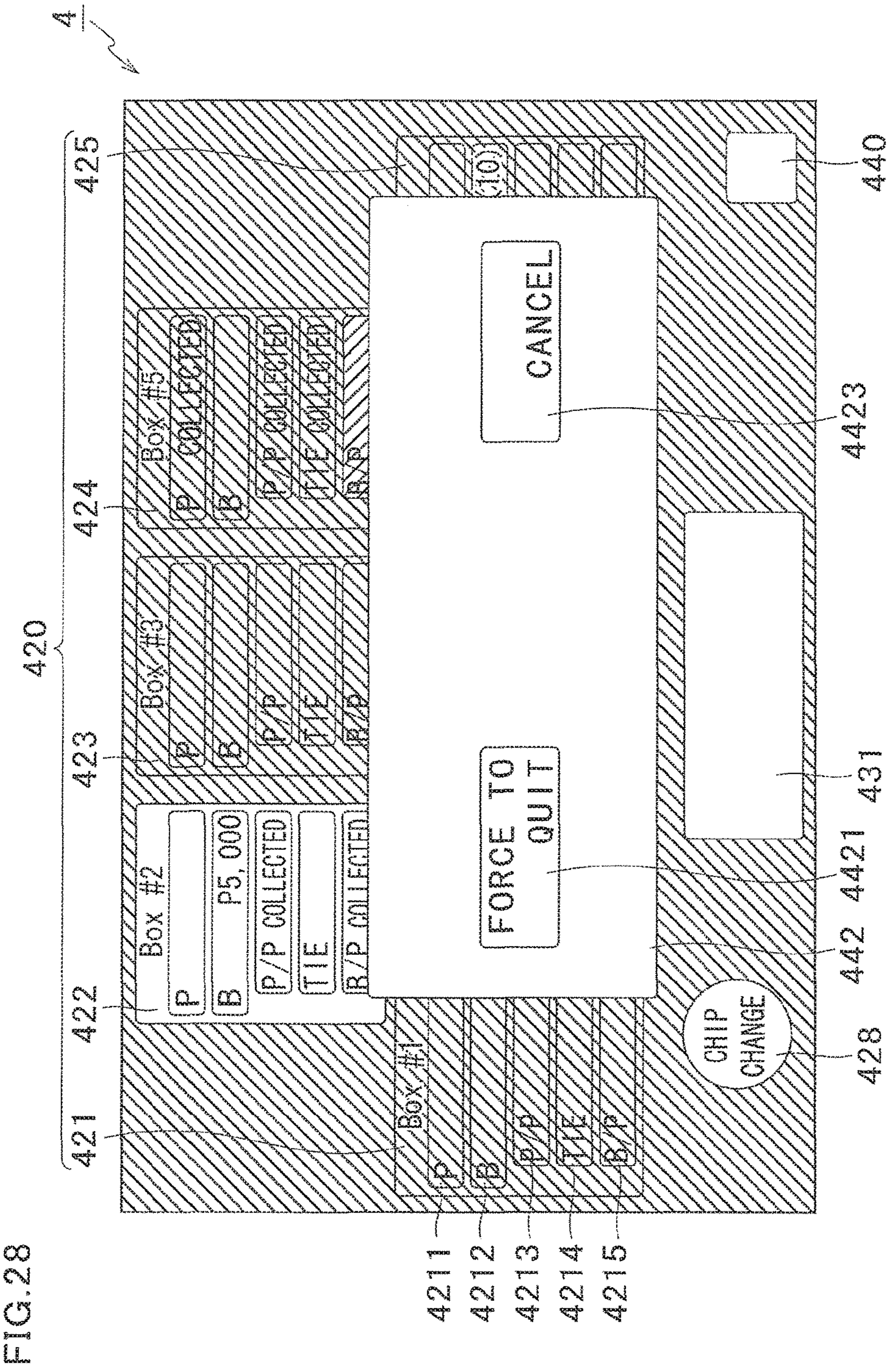
FIG. 28 shows an example of image display on the dealer display.

As shown in FIG. 28, the tool window 442 is displayed when the tool button 440 is touched. The tool window 442 displays the forcible stop button 4421 and the cancellation button 4423. The payment phase is terminated and the process proceeds to the bet phase, as the forcible stop button 4421 is touched. The payment phase is continued when the cancellation button 4423 is touched.

(Gaming Table System 1: Dealer Display 4: Chip Change Screen)

When the chip change button 428 displayed on the dealer display 4 is touched in the bet phase or the payment phase, the image display proceeds to a chip change screen. In the chip change screen, the dealer is able to check whether the gaming media (first gaming media) received from the participant are identical with the gaming media (second gaming media) handed over to the participant.

Figure 29:
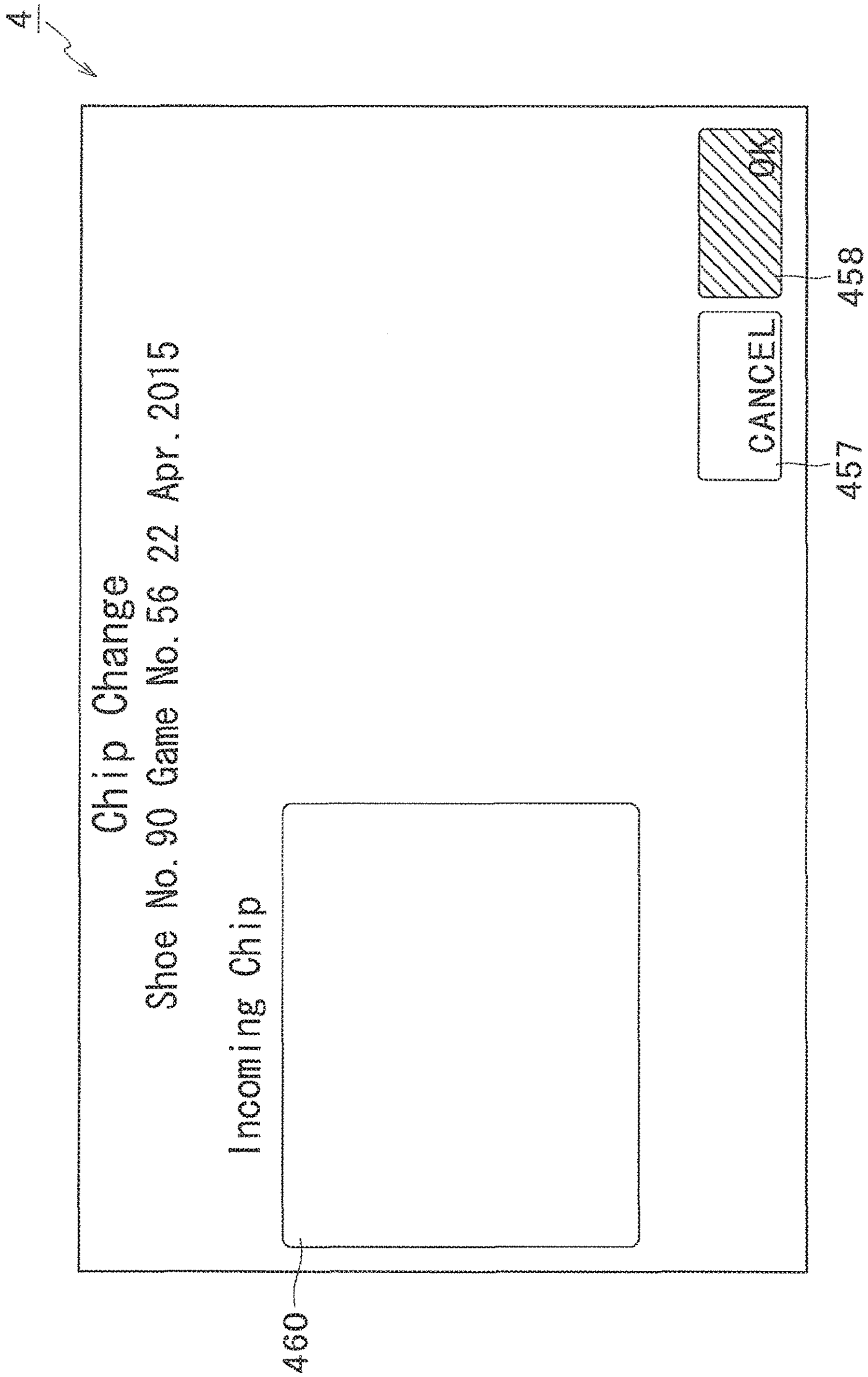
FIG. 29 shows an example of image display on the dealer display.

As shown in FIG. 29, in the chip change screen displayed on the dealer display 4, to begin with, an incoming chip area 460 is displayed. In the chip change screen, furthermore, the cancellation button 457 for canceling chip change and the OK button 458 for fixing gaming media received from the participant are displayed at a lower right part. In the initial state, only the cancellation button 457 is valid.

Figure 30:
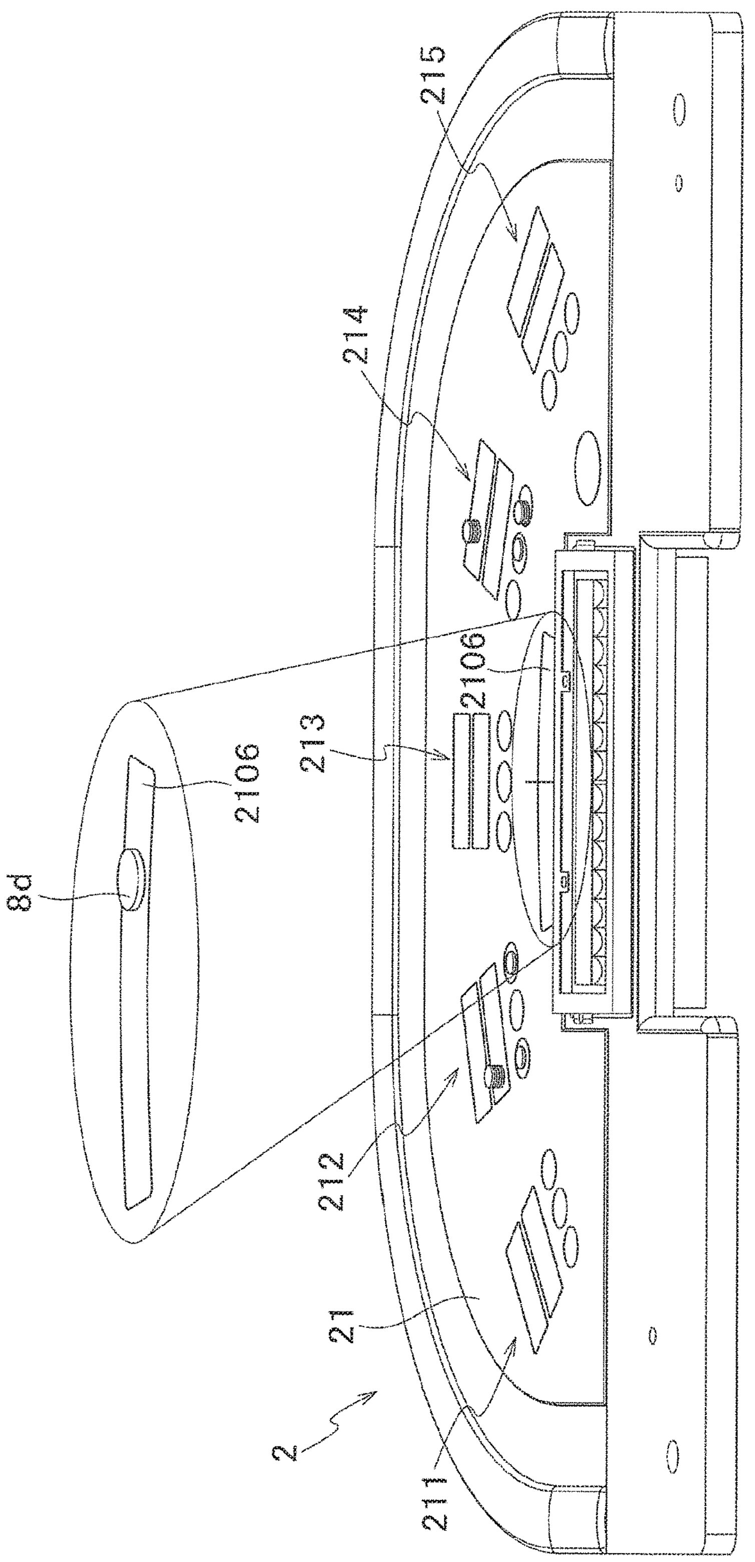
FIG. 30 shows an example of arrangement of gaming media on the game board.

As shown in FIG. 30, the dealer places the gaming media received from the participant in the dealer area 2106. As such, in the chip change, the gaming media received from the participant are checked by using the dealer area 2106. FIG. 30 shows an example in which the dealer has received one 10,000 PHP game chip 8*d* from the participant.

Figure 31:
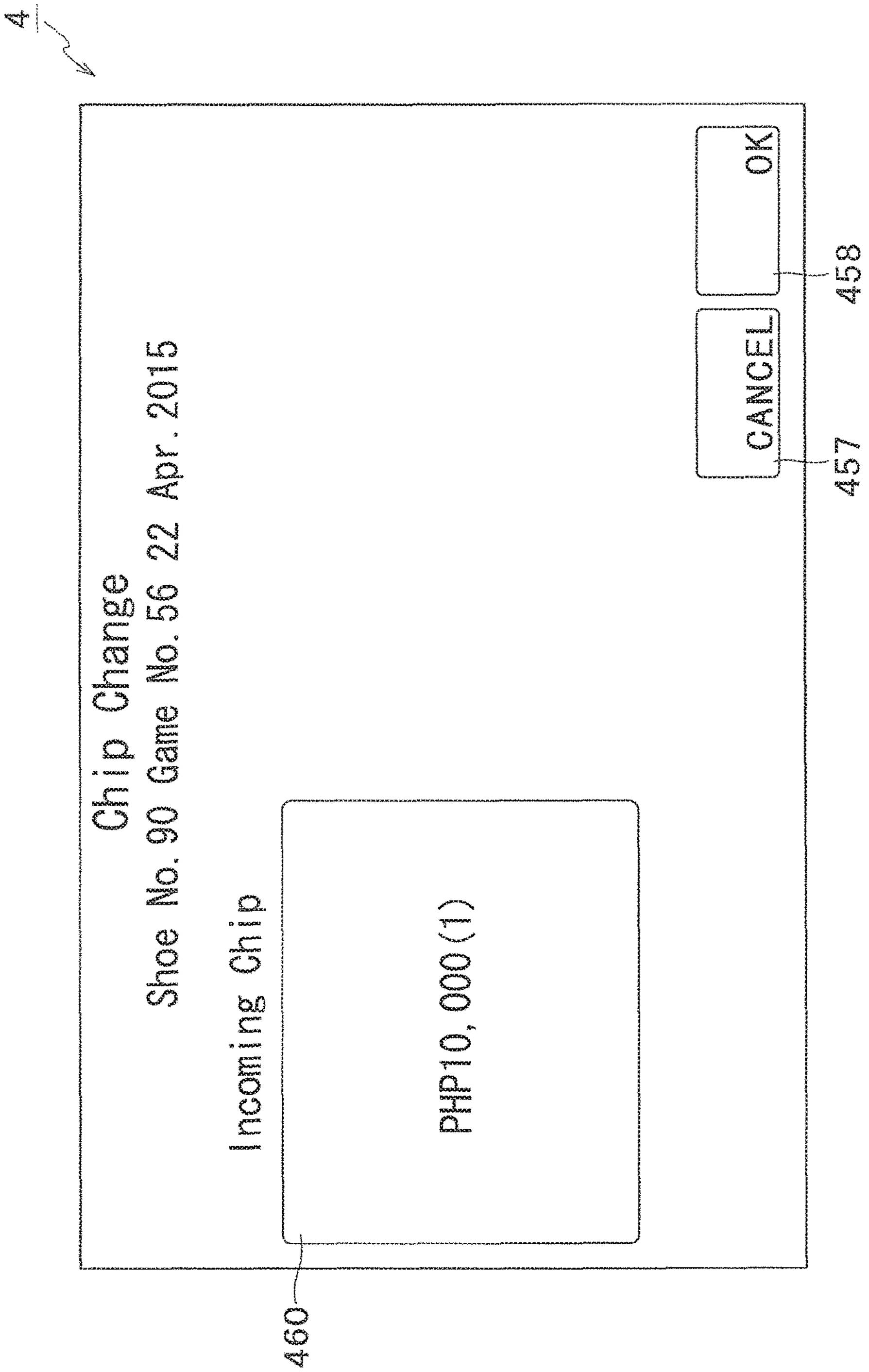
FIG. 31 shows an example of image display on the dealer display.

As shown in FIG. 31, in the incoming chip area 460, information of the gaming media placed in the dealer area 2106 is displayed. To be more specific, the game chip 8*d* placed in the dealer area 2106 is scanned, and the incoming chip area 460 displays that the gaming medium received from the participant is one 10,000 PHP chip. By touching the OK button 458 having become valid, the dealer is able to fix the gaming medium received from the participant.

Figure 32:
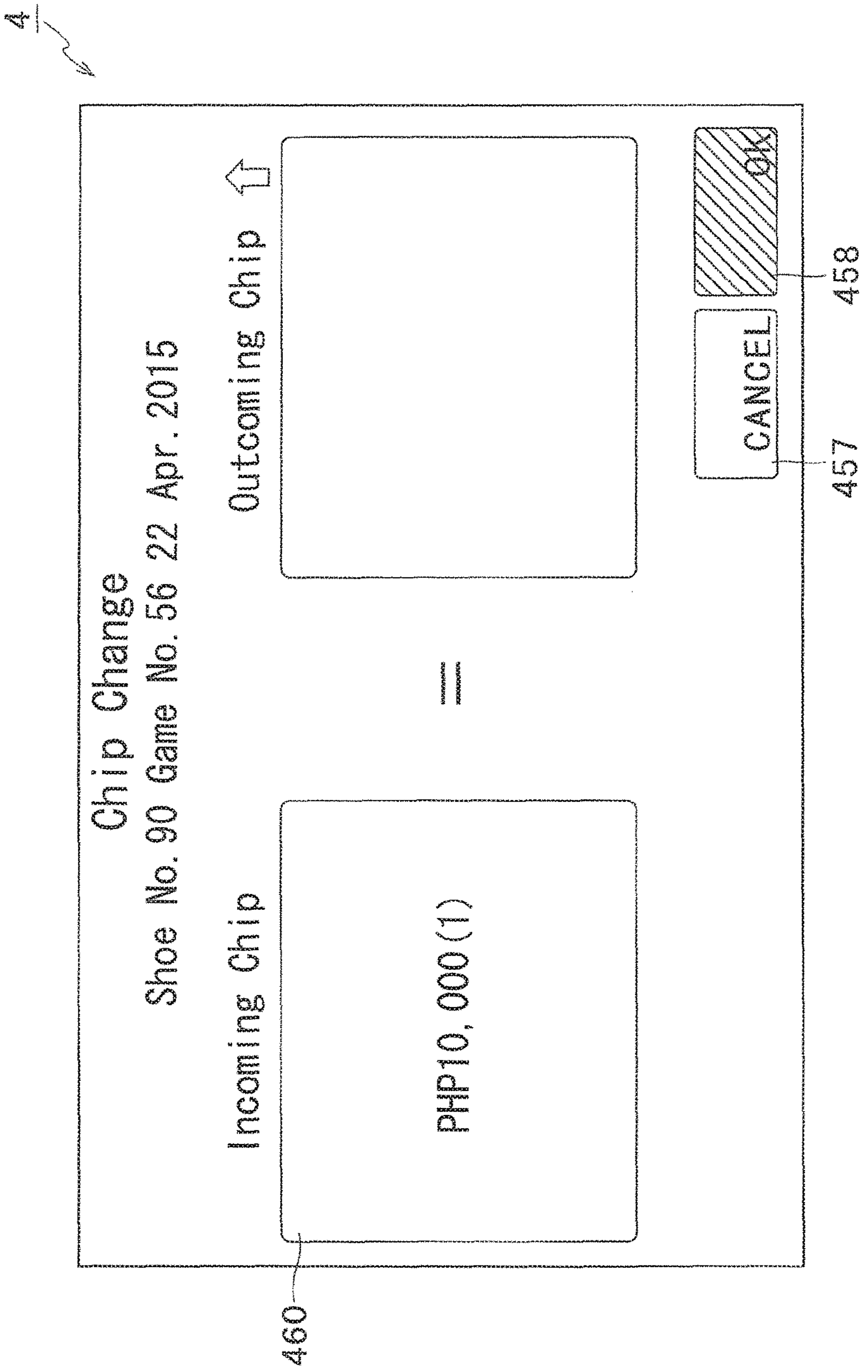
FIG. 32 shows an example of image display on the dealer display.

As shown in FIG. 32, an outgoing area 461 is displayed when the dealer touches the OK button 458. The OK button 458 becomes invalid again.

Figure 33:
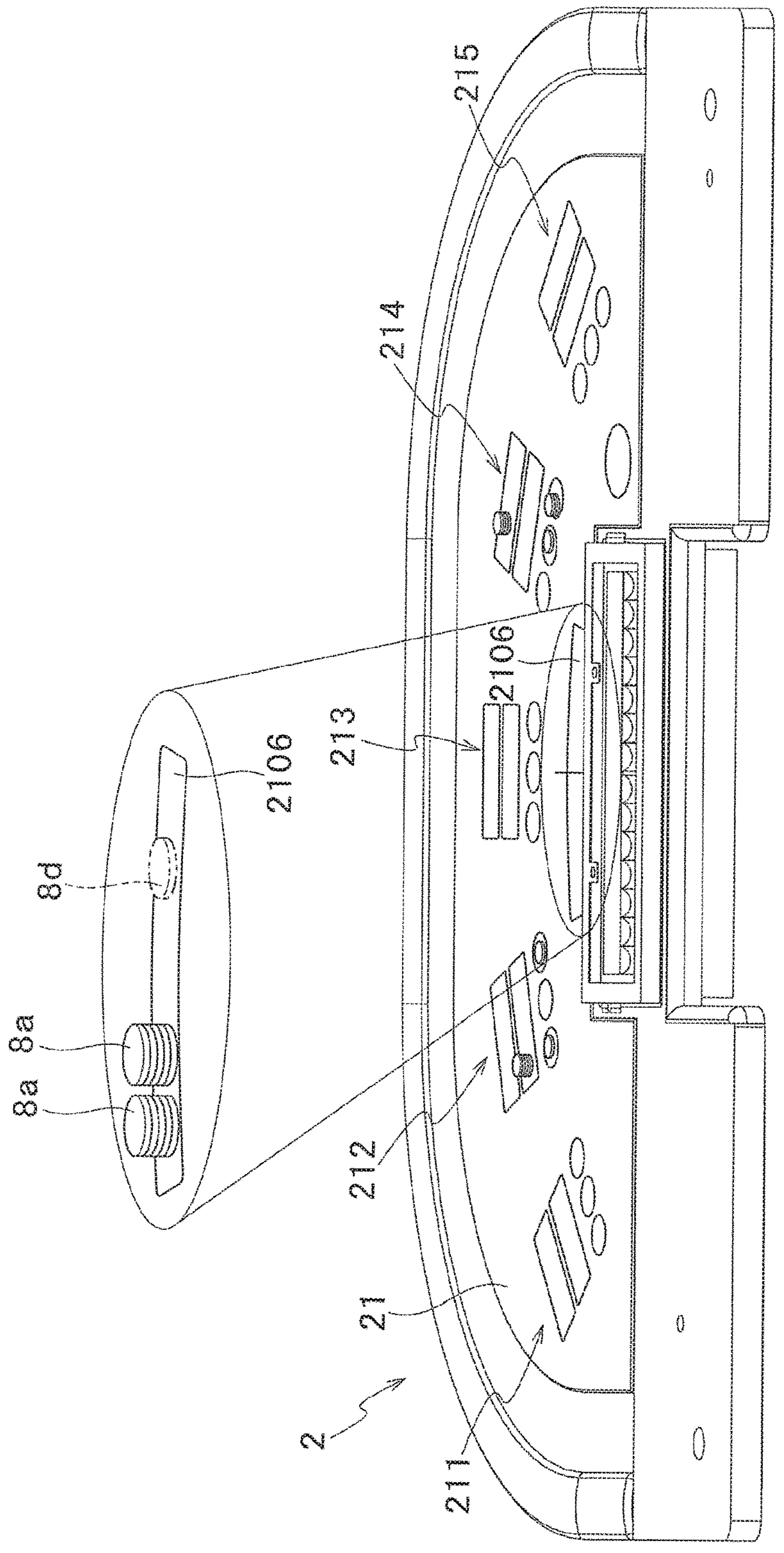
FIG. 33 shows an example of arrangement of gaming media on the game board.

As shown in FIG. 33, the dealer places the gaming media received from the participant in the dealer area 2106. As such, in the chip change, whether the gaming media received from the participant are identical with the gaming media handed over to the participant are identical can be checked by using only the dealer area 2106. FIG. 33 shows an example in which the dealer places one 10,000 PHP game chip 8*a* from the participant in the dealer area 2106. The dealer may remove the gaming media displayed in the incoming chip area 460 from the dealer area 2106 or leave the gaming media to be placed. That is to say, the gaming table system 1 remembers the gaming media displayed in the incoming chip area 460 and excludes the remembered gaming media at the time of reading of the outgoing area 461. The system may further remember identification information for identifying each gaming medium.

Figure 34:
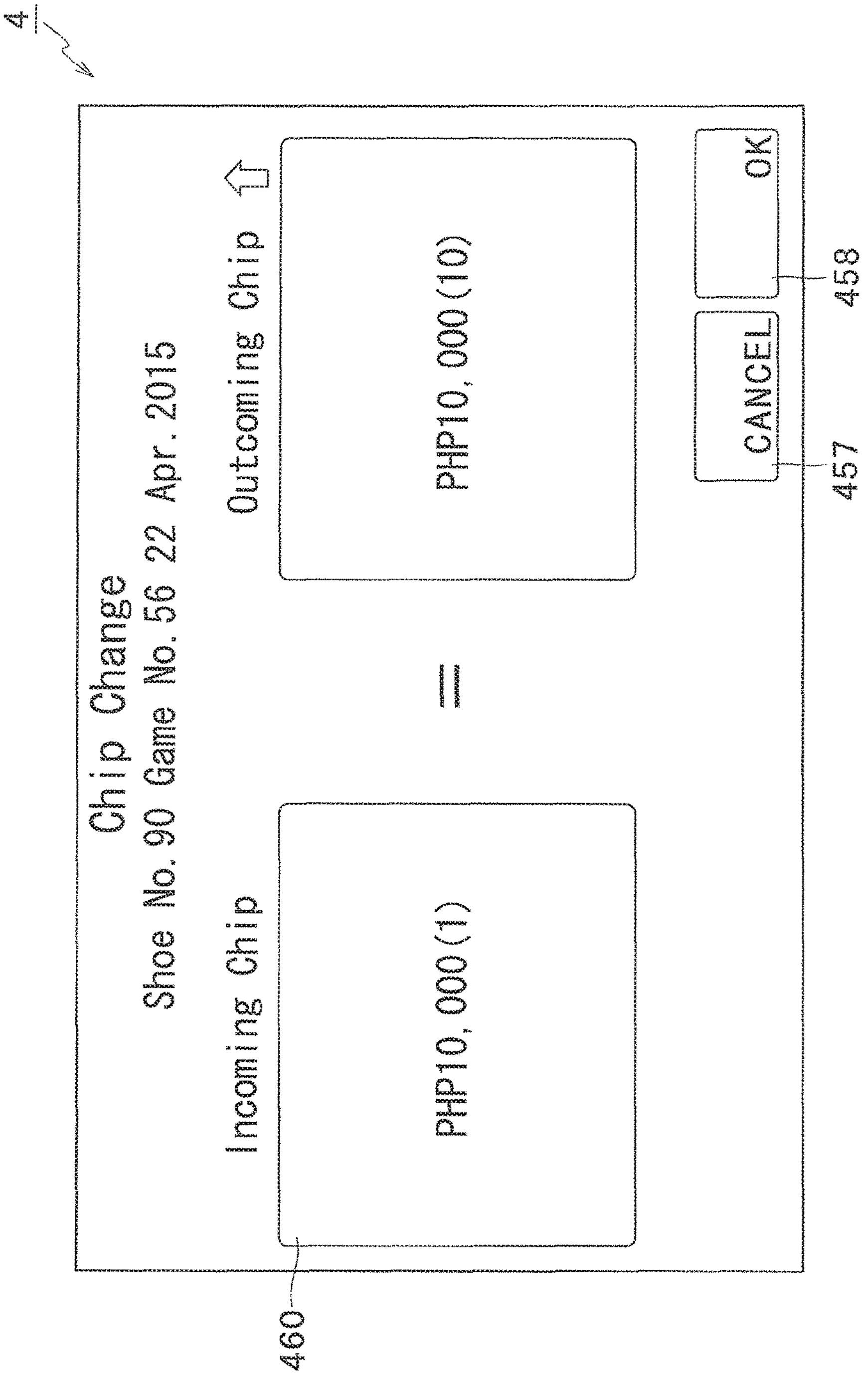
FIG. 34 shows an example of image display on the dealer display.

As shown in FIG. 34, in the outgoing area 461, information of the gaming media placed in the dealer area 2106 to be handed over to the participant is displayed. In an outgoing chip area 461, information of the gaming media placed in the dealer area 2106 is displayed, except the gaming media read from the incoming chip area 460. In the example shown in FIG. 34, the outgoing chip area 461 shows that the gaming media to be handed over to the participant are ten game chips 8*a* each representing 1,000 PHP.

Furthermore, as shown in FIG. 34, when the total value displayed on the incoming chip area 460 is identical with the total value displayed in the outgoing chip area 461 are identical, the OK button 458 becomes valid again. The dealer ends the chip change by touching the OK button 458. After the end of the chip change, a screen by which the chip change is called returns.

(Gaming Table System 1: Dealer Display 4: Rolling Screen)

In the bet phase, shift to a rolling screen occurs as the rolling button 429 displayed on the dealer display 4 is touched. In the rolling screen, the dealer is able to check whether the gaming media (first gaming media) received from the participant are identical with the gaming media (second gaming media) handed over to the participant. In the rolling screen, furthermore, the dealer is able to check whether junket cash (first gaming media) received from the participant is identical with junket NN (second gaming media) handed over to the participant. In the same manner as the chip change, only the dealer area 2106 is used for the rolling.

As such, as the participant performs rolling to change convertible gaming media to inconvertible gaming media, a point is awarded to the participant. For example, the ID of the participant is associated with the ID of a convertible gaming medium, and a point is issued when the rolling is carried out. The point may be sent to a server or the like which is able to perform data communications with the gaming table system 1, and may be stored in association with the participant. The gaming table system 1 may store the point in an IC card or the like carried by the participant.

Figure 35:
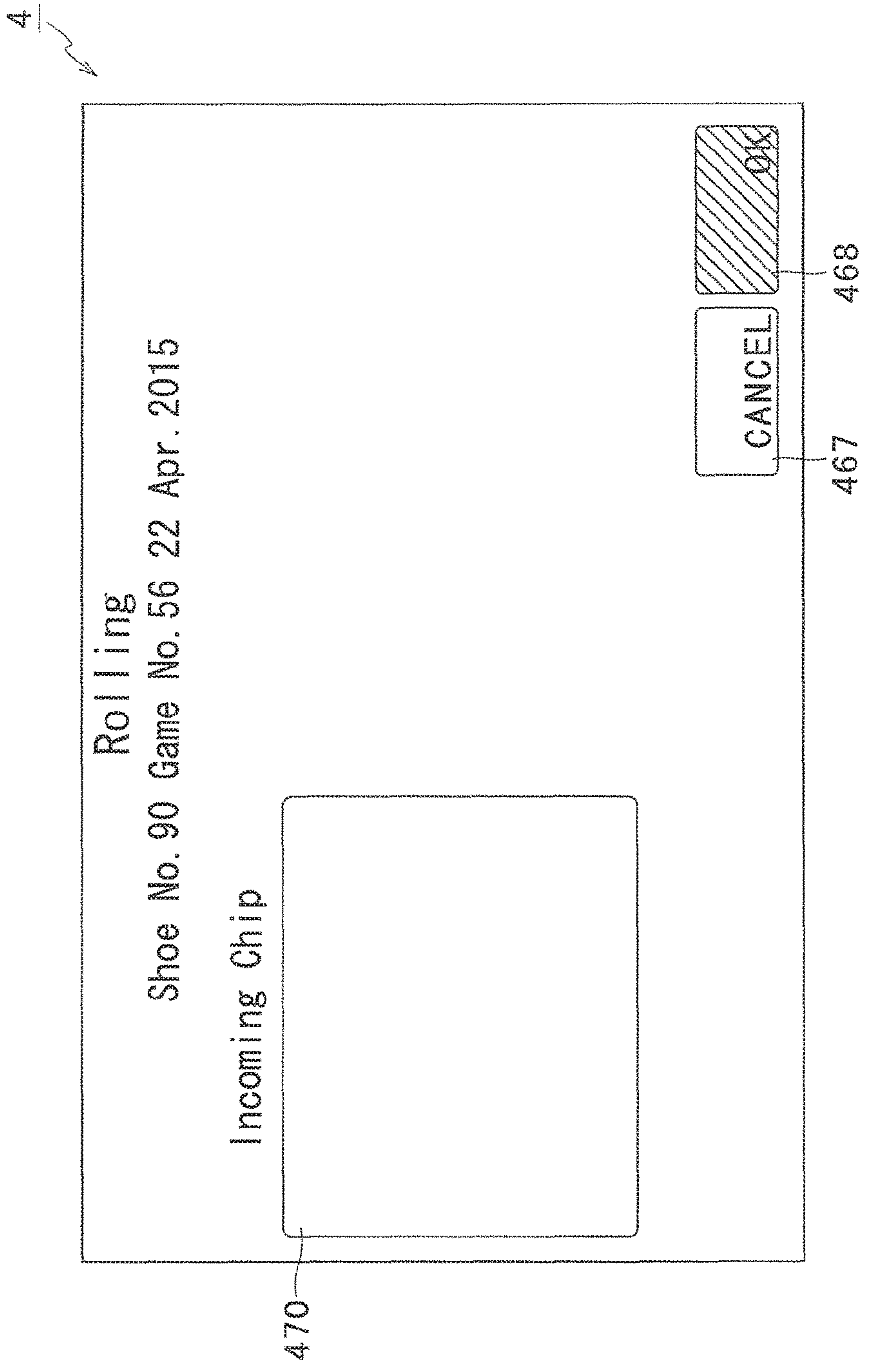
FIG. 35 shows an example of image display on the dealer display.

As shown in FIG. 35, in the rolling screen displayed on the dealer display 4, to begin with, an incoming chip area 470 is displayed. In the rolling screen, furthermore, the cancellation button 467 for canceling the rolling and the OK button 468 for fixing gaming media received from the participant are displayed at a lower right part. In the initial state, only the cancellation button 457 is valid.

Figure 36:
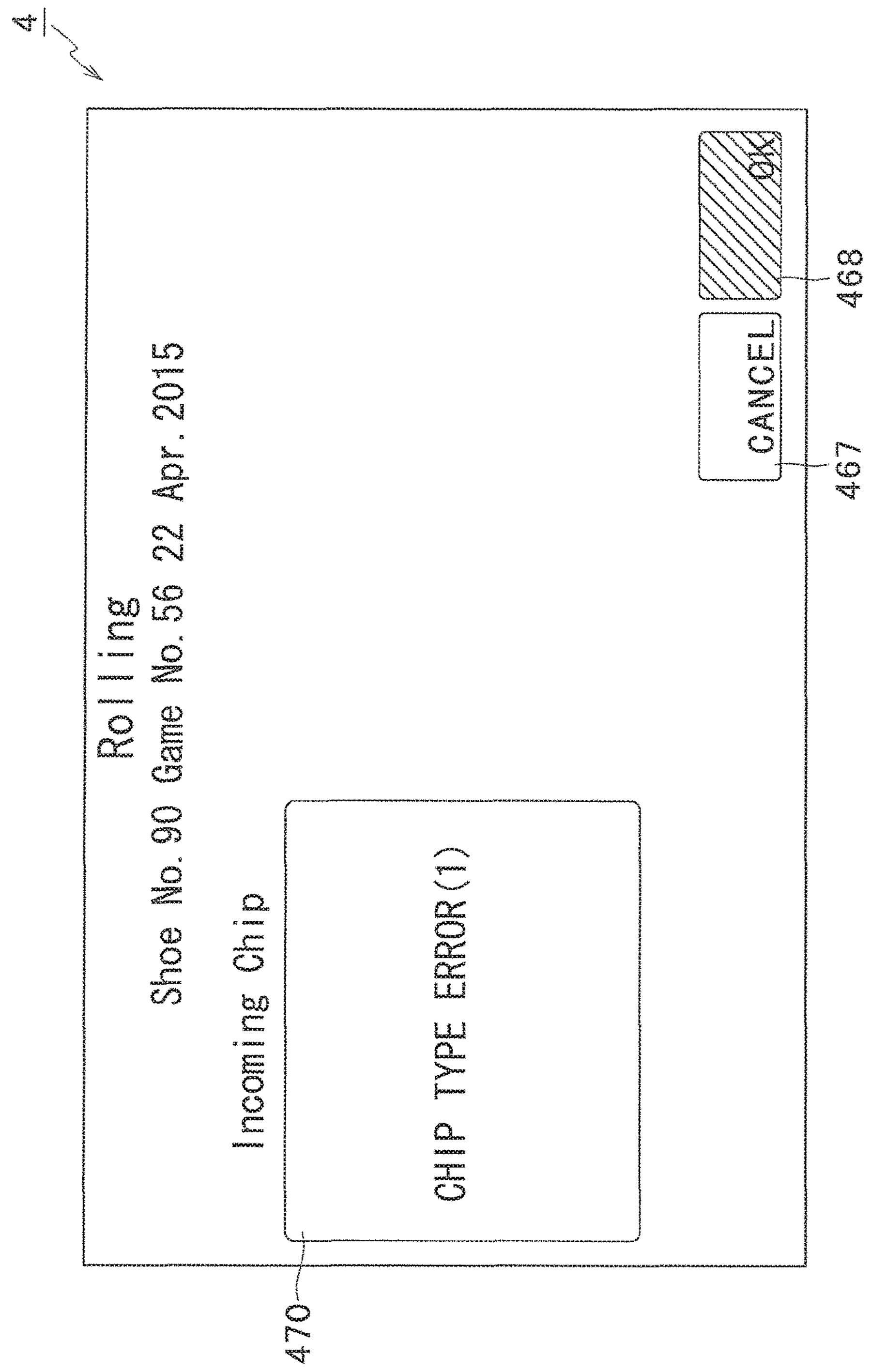
FIG. 36 shows an example of image display on the dealer display.

As shown in FIG. 36, because in the rolling the gaming table system 1 accepts only premium cash or junket cash as gaming media received from the participant, a warning is made when game chips or the like other than them are placed in the dealer area 2106. To be more specific, a message "CHIP TYPE ERROR" is displayed in the incoming chip area 470. Alternatively, only one of the premium cash and the junket cash may be accepted. Alternatively, only one of the premium cash and the junket cash may be accepted in a switchable manner.

Figure 37:
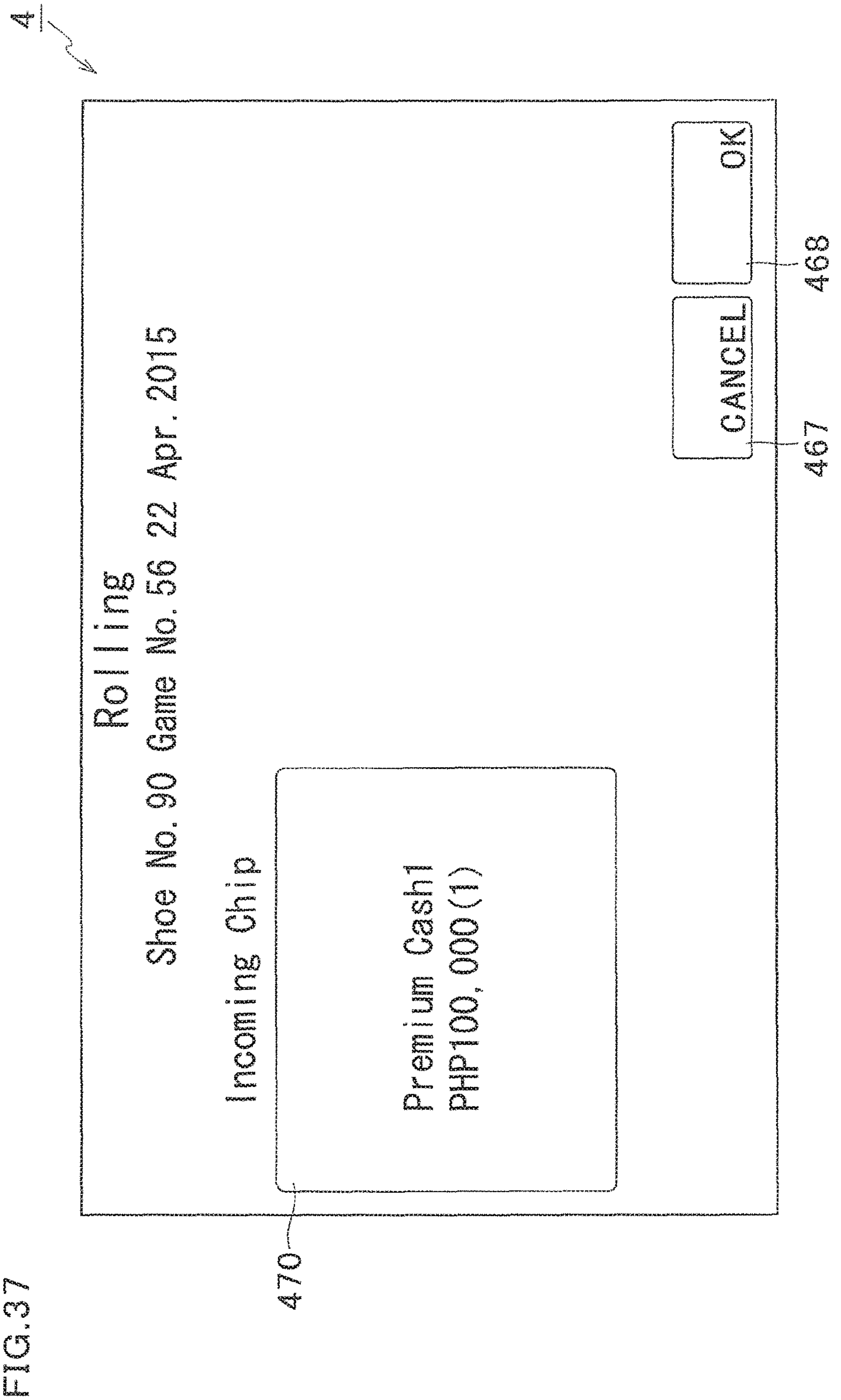
FIG. 37 shows an example of image display on the dealer display.

As shown in FIG. 37, information of the premium cash or the junket cash placed in the dealer area 2106 is displayed in the incoming chip area 470. In the example shown in FIG. 37, one premium cash representing 100,000 PHP is placed in the dealer area 2106. By touching the OK button 468 having become valid, the dealer is able to fix the gaming medium received from the participant.

Figure 38:
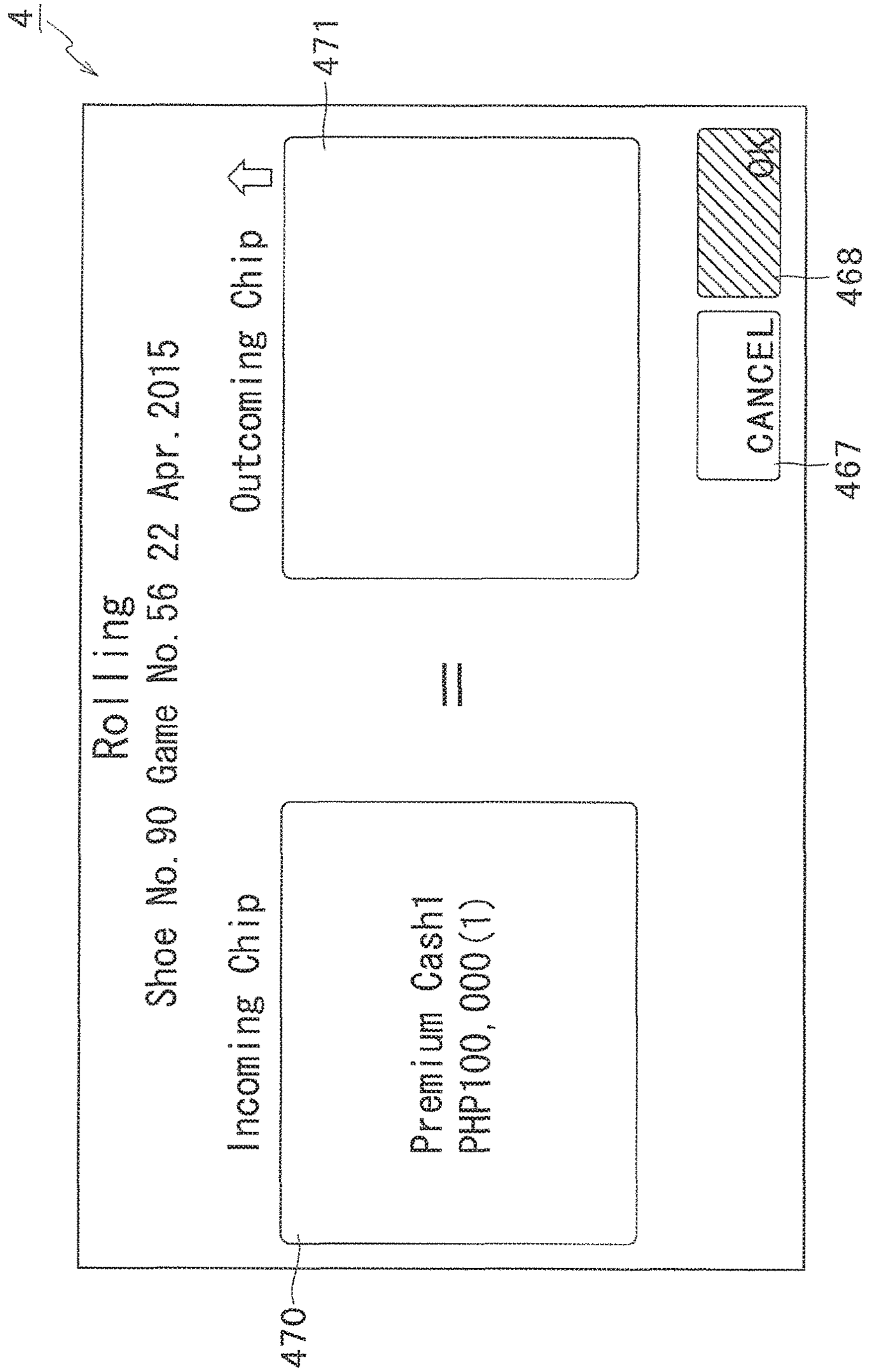
FIG. 38 shows an example of image display on the dealer display.

As shown in FIG. 38, when the dealer touches the OK button 468, the outgoing chip area 471 is displayed. The OK button 468 becomes invalid again. The dealer then places inconvertible gaming media corresponding to the received gaming media in the dealer area 2106. That is to say, when receiving the premium cash from the participant, the dealer places premium NN with the same value in the dealer area 2106. When receiving the junket cash from the participant, the dealer places junket NN with the same value in the dealer area 2106.

Figure 39:
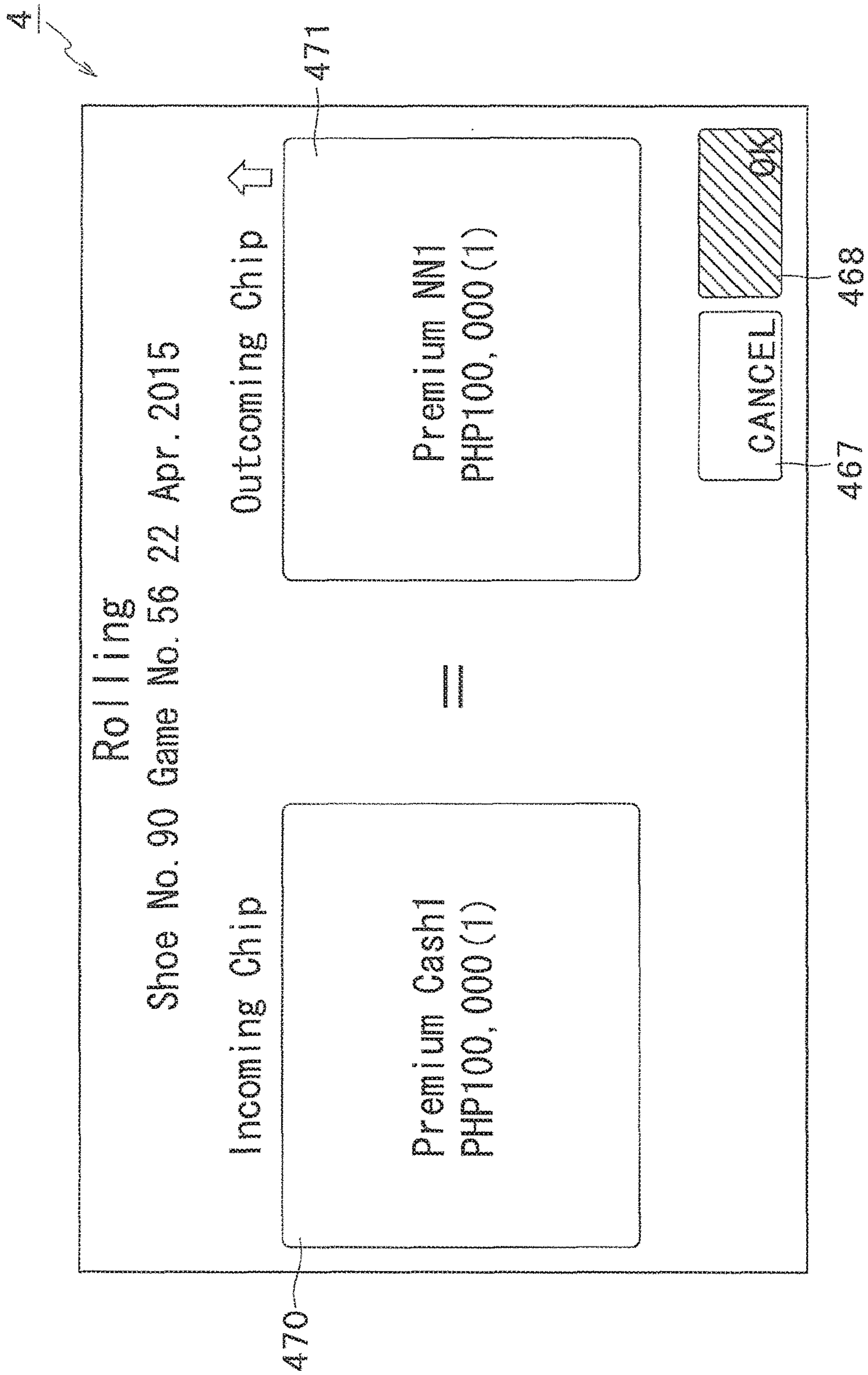
FIG. 39 shows an example of image display on the dealer display.

As shown in FIG. 39, in the outgoing chip area 471, information of the gaming media placed in the dealer area 2106 is displayed. In the outgoing chip area 471, information of the gaming media placed in the dealer area 2106 is displayed, except the gaming media read from the incoming chip area 470. In the example shown in FIG. 39, the outgoing chip area 471 displays that the gaming medium handed over to the participant is one premium NN representing 100,000 PHP. When gaming media of the money type which is not inconvertible gaming media are placed, a warning similar to that in the incoming chip area 470 is displayed in the outgoing chip area 471.

Furthermore, as shown in FIG. 39, when the total value displayed on the incoming chip area 460 is identical with the total value displayed in the outgoing chip area 461, the OK button 468 becomes valid again. The dealer ends the rolling by touching the OK button 468. After the end of the rolling, the bet screen returns.

(Gaming Table System 1: Operation)

The operation of the gaming table system 1 arranged as above will be described with reference to flowcharts. It is noted that the descriptions below presuppose that the gaming table system 1 has been powered on.

(Gaming Table System 1: Control Unit 3: Main Process)

Figure 40:
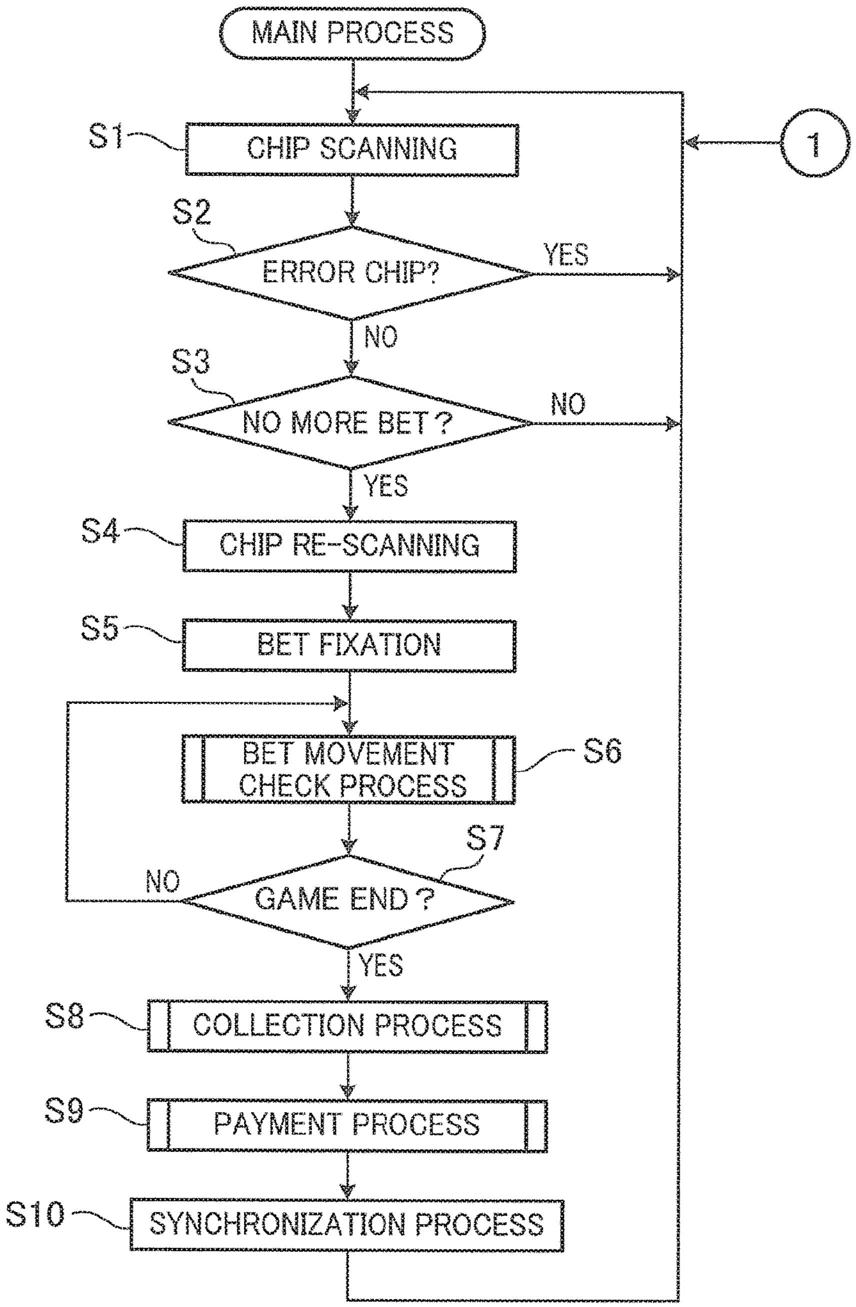
FIG. 40 shows a flowchart of a main process.

As shown in FIG. 40, in the control unit 3, processes are executed by a main process routine. The following will specifically describe processes executed by the control unit 3. To begin with, the bet screen shown in FIG. 5 is displayed on the dealer display 4 and the chip scanning is executed (S1). That is to say, by causing the antenna member 22 to perform the scanning process, information of gaming media placed in each bet object area 2100 of each betting area 210 is obtained, and the obtained information is displayed on the dealer display 4. Then whether an error chip is placed in each betting area 210 is determined (S2). When an error chip is placed (S2: YES), the routine returns to the step S1 and the scanning process is executed again. In other words, when an error chip exists, the chip scanning is repeated until the error chip is removed.

In the meanwhile, when no error chip exists (S2: NO), whether the bet fixation button 430 is touched in the bet screen is determined (S3). When the bet fixation button 430 is not touched (S3: NO), the routine returns to the step S1 and the scanning process is executed again. In other words, the chip scanning is repeated until the bet fixation button 430 is touched.

When the bet fixation button 430 is touched (S3: NO), a chip re-scanning process is executed (S4). That is to say, by causing the antenna member 22 to perform the scanning process, information of gaming media placed in each bet object area 2100 of each betting area 210 is obtained. The bet is fixed based on the information of the gaming media obtained in the step S4, and the bet phase ends (S5).

As the bet monitoring phase, a bet movement check process is executed (S6). The bet movement check process will be detailed later. Then whether the game has ended is determined (S7). That is to say, whether information indicating a game result is input from the card shoe 5 is determined. When the game has not been ended (S7: NO), the bet movement check process in the step S6 is executed again.

In the meanwhile, when the game has ended (S7: YES), a later-described collection process is executed as the collection phase (S8). As the payment phase, a later-described payment process is executed (S9). Thereafter, a synchronization process is executed (S10) and the routine returns to the step S1. In the synchronization process, plural types of information based on a game result are sent to a server 100 (see FIG. 1). The server is connected with plural gaming table systems 1 to be able to perform data communications therewith. Each gaming table system 1 associates a game result and income-and-expense information based on the game result with a participant and sends them to the server 100 each time a game result is output. The game result is, for example, winning of one of the banker and the player. The income-and-expense information is information of an amount paid from the dealer to the participant and information of an amount collected from the participant by the dealer. The income-and-expense information may be income and expense of the entirety of one gaming table system 1, or may be income and expense of each participant at one gaming table system 1.

(Server 100: Game Result Table)

Now, referring to FIG. 41, information accumulated in the server 100 will be specifically described. The game result table includes a date and time column, a table number column, a shoe number column, a dealer ID column, a game number column, a seat number column, a participant ID column, a bet column, a game result column, a collection column, and a payment column.

The date and time column stores a time at which a game ends in the gaming table system 1. The table number column stores identification information which uniquely identifies each gaming table system 1. The shoe number column stores identification information which uniquely identify each card shoe 5. The dealer ID column stores an ID for identifying a dealer allocated to each gaming table system 1. The game number column stores a number allocated to each game in the gaming table system 1.

The seat number column stores a seat number which indicates which one of the betting areas 211, 212, 213, 214, and 215 is used in the gaming table system 1. The participant ID column stores a participant ID which uniquely identifies each participant. That is to say, when playing a game at the gaming table system 1, the participant causes a card reader (not illustrated) provided at each seat to read a player card storing the participant ID. The gaming table system 1 stores the participant ID read by the card reader in association with the game result, and sends it to the server. Alternatively, the participant ID may not be stored. In other words, a game result may be associated not with the participant but only with the seat number.

The bet column stores the content (the bet object and the bet amount) of the bet made by the participant in the gaming table system 1. The game result column stores information indicating which bet object wins. The collection column stores a collected amount of each participant collected by the dealer from the betting area 210. The payment column stores a payment amount of each participant paid by the dealer to each participant.

As such, the server 100 accumulatively stores the content of single execution of the game by each participant in all connected gaming table systems 1. It is therefore possible to easily calculate the total income and expense of plural gaming table systems 1 based on collection and payment in all sets of data. Because a single set of data includes information regarding the bet made by a participant and payment to a participant, a cheat made by a participant can be easily detected. Furthermore, because a participant with a high winning percentage, a participant who frequently wins only in games with large bet amounts, and the like are singled out based on the data, suspicion of cheating is found at an early stage.

(Gaming Table System 1: Control Unit 3: Bet Movement Check Process)

Figure 42:
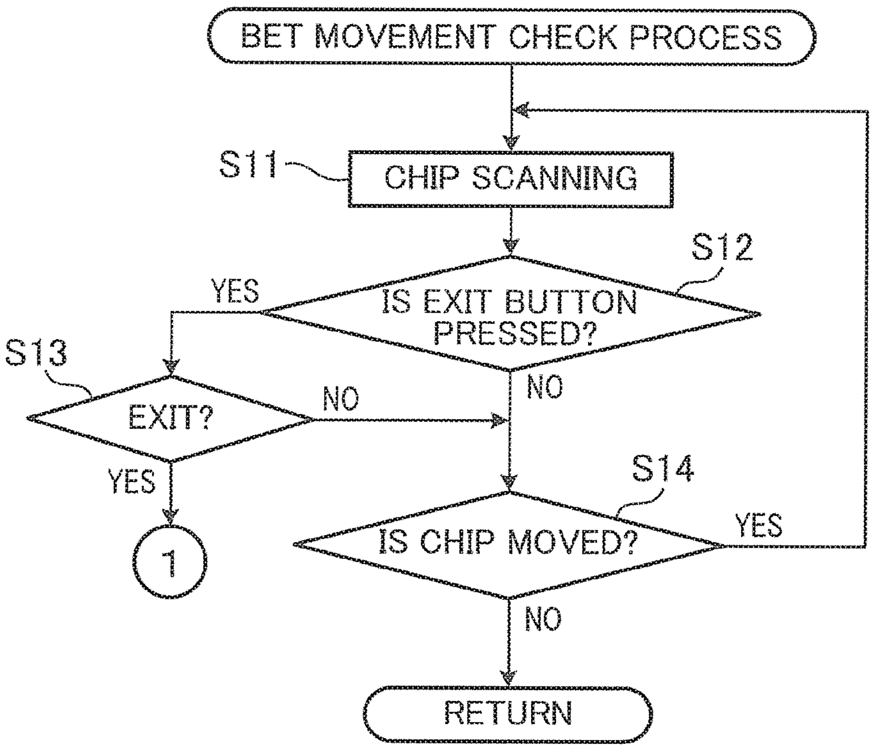
FIG. 42 is a flowchart of a bet movement check process.

As shown in FIG. 42, in the main process, as the bet movement check process is executed, the bet monitoring screen is displayed on the dealer display 4 and the chip scanning is executed (S11). Then whether the EXIT button 432 on the bet monitoring screen is touched is determined (S12). When the EXIT button 432 is touched, whether OK is touched is determined by the confirmation dialog 433 (see FIG. 13) (S14). When OK is touched (S13: YES), the routine returns to the step S1 in the main process. That is to say, the repeated scanning process in case of the moved gaming media is terminated, and the return from the bet monitoring phase to the bet phase occurs.

In the meanwhile, when OK is not touched (S13: NO), whether a chip has been moved is determined based on the information regarding the gaming media obtained in the step S10 (S14). When the chip has been moved (S14: YES), the routine returns to the step S10. In other words, the chip scanning is repeated until the movement of the chip is resolved. When the chip has been moved, as shown in FIGS. 10 to 12, information regarding the moved gaming medium (i.e., a difference between the first bet amount and the second bet amount) is shown on the dealer display 4. When the chip has not been moved (S14: NO), the routine ends and returns to the main process.

(Gaming Table System 1: Control Unit 3: Collection Process)

Figure 43:
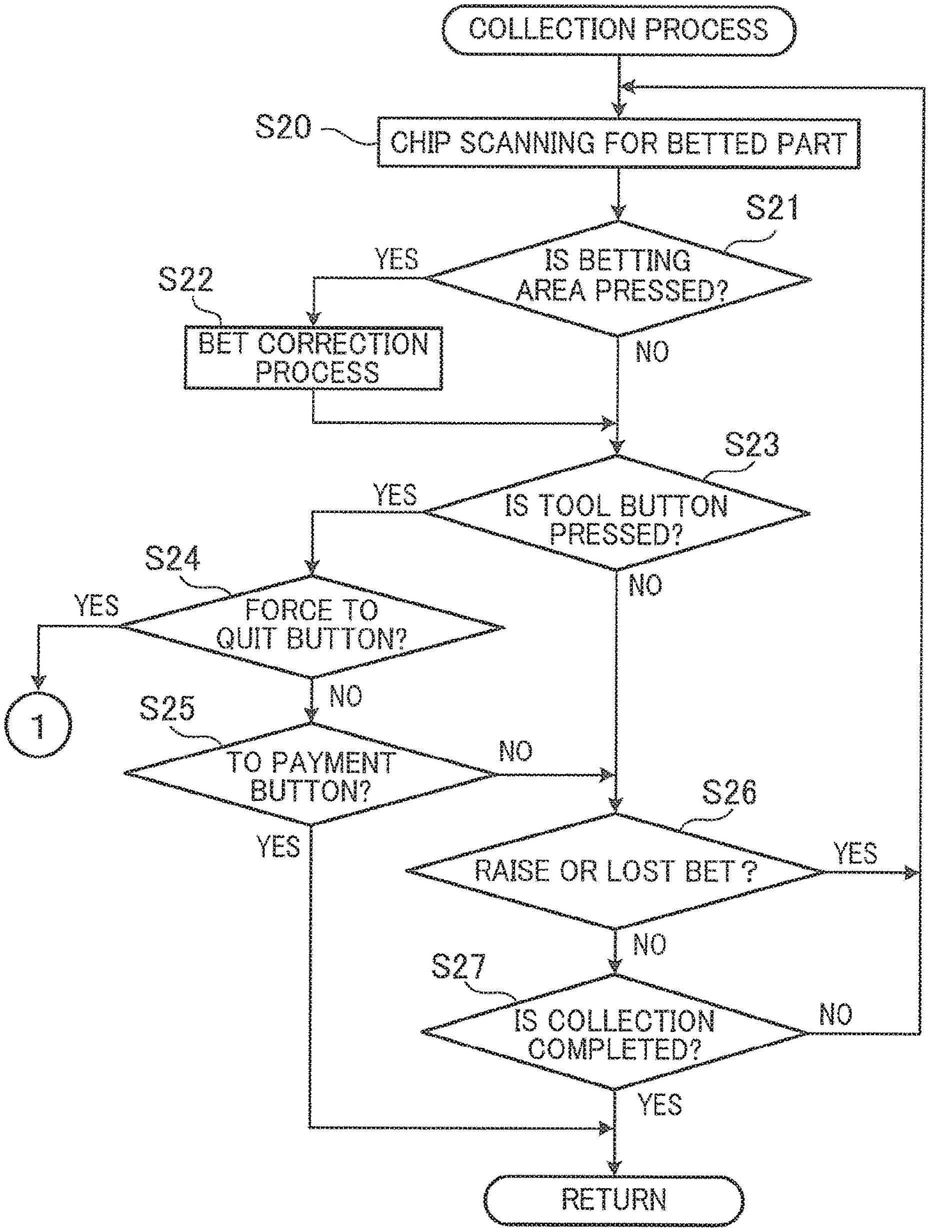
FIG. 43 is a flowchart of a collection process.

As shown in FIG. 43, in the main process, as the collection process is executed, the collection screen (see FIG. 15) is displayed on the dealer display 4 and the chip scanning is executed for a betting area 210 in which gaming media are placed as the bet (S20). Then whether the bet display area 420 of the collection screen has been touched is determined (S21). When the bet display area 420 is touched (S21: YES), a bet correction process is executed (S22). In the bet correction process, it is possible to read correct gaming media to revise already-fixed bet. That is to say, only an antenna for reading the betting area 210 corresponding to the touched bet display area 420 is driven among the antennas of the antenna member 22, and gaming media for the correct bet are read as this betting area 210 is scanned.

After the step S22 or when the bet display area 420 is not touched, whether the tool button has been pressed is determined (S23). When the tool button has been touched (S23: YES), whether the forcible stop button 4411 (FORCE TO QUIT button) has been touched is determined (S24). When the forcible stop button 4411 has been touched (S24: YES), the routine proceeds to the step S1 in the main process. When the forcible stop button 4411 has not been touched (S24: NO), whether the skip button 4412 (TO PAYMENT button) has been touched is determined (S25). When the skip button 4412 has been touched (S25: YES), the routine ends and returns to the main process.

In the meanwhile, when the skip button 4412 has not been touched (S25: NO) or when the tool button has not been touched (S23: NO), whether the fixed bet has been increased or decreased is determined based on the information regarding the gaming media obtained in the step S20 (S26). When the fixed bet has been increased or decreased (S26: YES). the routine returns to the step S20. In other words, the scanning is repeated until the fixed bet is no longer increased or decreased.

In the meanwhile, when the fixed bet is neither increased nor decreased (S26: NO), whether collection has been completed is determined (S27). That is to say, based on the information regarding the gaming media obtained in the step S20, whether gaming media which must be collected have all been collected is determined. When the collection has not been completed (S27: NO), the routine returns to the step S20. When the collection has been completed (S27: YES). the routine is ended.

(Gaming Table System 1: Control Unit 3: Payment Process)

Figure 44:
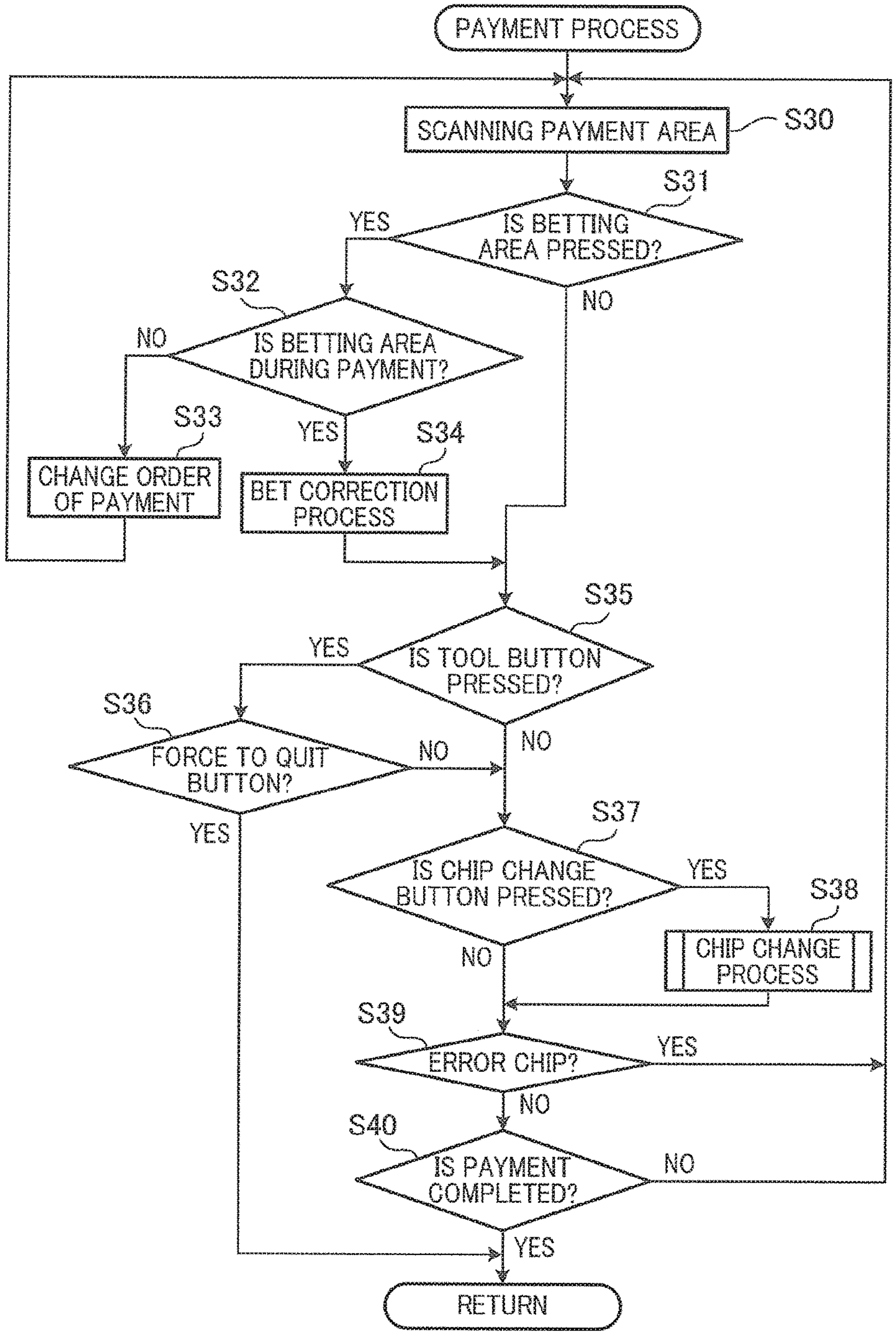
FIG. 44 is a flowchart of a payment process.

As shown in FIG. 44, in the main process, as the payment process is executed, the payment screen (see FIG. 22) is displayed on the dealer display 4 and the scanning process is executed for a payment area (S30). The payment area is formed of each bet object area 2100 of a single betting area 210, a dealer area 2106, and a commission area 2107. These areas are set as one of the adding area and the subtracting area in the payment area. That is to say, the bet object area 2100 which wins in the betting area 210 and the dealer area 2106 are set as the adding areas, whereas the bet object area 2100 which loses in the betting area 210 and the commission area 2107 are set as the subtracting areas. In the scanning process of scanning the payment area, the areas above are scanned and a value indicated by gaming media placed in the adding areas and a value indicated by gaming media placed in the subtracting areas are obtained. In the step S30, an antenna for reading each bet object area 2100 of a single betting area 210 specified as a payment target, an antenna of the dealer area 2106, and an antenna of the commission area 2107 are driven among the antennas of the antenna member 22, and gaming media placed in these areas are scanned. The antenna of the commission area 2107 may be driven only in case of winning of the banker.

Then whether the betting area (i.e., an area for which payment is to be made among the bet display areas 420) has been touched in the payment screen is determined (S31). When the betting area has been touched (S31: YES), whether the betting area is a betting area during payment scanned in the step S30 is determined (S32). When the betting area is not during payment (S32: NO), a payment order changing process (S33) of setting the touched betting area as a payment target is executed. Thereafter, returning to the step S30, the betting area which is newly set as the payment target is scanned. That is to say, an antenna for reading each bet object area 2100 of a single betting area 210 corresponding to the touched bet display area 420, an antenna of the dealer area 2106, and an antenna for the commission area 2107 are driven among the antennas of the antenna member 22, and gaming media placed in these areas are scanned. When the touched betting area is a betting area during payment (S32: YES), a bet correction process is executed (S34). In the bet correction process, it is possible to read correct gaming media to revise already-fixed bet. That is to say, only an antenna for reading each bet object area 2100 of the betting area 210 corresponding to the touched bet display area 420 is driven among the antennas of the antenna member 22, and gaming media corresponding to the correct bet are read as this betting area 210 is scanned.

After the step S34 and when the betting area is not touched (S31: NO), whether the tool button has been pressed is determined (S35). When the tool button has been touched (S35: YES), whether the forcible stop button 4421 (FORCE TO QUIT button) has been touched is determined (S36). When the forcible stop button 4421 has been touched (S36: YES), the routine ends and returns to the main process.

When the forcible stop button 4421 has not been touched (S36: NO) and the tool button has not been touched (S35: NO), whether the chip change button 428 has been touched is determined (S37). When the chip change button 428 has been touched (S37: YES), the later-described chip change process is executed (S38). After the step S38 and the chip change button 428 has not been changed (S37: NO), whether an error chip exists is determined (S39). When there is an error chip (S39: YES), the routine returns to the step S30. In other words, the scanning is repeated until the error chip is removed.

When there is no error chip (S39: NO), whether the payment has been completed is determined (S40). Whether the payment in one payment area has been completed is determined based on whether a value calculated by subtracting a value indicated by gaming media placed in the subtracting area from a value indicated by gaming media placed in the adding area is identical with the total of the bet amount and the payment amount in that area. When these two are identical, the payment in one payment area is completed. The routine returns to the step S30 when the payment in another payment area has not been completed. The routine ends when the payments in all payment areas are completed.

(Gaming Table System 1: Control Unit 3: Chip Change Process)

Figure 45:
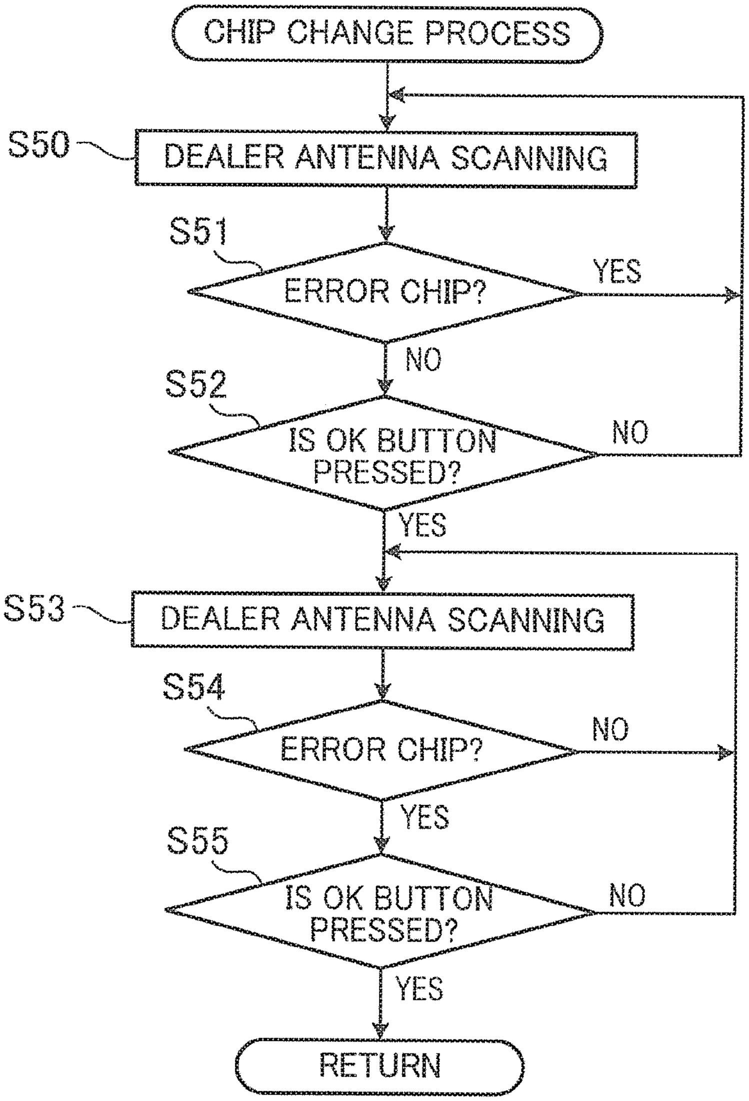
FIG. 45 is a flowchart of a chip change process.

As shown in FIG. 45, when the chip change process is executed in the payment process, the chip change screen (see FIG. 29) is displayed on the dealer display 4 and a dealer antenna scanning process is executed (S50). In the dealer antenna scanning process, gaming media in the dealer area 2106 are scanned. Then whether the scanned gaming media include an error chip is determined (S51). When there is an error chip (S51: YES), the routine returns to the step S50.

When there is no error chip (S51: NO), whether the OK button 458 has been touched is determined (S52). When the OK button 458 has not been touched (S52: NO), the routine returns to the step S50. When no gaming medium is detected in the step S50, an input to the OK button 458 becomes invalid, and hence the routine returns from the step S52 to the step S50. When the OK button 458 has been touched (S52: YES), gaming media (incoming chip) placed on the dealer area 2106 by the player are fixed. Although not illustrated, the fixed gaming media are remembered by the memory 33.

After the OK button 458 is touched and the gaming media from the player are fixed, the dealer antenna scanning process is executed and the gaming media in the dealer area 2106 are scanned again (S53). At this stage, the gaming media remembered by the memory 33 are excluded. Then whether the scanned gaming media include an error chip is determined (S54). When an error chip is included (S54: YES), the routine returns to the step S53.

When no error chip is included (S54: NO), whether the OK button 458 has been touched is determined (S55). When the OK button 458 has not been touched (S55: NO), the routine returns to the step S53. When the total value indicated by the gaming media scanned in the step S53 is not identical with the value indicated by the gaming media remembered after the step S52, an input to the OK button 458 becomes invalid, and the routine returns from the step S55 to the step S53. In other words, an input to the OK button 458 is valid when the incoming chip is matched with an outgoing chip handed over to the player. When the OK button 458 has been touched (S55: YES), the routine ends.

(Gaming Table System 1: Control Unit 3: Rolling Process)

As described with reference to FIG. 35, the bet screen is shifted to a rolling screen for performing rolling. The rolling process performed on this rolling screen will be described.

Figure 46:
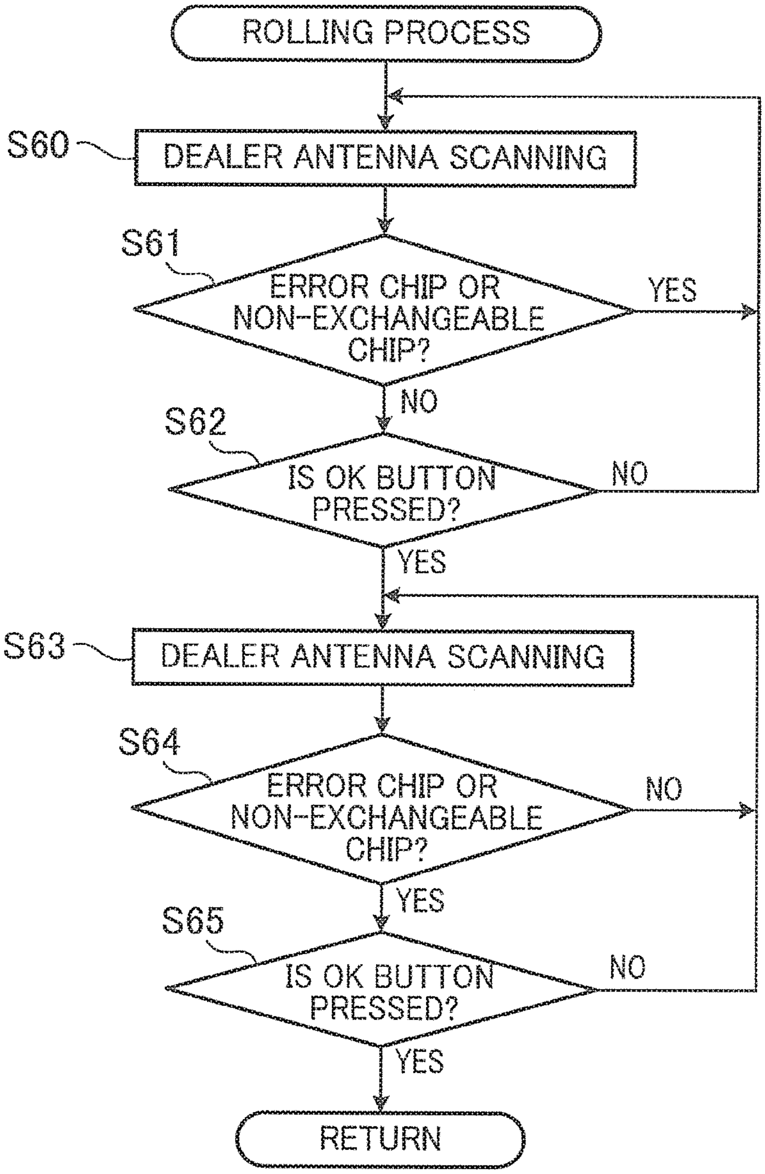
FIG. 46 is a flowchart of a rolling process.

As shown in FIG. 46, when the chip change process is executed in the payment process, the rolling screen is displayed on the dealer display 4 and the dealer antenna scanning process is executed (S60). In the dealer antenna scanning process, gaming media in the dealer area 2106 are scanned. Then whether the scanned gaming media include an error chip or a non-exchangeable chip is determined (S61). When an error chip or a non-exchangeable chip is included (S61: YES), the routine returns to the step S60.

When neither error chip nor non-exchangeable chip is included (S61: NO), whether the OK button 458 has been touched is determined (S62). When the OK button 458 has not been touched (S62: NO), the routine returns to the step S50. When no gaming medium is detected in the step S60, an input to the OK button 468 is invalid and hence the routine returns from the step S62 to the step S60. When the OK button 468 is touched (S62: YES), gaming media (incoming chip) placed in the dealer area 2106 from the player are fixed. Although not illustrated, the fixed gaming media are remembered by the memory 33.

When the OK button 468 is touched and the gaming media from the player are fixed, the dealer antenna scanning process is executed and the gaming media in the dealer area 2106 are scanned again (S63). At this stage, the gaming media remembered by the memory 33 are excluded. Then whether the scanned gaming media include an error chip or a non-exchangeable chip is determined (S64). When an error chip or a non-exchangeable chip is included (S64: YES), the routine returns to the step S63.

When the error chip does not exist (S64: NO), whether the OK button 458 has been touched is determined (S65). When the OK button 458 has not been touched (S65: NO), the routine returns to the step S63. When the total value indicated by the gaming media scanned in the step S63 is not identical with the value indicated by the gaming media remembered after the step S62, an input to the OK button 468 becomes invalid, and the routine returns from the step S65 to the step S63. In other words, an input to the OK button 468 is valid when the incoming chip is matched with an outgoing chip handed over to the player. When the OK button 468 has been touched (S65: YES), the routine ends.

(Gaming Table System 1: Antenna Member 22)

Now, the antenna member 22 for reading gaming media placed on the game board 21 will be described.

(Gaming Table System 1: Antenna Member 22: Mechanical Structure)

Figure 47:
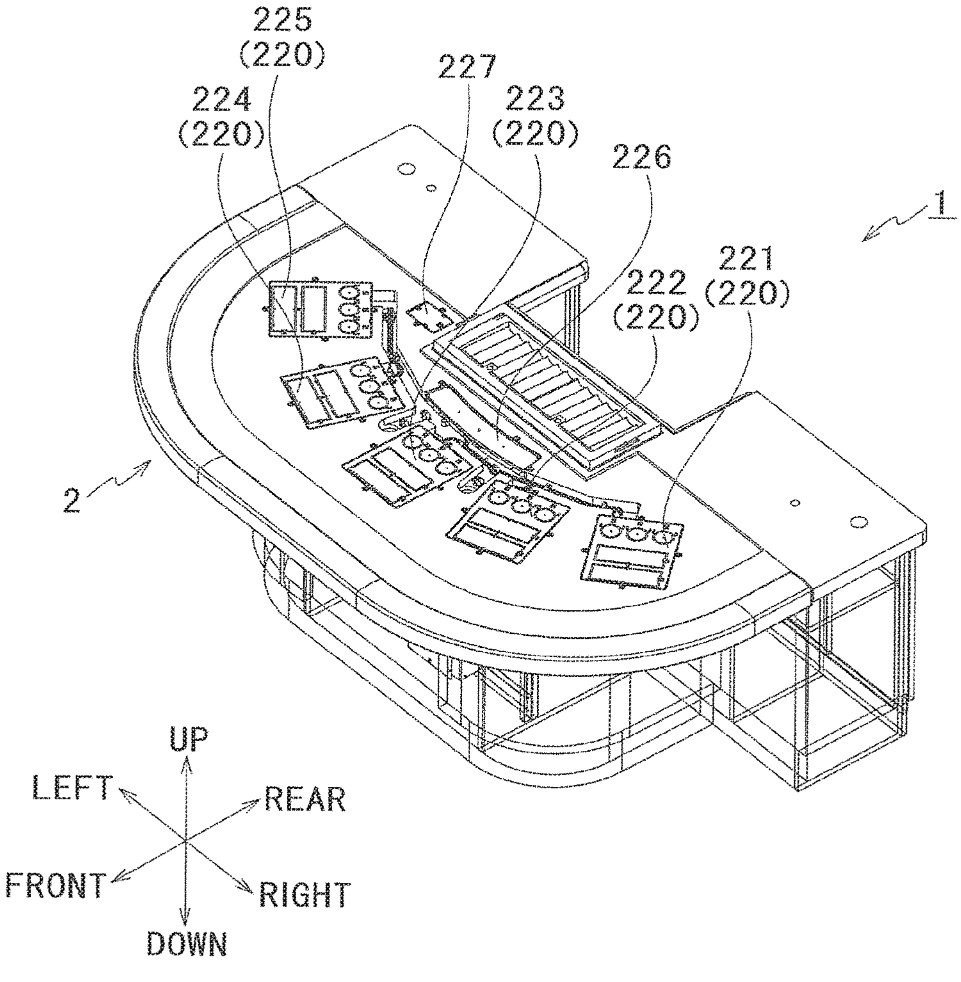
FIG. 47 is a perspective view of the gaming table system.

As shown in FIG. 47, the game board 21 (see FIG. 2) of the gaming table system 1 is arranged to be detachable, and below the game board 21, five antenna modules 220 (antenna modules 221, 222, 223, 224, and 225), an antenna 226, and an antenna 227 for reading gaming media placed in the betting areas 211, 212, 213, 214, and 215, the dealer area 2106, and the commission area 2107 are embedded at positions corresponding to the respective areas.

The five antenna modules 220 are units including antennas for reading the bet object areas 2100 of the respective betting areas 211, 212, 213, 214, and 215. The antenna modules 221, 222, 223, 224, and 225 are all identical, but the disclosure is not limited to this arrangement.

Figure 48:
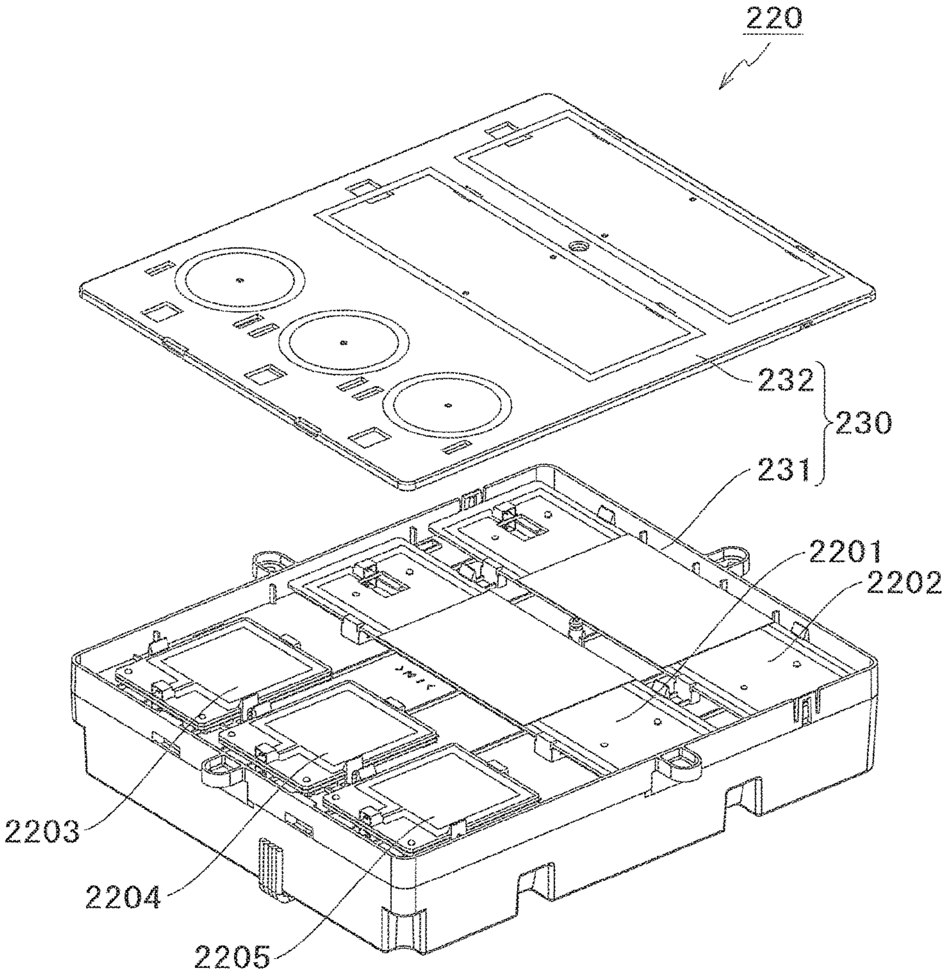
FIG. 48 is an exploded perspective view of a part of an antenna module.

To be more specific, as shown in FIG. 48, each antenna module 220 is substantially rectangular parallelepiped in shape. The cabinet 230 of the antenna module 221 is formed of a main body portion 231 and a lid portion 232. As the lid portion 232 is superposed on the open upper face of the main body portion 231, the cabinet 230 of the antenna module 220 having an internal space is formed.

The antenna module 220 includes, in the internal space of the cabinet 230, an antenna 2202 for reading gaming media placed in the player area 2102 of the game board 21, an antenna 2201 for reading gaming media placed in the banker area 2101 of the game board 21, an antenna 2203 for reading gaming media placed in the banker pair area 2103 of the game board 21, an antenna 2204 for reading gaming media placed in the tie area 2104 of the game board 21, and an antenna 2205 for reading gaming media placed in the player pair area 2105 of the game board 21. The antennas 2201 to 2205 are supported on the upper face side in the internal space of the cabinet 230, in order to maintain the intensities in communications with the gaming media placed on the game board 21.

Although not illustrated, the antennas 2201 to 2205, the antenna 226, and the antenna 227 are connected with the control unit 3 including an RFID reader, by a coupler board. Each signal line connecting the control unit 3 with the coupler board is inserted into a ferrite core, in order to reduce noise generated in the signal line between the control unit 3 and the coupler board.

(Gaming Table System 1: Control Unit 3, Antenna Member 22: Reading Process)

Figure 49:
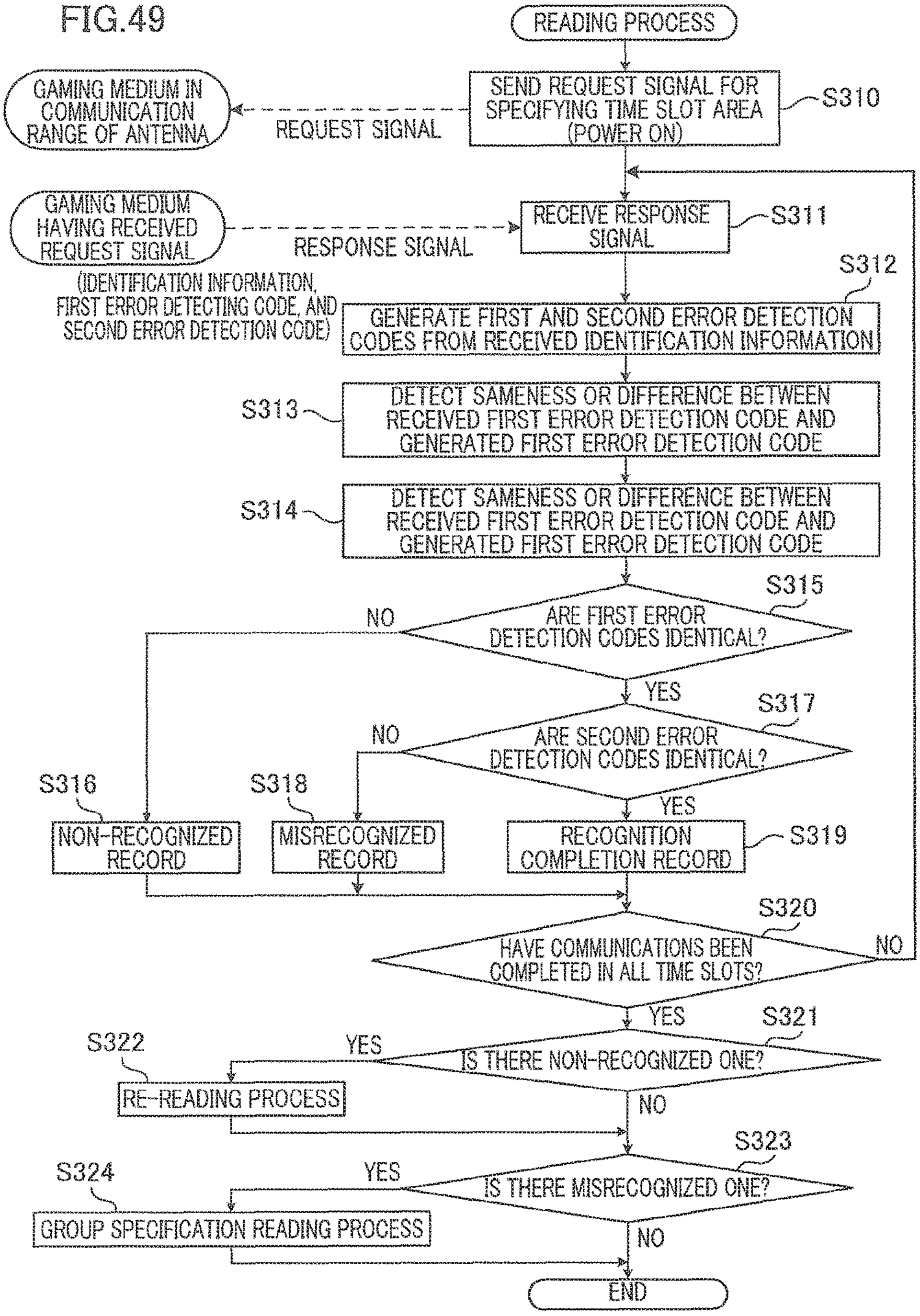
FIG. 49 is a flowchart of a reading process.

Referring to FIG. 49, a reading process executed by the control unit 3 by using the antenna member 22 will be described. The following description does not specify an antenna. However, when an antenna is specified, processes below are executed for that antenna. When a betting area 210 is specified, the reading process is serially executed for all antennas reading all bet object areas 2100 of that betting area

210. When no antenna is specified, the reading process is serially executed for all antennas.

To begin with, when the reading process is executed by the control unit 3, a request signal is sent to RFID tags of gaming media in the communication range of an antenna, so that a time slot area is specified (S310).

Receiving the request signal, the RFID tag generates a 16-bit CRC code from the identification information by means of CRC. Subsequently, the RFID tag having received the request signal sends a response signal including identification information (64-bit UID), a first error detection code (16-bit CRC code) and a second error detection code (8-bit DSFID), at a timing specified for each value of the time slot area.

The data length of the first error detection code and the data length of the second error detection code are each shorter than the data length of the identification information. The data length of the second error detection code is shorter than the data length of the first error detection code. The first error detection code and the second error detection code are generated as different methods, e.g., to have different data lengths. The first error detection code is generated by an RFID tag. The second error detection code is generated in advance and stored in the memory 33.

When response signals are received serially from the respective RFID tags via the antenna (S311), the first error detection code (16-bit UID) and the second error detection code (8-bit DSFID) are generated from the identification information in each response signal (S312). Thereafter, sameness or difference between the first error detection code received from the RFID 101 in S311 and the first error detection code generated in S312 is detected (S313). These first error detection codes are typically identical when collision of the response signals has not occurred.

After S313, sameness or difference between the second error detection code received from the RFID 101 in S311 and the second error detection code generated in S312 is detected (S314). The second error detection codes are typically identical when collision of the response signals has not occurred.

Then whether the first error detection codes are identical is determined (S315). The first error detection codes are typically different when collision of the response signals has occurred, with the result that the RFID tag cannot be recognized. When plural RFID tags simultaneously send response signals, a data value is varied and hence the first error detection codes are different in S313. It is determined in such a case the first error detection codes are different (S315: NO), and non-recognition is recorded in the memory 33 as a communication result for the time slot area (S316).

When response signals collide, difference between the first error detection codes is typically detected in S313. However, even if the response signals collide, the received first error detection code may be coincidentally identical with the generated first error detection code. Such identification information recognized as correct in this way is so-called ghost ID, and the RFID tag recognized as correct is a so-called ghost gaming medium.

When plural RFID tags having different sets of identification information simultaneously start communication by using the same spread code and the same time slot, the probability of failing to detect an error by n-bit CRC is equal to the probability that a n-bit CRC code generated from identification information (DATAX) synthesized at the receiving is coincidentally identical with a n-bit first error detection code (CRC X) synthesized at the receiving. This probability can be represented as 2-n. In the present embodiment, because the 16-bit CRC code is used as the first error detection code, a ghost chip is generated at a probability of 1/65536 which is 2 to the negative 16th power.

When it is determined in S315 that the first error detection codes are identical (S315: YES), then whether the second error detection codes are identical is determined (S317). When the first error detection codes are identical whereas the second error detection codes are different, it is understood that misrecognition of the first error detection code has occurred due to the collision of the response signals. In this case (S317: NO), misrecognition is recorded in the memory 33 as a communication result in the time slot area (S318).

In the meanwhile, when it is determined in S317 the first error detection codes are identical and the second error detection codes are identical, it is understood that the RFID tag is correctly recognized. In this case (S317: YES), recognition completion is recorded in the memory 33 as a communication result in the time slot area (S319).

After the execution of S316, S318, or S319, whether communications of all time slots in the communication range of the antenna have been completed is determined (S320). When it is determined that communications of all time slots in the communication range of the antenna have not been completed (S320: NO), the routine goes back to S311. When it is determined that communications of all time slots in the communication range of the antenna have been completed (S320: YES), whether there is a record which has not been recognized in the memory 33 is determined (S321).

When there is a record which has not been recognized (S321: YES), a re-reading process is executed. In the re-reading process, a request signal is sent to specify a time slot area (e.g., one of 17th to 32nd bits from the lowest place in the 64-bit UID) which is different from the time slot area specified in S310. When it is determined that all records have been recognized in the storage unit 43 (S321: NO) or when S322 is executed, whether there is a record of misrecognition in the storage unit 43 is determined (S323). When it is determined that there is no record of misrecognition (S324: NO), the process ends. In the meanwhile, when it is determined that there is a record of misrecognition (S324: YES), a group specification reading process is executed (S324) and the process ends.

In the group specification reading process, to be more specific, a time slot area and a time slot value which are identical with those when misrecognition of the first error detection code occurs are specified, and a specifying signal for specifying one group is sent. The specifying signal includes a group code, and a group is specified based on the group code. The number of groups is equal to the number of values that the group code is possible to have (n-th power of 2). The number of groups in the present embodiment is 256, i.e., 8th power of 2 because the group code is 8 bits, but the disclosure is not limited to this arrangement.

The RFID tag receiving the specifying signal sends a reply signal including the group code, the identification information, and the first error detection code. The data length of the group code is shorter than the data length of each of the identification information, the first error detection code, and the second error detection code. The group code is allocated to each RFID tag in advance and stored in the memory 33.

Thereafter, a process of receiving the reply signal from the RFID tag via the antenna and specifying a misrecognized chip is performed. In this process, the first error detection code is generated from the identification information included in the received specifying signal, and the chip is recognized based on the comparison between the generated first error detection code and the first error detection code included in the received specifying signal. Then the completion of the recognition of the group is recorded in the memory 33. This process is repeated until the reading of all groups is completed.

(Outline of P15-0102)

A gaming table system 1 includes a gaming table 2 including a betting area 210 in which gaming media betted by a player (participant) are placed and an antenna member 22 configured to read a value of the gaming media placed in the betting area 210 by wireless communication and a control unit 3 configured to execute a scanning process of obtaining the total value of the gaming media in the betting area 210 by controlling the antenna member 22. The control unit 3 fixes a first bet amount by executing the scanning process at a timing to fix the bet and fixes the second bet amount by executing the scanning process again at a predetermined timing after the timing to fix the bet, and when the fixed second bet amount is different from the first bet amount, the control unit 3 repeats the scanning process until these amounts become identical.

According to the arrangement above, when the second bet amount is different from the first bet amount after the timing to fix the bet, the scanning process is repeated until the first bet amount and the second bet amount become identical with each other. In this way, the occurrence of a difference between the fixed bet amount and the gaming media placed in the betting area of the gaming table 2 is detected, and the return of the gaming media placed in the betting area of the gaming table to the fixed bet amount is detected. It is therefore possible to prevent the game from progressing while a change in the gaming media placed on the betting area 210 of the gaming table 2 is left uncorrected.

The gaming table system 1 may include a dealer display 4 which, when the second bet amount is different from the first bet amount, notifies the difference.

According to the arrangement above, because it is possible to understand in what manner the gaming media in the betting area 210 are changed, the dealer can easily return the gaming media in the betting area 210 to the fixed bet amount.

A display of the gaming table system 1 may include a touch panel 41 and allow a timing to fix the bet to be input.

According to this arrangement, it is possible to set the timing to fix the bet by making an input, and hence it is possible to set a bet period at will.

The control unit 3 of the gaming table system 1 may be able to terminate the repetition of the scanning process.

According to the arrangement above, because the repetition of the scanning process can be terminated, the bet can be canceled.

The gaming table system 1 may further include a card shoe 5 configured to obtain a game result, and the control unit 3 may repeat a process of fixing the second bet amount by executing the scanning process until the game result is obtained.

This makes it possible to monitor the gaming media in the betting area 210 of the gaming table 2 until a game result is determined.

(Outline of P15-0103)

P15-0103 relates to a gaming table system.

In a gaming facility such as casino, games such as baccarat and blackjack are played on a gaming table by using physical cards. A dealer is typically stationed at each gaming table where one or more players play games. The dealer manages the progress of games such as card distribution, betting of gaming media with values such as gaming chips from players, collection of gaming media from players, and payment of gaming media to players.

In games above, because gaming media are frequently moved on the gaming table, human errors may be made by the dealer. To prevent the occurrence of such human errors, detection of electronic information by an antenna attached to a gaming table, with the use of a gaming medium in which an RF tag with electronic information is embedded, has been proposed.

The above-described gaming table is typically provided with a display. The display displays information based on electronic information detected by the antenna. The dealer performs the above-described game management while checking the display.

When the above-described gaming table is used, the dealer is required to perform game management while checking the display to serially check sets of information from respective antennas. It is therefore necessary to perform game management based on the information displayed on the display, and hence the game management cannot be performed in accordance with the dealer's wish, with the result that the burden on the dealer may be increased.

The P15-0103 has been done to solve the problem above, and an object thereof is to provide a gaming table system which is able to reduce the burden on a dealer.

To be more specific, the gaming table system 1 includes a gaming table 2 including betting areas 210 which are provided for respective players and in each of which gaming media betted by a player are placed, and an antenna member 22 configured to read a value of the gaming media placed in each of the betting areas 210 by wireless communication, a control unit 3 configured to execute a scanning process of obtaining the total value of the gaming media in the betting areas 210 by controlling the antenna member 22, and a dealer display 4 which displays the total value of each betting area 210 and includes a touch panel 41 by which one of the betting areas 210 can be specified. When one of the betting areas 210 is specified by the touch panel 41 of the dealer display 4, the control unit 3 executes the scanning process again for that betting area 210.

According to the arrangement above, the bet amount of each player is displayed on the dealer display 4, and the scanning process is executed again as the player is specified by the touch panel 41. This allows the dealer to easily specify a betting area 210 from which the value is read again. The burden of the dealer is therefore lightened.

The gaming table system 1 may further include a card shoe 5 which is configured to obtain a game result, and may be arranged such that the control unit 3 determines a betting area 210 for which payment is to be made among the betting areas 210, based on the game result and the bet by the player, and when there are plural betting areas for which payment is to be made, one of these betting areas 210 is selected based on an input to the touch panel 41, and a payment amount to that betting area is displayed on the dealer display 4.

With this arrangement, the order of the payment is determined by the touch panel 41. This allows the dealer to easily perform payment in a desired order while checking each payment amount.

The control unit 3 of the gaming table system 1 may display, on the display, the betting area 210 in which a gaming medium to be collected is placed, based on the game result and the bet by the player.

This allows the dealer to specify the betting area 210 where the gaming media to be collected are placed, and the prevention of human errors is ensured.

(Outline of P15-0104)

P15-0104 relates to a gaming table system.

In a gaming facility such as casino, games such as baccarat and blackjack are played on a gaming table by using physical cards. A dealer is typically stationed at each gaming table where one or more players play games. The dealer manages the progress of games such as card distribution, betting of gaming media with values such as gaming chips from players, collection of gaming media from players, and payment of gaming media to players.

In games above, because gaming media are frequently moved on the gaming table, human errors may be made by the dealer. To prevent the occurrence of such human errors, detection of electronic information by an antenna attached to a gaming table, with the use of a gaming medium in which an RF tag with electronic information is embedded, has been proposed.

The above-described gaming table is typically provided with a display. The display displays information based on electronic information detected by the antenna. The dealer performs the above-described game management while checking the display.

In the gaming table above, a betting area in which a player places a betted gaming medium and a dealer area in which the dealer places a gaming medium for a payout to a winning player. The dealer is required to collect the gaming medium that the winning player bets and then place it in the dealer area, and place an additional gaming medium to be paid to the player in the dealer area and cause the payment to be read by an antenna to confirm the payment.

In the known method, however, it is necessary to collect the betted gaming medium and then place it, and the dealer is required to remember to which player the payment is made. This may induce a mistake by the dealer.

P15-0104 has been done to solve the problem above, and an object thereof is to provide a gaming table system in which interchange of gaming media with players at the time of payment is smoothly done and whether the gaming media are correctly interchanged is easily checked.

To be more specific, the gaming table system 1 includes a gaming table 2 including a betting area 210 having bet object areas 2100 corresponding to bet objects in a game and in which gaming media are bet by a player and an antenna member 22 configured to read a value of gaming media from each bet object area by wireless communication, and a control unit 3 configured to execute a scanning process of obtaining a total value indicated by the gaming media in each bet object area 2100 by controlling the antenna member 22. The control unit 3 sets a bet object area 2100 corresponding to a bet object for which payment is to be made as a result of the game as an adding area, sets a bet object area 2100 corresponding to a bet object for which no payment is to be made as a result of the game as a subtracting area, and repeats the scanning process until a value calculated by subtracting the total value of the gaming media in the subtracting area from the total value of the gaming media in the adding area becomes equal to a payment amount.

According to the arrangement above, when there is payment to a player as a result of the game, a bet object area 2100 for which payment is to be made in a betting area used by the player for betting is utilized for paying gaming media. According to this arrangement, the dealer is able to perform payment by placing only gaming media for additional payment in a bet object area 2100 for which payment to be made, while keeping the gaming media used for the bet as they are. Furthermore, the dealer is able to easily perform collection by placing house edge at the time of payment in a bet object area 2100 where no payment to the player is to be made. This allows the dealer to smoothly interchange the gaming media with the players at the time of the payment, and easily check whether the gaming media are correctly interchanged.

The gaming table system 1 may be arranged such that the game is baccarat, and in the gaming table 2, the betting area 210 includes a banker area 2101 and a player area 2102 as the bet object area 2100, and when the banker wins, the control unit 3 sets the banker area 2101 as the adding area and sets the player area 2102 as the subtracting area.

With this arrangement, the player can easily pay the commission at the time of the winning of the banker in baccarat by placing gaming media in the player area 2102.

The gaming table 2 of the gaming table system 1 may further include a dealer area 2106 which functions as the adding area.

With the above-described structure, the degree of freedom in the game management is improved because the dealer is able to use the dealer area 2106 as the adding area.

The gaming table of the gaming table system 1 may further includes a commission area 2107 which functions as the subtracting area.

With the above-described structure, the degree of freedom in the game management is improved because the dealer is able to use the commission area 2107 as the subtracting area.

(Outline of P15-0105)

P15-0105 relates to a gaming table system.

In a gaming facility such as casino, games such as baccarat and blackjack are played on a gaming table by using physical cards. A dealer is typically stationed at each gaming table where one or more players play games. The dealer manages the progress of games such as card distribution, betting of gaming media with values such as gaming chips from players, collection of gaming media from players, and payment of gaming media to players.

In games above, because gaming media are frequently moved on the gaming table, human errors may be made by the dealer. To prevent the occurrence of such human errors, detection of electronic information by an antenna attached to a gaming table, with the use of a gaming medium in which an RF tag with electronic information is embedded, has been proposed.

The above-described gaming table is typically provided with a display. The display displays information based on electronic information detected by the antenna. The dealer performs the above-described game management while checking the display.

There are plural types of gaming media, and each type indicates a particular amount. When a player wishes to exchange a gaming medium for smaller denomination gaming media, the dealer is required to perform the exchange at a timing desired by the player.

To perform the exchange, the dealer is required to check whether a gaming medium received from the player is identical in the value with gaming media handed over to the player. However, in the known gaming table above, the dealer is required to check a value of gaming media received from a player by reading the gaming media by an antenna, and then check a value of gaming media handed over to the player by reading the gaming media by the antenna. The burden on the dealer is therefore increased, and this induces the above-described mistake in the game management.

P15-0105 has been conceived of in consideration of the above, and an object thereof is to provide a gaming table system by which exchange is smoothly done and the occurrence of mistake by a dealer can be reduced.

To be more specific, the gaming table system 1 includes a gaming table 2 including a game board 21 in which gaming media are placed and an antenna member 22 configured to read a value of the gaming media placed in the game board 21 by wireless communication, a control unit configured to execute a scanning process of obtaining the total value of the gaming media in the game board 21 by controlling the antenna member 22, and a dealer display 4. The control unit 3 determines the total value of first gaming media placed in a dealer area 2106 of the game board 21, determines the total value of second gaming media placed in the dealer area 2106 of the game board 21 excluding the first gaming media after a predetermined time elapses, determines whether the first gaming media are identical with the second gaming media, and displays the determination result on the dealer display 4.

According to the arrangement above, in the dealer area 2106 of the same game board 21, the value indicated by the first gaming media is read and then the value of the second gaming media excluding the first gaming media is read, and whether these values are identical or not is displayed. This allows the dealer who manages the gaming table system player to easily display the second gaming media corresponding to the value of the first gaming media from the player, and to easily prevent the occurrence of errors in exchange of gaming media with the player. Furthermore, the dealer is allowed to check whether the value of the first gaming media is identical with the value of the second gaming media, while keeping the first gaming media from the player to be placed in the gaming medium providing area. With this, the number of times of movement of gaming media by the dealer is reduced and the occurrence of errors is restrained.

The control unit 3 of the gaming table system 1 may display, on the dealer display 4, the total amount and total number of the first gaming media and the total amount and total number of the second gaming media.

According to this arrangement, the total amounts and the total numbers of the first gaming media and the second gaming media are displayed. Because this makes it possible to check the number of the actually placed gaming media and the number of the gaming media having been read together with the amounts, the prevention of human errors is further ensured.

The control unit 3 of the gaming table system 1 may have a mode in which only convertible gaming media which can be converted to currencies are accepted as the first gaming media and only inconvertible gaming media which cannot be converted to currencies are accepted as the second gaming media.

This arrangement allows the dealer to easily specify the type of gaming media before the exchange and the type of gaming media after the exchange when exchanging convertible gaming media to inconvertible gaming media at the time of so-called rolling, and hence the occurrence of human errors is prevented.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to fore the sake of easier understanding. The present invention is not limited to the above embodiment, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming table system comprising:

a gaming table including a betting area in which a gaming medium betted by a player is placed and an antenna member configured to read a value of the gaming medium placed in the betting area by wireless communication; and a control unit configured to execute, by controlling the antenna member, a scanning process of obtaining a total value of the gaming medium in the betting area, wherein, the control unit executes the scanning process at a bet fixation timing to fix a first bet amount, executes the scanning process again at a predetermined timing after the bet fixation timing to fix a second bet amount, and when the fixed second bet amount is different from the fixed first bet amount, repeats the scanning process until the second bet amount becomes equal to the first bet amount.

2. The gaming table system according to claim 1, further comprising a display which is configured to display, when the second bet amount is different from the first bet amount, a content of difference.

3. The gaming table system according to claim 2, wherein, the display includes a touch panel which allows an input of the bet fixation timing.

4. The gaming table system according to claim 1, wherein, the control unit is arranged to be able to stop repetition of the scanning process.

5. The gaming table system according to claim 1, further comprising:

an acquisition unit configured to acquire a game result, the control unit repeating a process of executing the scanning process to fix the second bet amount, until the game result is acquired.

6. A gaming table system comprising:

a gaming table including betting areas for players, respectively, in each of which a gaming medium betted by each player is placed, and an antenna member configured to read a value of the gaming medium placed in each of the betting areas by wireless communication;

a control unit configured to execute a scanning process of obtaining, by controlling the antenna member, a total value of the gaming medium in the betting area; and a dealer display configured to display a screen including bet display areas corresponding to the respective betting areas and to display the total value of each betting area on the corresponding bet display area and the dealer display including a touch panel by which one of the betting areas is specified, wherein, when one of the bet display areas of the touch panel is touched, the control unit re-executes the scanning process for the betting area corresponding to the touched bet display area.

7. The gaming table system according to claim 6, further comprising:

an acquisition unit configured to acquire a game result, the control unit determines a betting area for which payment is to be made among the betting areas, based on the game result and the bet from the player, and, when payment is to be made for more than one betting area, specifies one of the betting areas based on an input to the touch panel and displays a payment amount for that betting area on the display.

8. The gaming table system according to claim 7, wherein, based on the game result and the bet from the player, the control unit displays, on the display, a betting area in which the gaming medium to be collected is placed.

9. A gaming table system comprising:

a gaming table including a betting area including bet object areas corresponding to bet objects of a game and in which a gaming medium betted by a player is placed and an antenna member configured to read a value of the gaming medium placed in each of the bet object areas by wireless communication; and a control unit configured to execute, by controlling the antenna member, a scanning process of obtaining a total value of the gaming medium in each of the bet object areas, wherein, the control unit sets a bet object area corresponding to a bet object for which payment is to be made as a result of the game as an adding area and sets a bet object area corresponding to a bet object for which no payment is to be made as a result of the game as a subtracting area, and repeats the scanning process until a value calculated by subtracting a total value of the gaming medium in the subtracting area from a total value of the gaming medium in the adding area becomes equal to a payment amount.

10. The gaming table system according to claim 9, wherein, the game is baccarat, in the gaming table, the betting area includes a banker area and a player area as the bet object areas, and when banker wins, the control unit sets the banker area as the adding area and sets the player area as the subtracting area.

11. The gaming table system according to claim 10, wherein, the gaming table further includes a dealer area which functions as the adding area.

12. The gaming table system according to claim 10, wherein, the gaming table further includes a commission area which functions as the subtracting area.

13. A gaming table system comprising:

a gaming table including a gaming medium providing area in which a gaming medium is placed and an antenna member configured to read, by wireless communication, a value of the gaming medium placed in the gaming medium providing area;

a control unit configured to execute, by controlling the antenna member, a scanning process of obtaining a total value of the gaming medium in the gaming medium providing area; and a display, wherein, the control unit determines a total value of a first gaming medium in the gaming medium providing area, and determines a total value of a second gaming medium excluding the first gaming medium in the gaming medium providing area after a predetermined time elapses, determines whether the first gaming medium is identical with the second gaming medium, and displays a result of determination on the display.

14. The gaming table system according to claim 13, wherein, the control unit displays, on the display, a total amount of money and a total number of the first gaming medium and a total amount of money and a total number of the second gaming medium.

15. The gaming table system according to claim 14, wherein, the control unit accepts only a convertible gaming medium convertible to a currency as the first gaming medium, and accepts only an inconvertible gaming medium inconvertible to a currency as the second gaming medium.

* * * * *